US007274332B1

(12) United States Patent
Dupray

(10) Patent No.: US 7,274,332 B1
(45) Date of Patent: Sep. 25, 2007

(54) MULTIPLE EVALUATORS FOR EVALUATION OF A PURALITY OF CONDITIONS

(75) Inventor: Dennis J. Dupray, Golden, CO (US)

(73) Assignee: TracBeam LLC, Golden, CO (US)

( * ) Notice: Subject to any disclaimer, the term of this patent is extended or adjusted under 35 U.S.C. 154(b) by 0 days.

(21) Appl. No.: 09/176,587

(22) Filed: Oct. 21, 1998

Related U.S. Application Data

(63) Continuation-in-part of application No. 09/194,367, filed on Nov. 24, 1998, and a continuation-in-part of application No. PCT/US97/15892, filed on Sep. 8, 1997.

(60) Provisional application No. 60/062,931, filed on Oct. 21, 1997, provisional application No. 60/056,590, filed on Aug. 20, 1997, provisional application No. 60/044,821, filed on Apr. 25, 1997, provisional application No. 60/025,855, filed on Sep. 9, 1996.

(51) Int. Cl.
  *G01S 3/02* (2006.01)
(52) U.S. Cl. ............... 342/450; 342/357.01; 342/457
(58) Field of Classification Search .............. 342/450, 342/453, 457, 357.01
  See application file for complete search history.

(56) References Cited

U.S. PATENT DOCUMENTS

| 3,646,580 A | 2/1972 | Fuller et al. ............... 325/53 |
| 3,886,553 A | 5/1975 | Bates ..................... 343/112 R |
| 4,023,176 A | 5/1977 | Currie et al. ............ 343/113 E |
| 4,232,313 A | 11/1980 | Fleishman ................ 343/6 R |
| 4,347,618 A | 8/1982 | Kavouras et al. ............. 375/37 |
| 4,438,439 A | 3/1984 | Shreve ..................... 343/449 |
| 4,475,010 A | 10/1984 | Huensch et al. .......... 179/2 EB |
| RE31,962 E | 7/1985 | Brodeur ..................... 343/389 |
| 4,542,744 A | 9/1985 | Barnes et al. ............... 128/660 |
| 4,630,057 A | 12/1986 | Martin ..................... 342/358 |
| 4,636,795 A | 1/1987 | Dano ....................... 342/387 |
| 4,651,157 A | 3/1987 | Gray et al. ................. 342/457 |

(Continued)

FOREIGN PATENT DOCUMENTS

EP  0 177 203 A2  9/1985

(Continued)

OTHER PUBLICATIONS

Stutzman et al., 1998, "Moving Beyond Wireless Voice Systems," *Scientific American*, 278 (4):92-93 from http:/www.uswcorp.com/laby.htm,, Release concerning RadioCamera™, printed Sep. 14, 1998.

(Continued)

*Primary Examiner*—Dao Phan

(57) ABSTRACT

A system and method is disclosed for locating people or objects. In particular, a system and method for locating a wireless mobile station using a plurality of mobile station location estimators is disclosed. The system is useful for 911 emergency calls, tracking, routing, people and animal location including applications for confinement to and exclusion from certain areas. Additionally, a computational system and method for calibrating the relative performance of multiple models for various application domains is disclosed (e.g., medical, vehicle, communication diagnosis, robotics, seismic signal processing, recognition of terrestrial and/or airborne objects from satellites), wherein each such model may generate hypotheses (e.g., estimates and/or predictions) of an unknown condition. Additionally, the computational system and method may be distributed across a network such as the Internet.

95 Claims, 22 Drawing Sheets

U.S. PATENT DOCUMENTS

| | | | |
|---|---|---|---|
| 4,670,758 A | 6/1987 | Campbell | 342/458 |
| 4,700,374 A | 10/1987 | Bini | 379/60 |
| 4,721,958 A | 1/1988 | Jenkin | 342/13 |
| 4,740,792 A | 4/1988 | Sagey et al. | 342/457 |
| 4,742,357 A | 5/1988 | Rackley | 342/457 |
| 4,799,062 A | 1/1989 | Sanderford, Jr. et al. | 342/450 |
| 4,857,840 A | 8/1989 | Lanchais | 324/207 |
| 4,860,352 A | 8/1989 | Laurance et al. | 380/23 |
| 4,864,313 A | 9/1989 | Konneker | 342/457 |
| 4,876,550 A | 10/1989 | Kelly | 342/451 |
| 4,879,713 A | 11/1989 | Ichiyoshi | 370/75 |
| 4,888,593 A | 12/1989 | Friedman et al. | 380/23 |
| 4,914,689 A | 4/1990 | Quade et al. | 379/142 |
| 4,952,772 A | 8/1990 | Zana | 219/124.34 |
| 4,990,922 A | 2/1991 | Young et al. | 342/52 |
| 4,992,796 A | 2/1991 | Apostolos | 342/156 |
| 5,003,317 A | 3/1991 | Gray et al. | 342/457 |
| 5,008,679 A | 4/1991 | Effland et al. | 342/353 |
| 5,017,926 A | 5/1991 | Ames et al. | 342/353 |
| 5,034,898 A | 7/1991 | Lu et al. | 364/513 |
| 5,043,736 A | 8/1991 | Darnell et al. | 342/357 |
| 5,045,852 A | 9/1991 | Mitchell et al. | 341/51 |
| 5,055,851 A | 10/1991 | Sheffer | 342/457 |
| 5,092,343 A | 3/1992 | Spitzer et al. | 128/733 |
| 5,099,245 A | 3/1992 | Sagey | 342/357 |
| 5,111,209 A | 5/1992 | Toriyama | 342/357 |
| 5,119,102 A | 6/1992 | Barnard | 342/357 |
| 5,119,104 A | 6/1992 | Heller | 342/450 |
| 5,136,686 A | 8/1992 | Koza | 395/13 |
| 5,142,590 A | 8/1992 | Carpenter et al. | 382/14 |
| 5,155,490 A | 10/1992 | Spradley et al. | 342/357 |
| 5,163,004 A | 11/1992 | Rentz | 364/460 |
| 5,166,694 A | 11/1992 | Russell et al. | 342/457 |
| 5,177,489 A | 1/1993 | Hatch | 342/357 |
| 5,184,347 A | 2/1993 | Farwell et al. | 370/94.1 |
| 5,191,342 A | 3/1993 | Alsup et al. | 342/465 |
| 5,193,110 A | 3/1993 | Jones et al. | 379/94 |
| 5,208,756 A | 5/1993 | Song | 364/706 |
| 5,212,765 A | 5/1993 | Skeirik | 395/11 |
| 5,212,804 A | 5/1993 | Choate | 455/33.1 |
| 5,214,789 A | 5/1993 | George | 455/33.2 |
| 5,218,367 A | 6/1993 | Sheffer et al. | 342/457 |
| 5,218,618 A | 6/1993 | Sagey | 375/1 |
| 5,218,716 A | 6/1993 | Comroe et al. | 455/33 |
| 5,223,644 A | 6/1993 | Mansell et al. | 342/357 |
| 5,225,842 A | 7/1993 | Brown et al. | 342/357 |
| 5,233,541 A | 8/1993 | Corwin et al. | 364/516 |
| 5,235,633 A | 8/1993 | Dennison et al. | 379/60 |
| 5,243,530 A | 9/1993 | Stanifer et al. | 364/452 |
| 5,251,273 A | 10/1993 | Betts et al. | 382/57 |
| 5,260,711 A | 11/1993 | Sterzer | 342/375 |
| 5,278,892 A | 1/1994 | Bolliger et al. | 379/60 |
| 5,280,295 A | 1/1994 | Kelley et al. | 342/463 |
| 5,280,472 A | 1/1994 | Gilhousen et al. | 370/18 |
| 5,282,261 A | 1/1994 | Skeirik | 395/22 |
| 5,293,642 A | 3/1994 | Lo | 455/33.1 |
| 5,293,645 A | 3/1994 | Sood | 455/54.1 |
| 5,295,180 A | 3/1994 | Vendetti et al. | 379/59 |
| 5,311,195 A | 5/1994 | Mathis et al. | 342/357 |
| 5,317,323 A | 5/1994 | Kennedy et al. | 342/457 |
| 5,319,374 A | 6/1994 | Desai et al. | 342/387 |
| 5,325,419 A | 6/1994 | Connolly et al. | 379/60 |
| 5,327,144 A | 7/1994 | Stilp et al. | 342/387 |
| 5,331,550 A | 7/1994 | Stafford et al. | 364/413.02 |
| 5,349,631 A | 9/1994 | Lee | 379/59 |
| 5,359,521 A | 10/1994 | Kyrtsos et al. | 364/449 |
| 5,363,110 A | 11/1994 | Inamiya | 342/357 |
| 5,365,447 A | 11/1994 | Dennis | 364/449 |
| 5,365,450 A | 11/1994 | Schuchman et al. | 364/449 |
| 5,365,516 A * | 11/1994 | Jandrell | 370/18 |
| 5,365,544 A | 11/1994 | Schilling | 375/1 |
| 5,373,456 A | 12/1994 | Ferkinhoff et al. | 364/516 |
| 5,379,224 A | 1/1995 | Brown et al. | 364/449 |
| 5,388,147 A | 2/1995 | Grimes | 379/59 |
| 5,388,259 A | 2/1995 | Fleischman et al. | 395/600 |
| 5,389,934 A | 2/1995 | Kass | 342/357 |
| 5,390,339 A | 2/1995 | Bruckert et al. | 455/33.2 |
| 5,392,052 A | 2/1995 | Eberwine | 342/357 |
| 5,394,158 A | 2/1995 | Chia | 342/457 |
| 5,394,435 A | 2/1995 | Weerackody | 375/206 |
| 5,395,366 A | 3/1995 | D'Andrea et al. | 604/890.1 |
| 5,398,302 A | 3/1995 | Thrift | 395/23 |
| 5,402,520 A | 3/1995 | Schnitta | 395/22 |
| 5,402,524 A | 3/1995 | Bauman et al. | 395/50 |
| 5,408,586 A | 4/1995 | Skeirik | 395/23 |
| 5,408,588 A | 4/1995 | Ulug | 395/23 |
| 5,410,737 A | 4/1995 | Jones | 455/56.1 |
| 5,420,914 A | 5/1995 | Blumhardt | 379/114 |
| 5,422,813 A | 6/1995 | Schuchman et al. | 364/449 |
| 5,426,745 A | 6/1995 | Baji et al. | 395/375 |
| 5,434,927 A | 7/1995 | Brady et al. | 382/104 |
| 5,438,644 A | 8/1995 | Fu | 395/22 |
| 5,444,451 A | 8/1995 | Johnson et al. | 342/453 |
| 5,448,754 A | 9/1995 | Ho et al. | 455/34.1 |
| 5,457,736 A | 10/1995 | Cain et al. | 379/60 |
| 5,473,602 A | 12/1995 | McKenna et al. | 370/60 |
| 5,479,397 A | 12/1995 | Lee | 370/18 |
| 5,479,482 A | 12/1995 | Grimes | 379/59 |
| 5,485,163 A | 1/1996 | Singer et al. | 342/457 |
| 5,506,864 A | 4/1996 | Schilling | 375/205 |
| 5,508,707 A | 4/1996 | LeBlanc et al. | 342/457 |
| 5,508,708 A | 4/1996 | Ghosh et al. | 342/457 |
| 5,512,908 A | 4/1996 | Herrick | 342/387 |
| 5,513,243 A | 4/1996 | Kage | 379/58 |
| 5,513,246 A | 4/1996 | Jonsson et al. | 379/60 |
| 5,515,378 A | 5/1996 | Roy, III et al. | 370/95.1 |
| 5,515,419 A | 5/1996 | Sheffer | 379/56 |
| 5,517,667 A | 5/1996 | Wang | 395/24 |
| 5,519,760 A | 5/1996 | Borkowski et al. | 379/59 |
| 5,526,001 A | 6/1996 | Rose et al. | 342/442 |
| 5,526,357 A | 6/1996 | Jandrell | 370/95.2 |
| 5,526,466 A | 6/1996 | Takizawa | 395/2.62 |
| 5,537,460 A | 7/1996 | Holliday, Jr. et al. | 379/59 |
| 5,546,445 A | 8/1996 | Dennison et al. | 379/60 |
| 5,555,257 A | 9/1996 | Dent | 370/95.1 |
| 5,561,704 A | 10/1996 | Salimando | 379/58 |
| 5,563,611 A | 10/1996 | McGann et al. | 342/389 |
| 5,563,931 A | 10/1996 | Bishop et al. | 379/59 |
| 5,564,079 A | 10/1996 | Olsson | 455/54.1 |
| 5,570,412 A | 10/1996 | LeBlanc | 379/58 |
| 5,572,218 A | 11/1996 | Cohen et al. | 342/357 |
| 5,574,648 A | 11/1996 | Pilley | 364/439 |
| 5,577,169 A | 11/1996 | Prezioso | 395/61 |
| 5,581,490 A | 12/1996 | Ferkinhoff et al. | 364/578 |
| 5,581,596 A | 12/1996 | Hogan | 379/59 |
| 5,583,513 A | 12/1996 | Cohen | 342/357 |
| 5,583,517 A | 12/1996 | Yokev et al. | 342/457 |
| 5,588,038 A | 12/1996 | Snyder | 379/57 |
| 5,592,180 A | 1/1997 | Yokev et al. | 342/450 |
| 5,594,425 A | 1/1997 | Ladner et al. | 340/825.06 |
| 5,594,740 A | 1/1997 | LaDue | 379/59 |
| 5,594,782 A | 1/1997 | Zicker et al. | 379/63 |
| 5,596,625 A | 1/1997 | LeBlanc | 379/60 |
| 5,600,705 A | 2/1997 | Maenpaa | 379/58 |
| 5,600,706 A | 2/1997 | Dunn et al. | 379/59 |
| 5,602,903 A | 2/1997 | LeBlanc et al. | 379/60 |
| 5,604,765 A | 2/1997 | Bruno et al. | 375/200 |
| 5,608,410 A | 3/1997 | Stilp et al. | 342/387 |
| 5,610,815 A | 3/1997 | Gudat et al. | 364/424.027 |
| 5,610,972 A | 3/1997 | Emery et al. | 379/58 |
| 5,611,704 A | 3/1997 | Kamizono et al. | 439/164 |
| 5,612,703 A | 3/1997 | Mallinckrodt | 342/457 |
| 5,613,041 A | 3/1997 | Keeler et al. | 395/23 |
| 5,613,205 A | 3/1997 | Dufour | 455/33.2 |

| Patent | Date | Inventor | Class |
|---|---|---|---|
| 5,614,914 A | 3/1997 | Bolgiano et al. | 342/364 |
| 5,619,552 A | 4/1997 | Karppanen et al. | 379/60 |
| 5,621,848 A | 4/1997 | Wang | 395/2.2 |
| 5,625,668 A | 4/1997 | Loomis et al. | 379/56 |
| 5,625,748 A | 4/1997 | McDonough et al. | 395/2.6 |
| 5,629,707 A | 5/1997 | Heuvel et al. | 342/357 |
| 5,631,469 A | 5/1997 | Carrieri et al. | 250/341.5 |
| 5,638,486 A | 6/1997 | Wang et al. | 395/2.45 |
| 5,640,103 A | 6/1997 | Petsche et al. | 324/772 |
| 5,646,630 A | 7/1997 | Sheynblat et al. | 342/357 |
| 5,649,065 A | 7/1997 | Lo et al. | 395/23 |
| 5,652,570 A | 7/1997 | Lepkofker | 340/573 |
| 5,657,487 A | 8/1997 | Doner | 455/456 |
| 5,663,734 A | 9/1997 | Krasner | 342/357 |
| 5,673,322 A | 9/1997 | Pepe et al. | 380/49 |
| 5,675,344 A | 10/1997 | Tong et al. | 342/357 |
| 5,675,788 A | 10/1997 | Husick et al. | 395/615 |
| 5,686,924 A | 11/1997 | Trimble et al. | 342/357 |
| 5,701,328 A | 12/1997 | Schuchman et al. | 375/204 |
| 5,710,758 A | 1/1998 | Soliman et al. | 370/241 |
| 5,710,918 A | 1/1998 | Lagarde et al. | 395/610 |
| 5,717,406 A | 2/1998 | Sanderford et al. | 342/457 |
| 5,719,584 A | 2/1998 | Otto | 342/465 |
| 5,724,047 A | 3/1998 | Lioio et al. | 342/442 |
| 5,724,648 A | 3/1998 | Shaughnessy et al. | 455/56.1 |
| 5,724,660 A | 3/1998 | Kauser et al. | 455/456 |
| 5,727,057 A | 3/1998 | Emery et al. | 379/211 |
| 5,729,549 A | 3/1998 | Kostreski et al. | 370/522 |
| 5,732,074 A | 3/1998 | Spaur et al. | 370/313 |
| 5,732,354 A | 3/1998 | MacDonald | 455/456 |
| 5,736,964 A | 4/1998 | Ghosh et al. | 342/457 |
| 5,737,431 A | 4/1998 | Brandstein et al. | 381/92 |
| 5,740,048 A * | 4/1998 | Abel et al. | 701/200 |
| 5,742,509 A | 4/1998 | Goldberg et al. | 364/449.5 |
| 5,742,905 A | 4/1998 | Pepe et al. | 455/461 |
| 5,754,955 A | 5/1998 | Ekbatani | 455/422 |
| 5,764,756 A | 6/1998 | Onweller | 379/62 |
| 5,774,802 A | 6/1998 | Tell et al. | 455/408 |
| 5,774,805 A | 6/1998 | Zicker | 455/426 |
| 5,774,829 A | 6/1998 | Cisneros et al. | 701/213 |
| 5,774,869 A | 6/1998 | Toader | 705/10 |
| 5,786,773 A | 7/1998 | Murphy | 340/947 |
| 5,787,235 A | 7/1998 | Smith et al. | 395/50 |
| 5,787,354 A | 7/1998 | Gray et al. | 455/456 |
| 5,790,953 A | 8/1998 | Wang et al. | 455/435 |
| 5,790,974 A | 8/1998 | Tognazzini | 701/204 |
| 5,799,016 A | 8/1998 | Onweller | 370/401 |
| 5,616,814 A | 9/1998 | Dennison et al. | 455/456 |
| 5,802,454 A | 9/1998 | Goshay et al. | 455/31.2 |
| 5,802,518 A | 9/1998 | Karaev et al. | 707/9 |
| 5,805,670 A | 9/1998 | Pons et al. | 379/45 |
| 5,809,415 A | 9/1998 | Rossmann | 455/422 |
| 5,815,538 A | 9/1998 | Grell et al. | 375/356 |
| RE35,916 E | 10/1998 | Dennison et al. | 455/456 |
| 5,819,273 A | 10/1998 | Vora et al. | 707/10 |
| 5,819,301 A | 10/1998 | Rowe et al. | 707/513 |
| 5,822,539 A | 10/1998 | van Hoff | 395/200.66 |
| 5,832,367 A | 11/1998 | Bamburak et al. | 455/62 |
| 5,835,857 A | 11/1998 | Otten | 455/410 |
| 5,835,907 A | 11/1998 | Newman | 707/10 |
| 5,838,562 A | 11/1998 | Gudat et al. | 364/424.02 |
| 5,842,130 A | 11/1998 | Oprescu-Surcobe et al. | 455/456 |
| 5,844,522 A | 12/1998 | Sheffer et al. | 342/457 |
| 5,845,198 A | 12/1998 | Bamburak et al. | 455/31.1 |
| 5,845,267 A | 12/1998 | Ronen | 705/40 |
| 5,857,181 A | 1/1999 | Augenbraun | 707/2 |
| 5,864,755 A | 1/1999 | King et al. | 455/404 |
| 5,867,495 A | 2/1999 | Elliott et al. | 370/352 |
| 5,867,799 A | 2/1999 | Lang et al. | 707/1 |
| 5,870,029 A | 2/1999 | Otto et al. | 340/825.36 |
| 5,872,539 A | 2/1999 | Mullen | 342/357 |
| 5,873,040 A | 2/1999 | Dunn et al. | 455/456 |
| 5,873,076 A | 2/1999 | Barr et al. | 707/3 |
| 5,875,394 A | 2/1999 | Daly et al. | 455/411 |
| 5,875,401 A | 2/1999 | Rochkind | 455/466 |
| 5,883,598 A | 3/1999 | Parl et al. | 342/457 |
| 5,890,068 A * | 3/1999 | Fattouche et al. | 455/456 |
| 5,892,441 A | 4/1999 | Woolley et al. | 340/539 |
| 5,893,091 A | 4/1999 | Hunt et al. | 707/3 |
| 5,901,358 A | 5/1999 | Petty et al. | 455/456 |
| 5,903,844 A | 5/1999 | Bruckert et al. | 455/456 |
| 5,905,455 A | 5/1999 | Heger et al. | 342/22 |
| 5,906,655 A | 5/1999 | Fan | 701/216 |
| 5,913,170 A | 6/1999 | Wortham | 455/457 |
| 5,914,675 A | 6/1999 | Tognazzini | 340/989 |
| 5,917,405 A | 6/1999 | Joao | 340/426 |
| 5,917,449 A | 6/1999 | Sanderford et al. | 342/457 |
| 5,917,866 A | 6/1999 | Pon | 375/346 |
| 5,920,873 A | 7/1999 | Van Huben et al. | 707/202 |
| 5,924,090 A | 7/1999 | Krellenstein | 707/5 |
| 5,926,133 A * | 7/1999 | Green | 342/363 |
| 5,933,421 A | 8/1999 | Alamouti et al. | 370/330 |
| 5,933,822 A | 8/1999 | Braden-Harder et al. | 707/5 |
| 5,936,572 A | 8/1999 | Loomis et al. | 342/357 |
| 5,943,014 A | 8/1999 | Gilhousen | 342/465 |
| 5,945,948 A | 8/1999 | Buford et al. | 342/457 |
| 5,949,815 A | 9/1999 | Pon | 375/208 |
| 5,952,969 A | 9/1999 | Hagerman et al. | 342/457 |
| 5,959,568 A | 9/1999 | Woolley | 342/42 |
| 5,963,866 A | 10/1999 | Palamara et al. | 455/456 |
| 5,966,658 A | 10/1999 | Kennedy, III et al. | 455/426 |
| 5,973,643 A | 10/1999 | Hawkes et al. | 342/457 |
| 5,977,913 A | 11/1999 | Christ | 342/465 |
| 5,978,840 A | 11/1999 | Nguyen et al. | 709/217 |
| 5,982,324 A | 11/1999 | Watters et al. | 342/357.06 |
| 5,982,891 A | 11/1999 | Ginter et al. | 380/4 |
| 5,983,214 A | 11/1999 | Lang et al. | 707/1 |
| 5,987,329 A | 11/1999 | Yost et al. | 455/456 |
| 5,999,124 A | 12/1999 | Sheynblat | 342/357.09 |
| 5,999,126 A | 12/1999 | Ito | 342/357.1 |
| 6,009,334 A | 12/1999 | Grubeck et al. | 355/456 |
| 6,014,102 A | 1/2000 | Mitzlaff et al. | 342/456 |
| 6,026,304 A | 2/2000 | Hilsenrath et al. | 455/456 |
| 6,028,551 A | 2/2000 | Schoen et al. | 342/357 |
| 6,029,161 A | 2/2000 | Lang et al. | 707/1 |
| 6,031,490 A | 2/2000 | Forssén et al. | 342/457 |
| 6,034,635 A | 3/2000 | Gilhousen | 342/457 |
| 6,038,668 A | 3/2000 | Chipman et al. | 713/201 |
| 6,046,683 A | 4/2000 | Pidwerbetsky et al. | 340/825.54 |
| 6,047,192 A | 4/2000 | Maloney et al. | 455/456 |
| 6,061,064 A | 5/2000 | Reichlen | 345/418 |
| 6,064,339 A | 5/2000 | Wax et al. | 342/417 |
| 6,064,942 A | 5/2000 | Johnson et al. | 701/213 |
| 6,097,958 A | 8/2000 | Bergen | 455/456 |
| 6,101,178 A | 8/2000 | Beal | 370/336 |
| 6,101,390 A | 8/2000 | Jayaraman et al. | 455/456 |
| 6,101,391 A | 8/2000 | Ishizuka et al. | 455/457 |
| 6,108,555 A | 8/2000 | Maloney et al. | 455/456 |
| 6,157,621 A | 12/2000 | Brown et al. | 370/310 |
| 6,167,274 A | 12/2000 | Smith | 455/456 |
| 6,185,427 B1 | 2/2001 | Krasner et al. | 455/456 |
| 6,236,365 B1 | 5/2001 | LeBlanc et al. | 342/457 |
| 6,240,285 B1 | 5/2001 | Blum et al. | 455/404 |
| 6,243,587 B1 | 6/2001 | Dent et al. | 455/456 |
| 6,249,245 B1 | 6/2001 | Watters et al. | 342/357.03 |
| 6,308,072 B1 | 10/2001 | Labedz et al. | 455/448 |
| 6,321,092 B1 | 11/2001 | Fitch et al. | 455/456 |
| 6,324,404 B1 | 11/2001 | Dennison et al. | 455/456 |
| 6,330,452 B1 | 12/2001 | Fattouche et al. | 455/456 |
| 6,381,464 B1 | 4/2002 | Vannucci | 455/456 |
| 6,549,130 B1 | 4/2003 | Joao | 340/539 |

FOREIGN PATENT DOCUMENTS

EP 0 546 758 A2 12/1992

| | | |
|---|---|---|
| EP | 0 689 369 A1 | 6/1995 |
| EP | 0 870 203 B1 | 12/1996 |
| EP | 0 811 296 B1 | 9/2002 |
| GB | 1 605 207 | 6/1975 |
| GB | 2 155 720 A | 9/1985 |
| WO | WO93/04453 | 3/1993 |
| WO | WO94/27161 | 4/1994 |
| WO | WO94/11853 | 5/1994 |
| WO | WO94/15412 | 7/1994 |
| WO | WO94/27161 | 11/1994 |
| WO | WO96/14588 | 5/1996 |
| WO | WO97/01228 | 1/1997 |
| WO | WO97/22888 | 6/1997 |
| WO | WO97/24010 | 7/1997 |
| WO | WO97/26750 | 7/1997 |
| WO | WO97/38540 | 10/1997 |
| WO | WO97/41654 | 11/1997 |
| WO | WO97/50002 | 12/1997 |
| WO | WO98/00982 | 1/1998 |
| WO | WO98/10307 | 3/1998 |
| WO | PCTUS01/17957 | 6/2001 |
| WO | WO 01/44998 A2 | 6/2001 |
| WO | WO 01/95642 | 12/2001 |
| WO | WO 02/065250 A2 | 8/2002 |

OTHER PUBLICATIONS

Wylie et al., "The Non-Line of Sight Problem in Mobile Location Estimation".
CC Docket No. 94-102, Before the Federal Communications Commission, in the Matter of Revision of the Commission's Rules to Ensure Compatibility with Enhanced 911 Emergency Call Systems; "Comments of Harris Government Communication Systems Division *A Division of Harris Corporation*", filed Sep. 25, 1996.
CC Docket No. 94-102, Before the Federal Communications Commission, in the Matter of Revision of the Commission's Rules to Ensure Compatibility with Enhanced 911 Emergency Call Systems; "Reply Comments of KSI Inc and MULIC Inc." filed Oct. 25, 1996.
CC Docket No. 94-102, Before the Federal Communications Commission, in the Matter of Revision of the Commission's Rules to Ensure Compatibility with Enhanced 911 Emergency Call Systems; *ex parte* communication from Cambridge Positioning Systems Ltd. received Apr. 14, 1997 by the Commission.
CC Docket No. 94-102, Before the Federal Communications Commission, in the Matter of Revision of the Commission's Rules to Ensure Compatibility with Enhanced 911 Emergency Call Systems; *ex parte* communication from GeoTek Communications, Inc. received Apr. 14, 1997 by the Commission.
CC Docket No. 94-102, Before the Federal Communications Commission, in the Matter of Revision of the Commission's Rules to Ensure Compatibility with Enhanced 911 Emergency Call Systems; *ex parte* communication from XYPOINT Corporation, Inc. received Jul. 28, 1997 by the Commission.
CC Docket No. 94-102, Before the Federal Communications Commission, in the Matter of Revision of the Commission's Rules to Ensure Compatibility with Enhanced 911 Emergency Call Systems; *ex parte* communication from National Strategies, Inc., regarding enhanced 911 system trial by TruePosition, Inc. and New Jersey Office of Emergency Telecommunications Services, received Aug. 8, 1997 by the Commission.
CC Docket No. 94-102, Before the Federal Communications Commission, in the Matter of Revision of the Commission's Rules to Ensure Compatibility with Enhanced 911 Emergency Call Systems; *ex parte* communication from SnapTrack, Inc., received Jun. 27, 1997 by the Commission.
Driscoli, "Wireless Caller Location Systems", 1998, *GSP World Advanstar Communications, Inc.*, www.gpsworld.com/1198/1198driscol.html, pp. 1-8.
Junius et al., "New Methods for Processing GSM Radio Measurement Data: Applications for Locating, Handover, and Network Management", 1994, *IEEE*, 0-7803-1927-3/94, pp. 338-342.
Low, "Comparison of Urban Propagation Models with CW-Measurements", 1992, *IEEE*, 0-7963-2/92, pp. 936-942.

"Location Systems and Technologies", 1994, *Wireless Emergency Services JEM Report*, Annex A pp. 42-46 and Appendix A pp. 1-2.
"The Measearch Engine Years: Fit the First", 1992, http://www.conman.org/people/spc/refs/search.hp1.html, pp. 1-3.
Fechner et al., "A Hybrid Neural Network Architecture for Automatic Object Recognition", 1994, *IEEE*, pp. 187-194.
Kosko, "Fuzzy Systems as Universal Approximators", 1994, *IEEE*, 00188-9340/94, pp. 1329-1333.
Mardiraju et al., "Neural Networks for Robust Image Feature Classification: A Comparative Study", 1994, *IEEE*, 0-7803-2026-3/94, pp. 423-430.
Sousa et al., "Delay Spread Measurements for the Digital Cellular Channel in Toronto", Nov. 1994, *IEEE*, vol. 43, No. 4, pp. 837-847.
Goldbsmith et al., "A Measurement-Based Model for Predicting Coverage Areas of Urban Microcells", Sep. 1993, *IEEE*, vol. 11, No. 7, pp. 1013-1023.
Ichitsubo et al., "A Statistical Model for Microcellular Multipath Propagation Environment", Prior to Dec. 22, 1997, *Wireless Systems Laboratories*, Japan, pp. 1-6.
Wittenben et al., "A Low Cost Noncoherent Receiver with Adaptive Antenna Combing for High Speed Wireless Lans", Prior to Dec. 22, 1997, *ASCOM Systec AG*, pp. 1-4.
Gaspard et al., "Position Assignment in Digital Cellular Mobile Radio Networks (e.g. GSM) derived from Measurements at the Protocol Interface", Prior to Dec. 22, 1997, pp. 1-5.
Dutta et al., "Modified Adaptive Multiuser Detector for DS-CDMA in Multipath Fading", Prior to Dec. 22, 1997, pp. 1-7.
Wolfe et al., "Field Strength Prediction in Indoor Environments with Neural Networks", Prior to Dec. 22, 1997, pp. 1-5.
Lawrence et al., "Northern Light Search Engine Leads the Pack-Others Fall Behind", May 1, 1998, *Online Newsletter*, 19(5)pp. 1-2.
Johnson, "Smart Technology Busting Out All Over Web", Jun. 15, 1998, *Electronic Enginerring Times*, 1012 pp. 1-6.
Notess, "Internet Search Engine Update", Jul. 1, 1998, *Online*, vol. v22:n4, pp. 1-3.
Gallant, "Neural Network Learning and Expert Systems", 1994, *The MIT Press*, pp. 132-137.
Chan et al., "Multipath Propagation Effects on a CDMA Cellular System", 1994, *IEEE*, pp. 848-855.
Meadow, "Text Information Retrieval Systems", 1992, *Academic Press*, pp. 204-209.
Iwayama et al., "Cluster-Based Text Catagorization: A Comparison of Category Search Strategies", 1995, *ACM-SIGIR*, pp. 273-279.
Botafogo, "Cluster Analysis for Hypertext Systems", Jun. 1993, *ACM-SIRIG*, pp. 116-124.
Wang Baldonado et al., "SenseMaker: An Information-Exploration Inferface Supporting the Contextual Evolution of a User s Interests", 1997, *ACM-CHI*, pp. 11-18.
Baldazo, "Navigating with a Web Compass: Quarterdeck Harnesses Leading-edge "Metasearch" Technology to Create a Smart Agent that Searches the Web and Organizes the Results", Mar. 1996, *BYTE*, pp. 97-98.
Striglis et al., "A Multistage RAKE Receiver for Improved Capacity of CDMA Systems", 1994, *IEEE Vehicular Technology Conference*, pp. 1-5.
Weiss et al., "HyPursuit: A Hierarcical Network Search Engine that Exploits Content-Link Hypertext Clustering", 1996, *Hypertext*, pp. 180-193.
U.S. Appl. No. 09/230,109, filed Jan. 22, 1999, LeBlanc et al.
U.S. Appl. No. 09/299,115, filed Apr. 23, 1999, Dupray.
U.S. Appl. No. 09/230,109, filed Jan. 22, 1999 Entitled "Location of a Mobile Station Using a Plurality of Commercial Wireless Infrastructures"(Pending).
U.S. Appl. No. 09/820,584, filed Mar. 28, 2001 Entitled "Location of a Mobile Station Using a Plurality of Commericial Wireless Infrastructures".
Dupray et al., U.S. Appl. No. 09/770,838, Entitled 'Location of a Mobile Station' filed Jan. 26, 2001.
Lepkofker: U.S. Appl. No. 08/246,149, Entitled "Individual Location System"; May 19, 1994.
Maloney et al.; U.S. Appl. No. 60/017,899, Entitled "Enhanced Time-Difference Localization System"; May 17, 1996.

Christ, U.S. Appl. No. 60/038,037, Entitled "Method and Apparatus for Tracking and Locating Personnel" filed Feb. 7, 1997.

Maloney; U.S. Appl. No. 60/035,691, Entitled "Robust, Efficient, Localization System" filed Jan. 16, 1997.

Maloney; U.S. Appl. No. 60/017,2699, Entitled "Efficient, Distributed, Time Difference Localization System" filed May 13, 1996.

U.S. Appl. No. 08/355,901, Entitled "MICR-Miniature Emergency Geo-Location Beacon System for Personal Security", filed Dec. 13, 1994.

Communication from U.S. Patent and Trademark Office Re: U.S. Appl. No. 08/355,901 Paper from Examiner M. Blum of Group Art Unit 2202.

Communication from U.S. Patent and Trademark Office Re: U.S. Appl. No. 08/355,901 Response from Examiner regarding communication filed on Dec. 26, 1995 Dated Jul. 23, 1996.

Communication from U.S. Patent and Trademark Office Re: U.S. Appl. No. 08/355,901 Examiner Interview Summary Record Dated: Aug. 13, 1996.

Communication from U.S. Patent and Trademark Office Re: U.S. Appl. No. 08/355,901 Office Action Summary Dated: Mar. 14, 1997.

Communication from U.S. Patent and Trademark Office Re: U.S. Appl. No. 08/355,901 Office Action Summary Dated: Mar. 17, 1998.

Communication from U.S. Patent and Trademark Office Re: U.S. Appl. No. 08/355,901 Office Action Summary Dated: Jun. 24, 1998.

Communication from U.S. Patent and Trademark Office Re: U.S. Appl. No. 08/355,901 Advisory Action Dated: Aug. 11, 1998.

Communication from U.S. Patent and Trademark Office Re: U.S. Appl. No. 08/355,901 Advisory Action Dated: Sep. 9, 1998.

Communication from U.S. Patent and Trademark Office Re: U.S. Appl. No. 08/355,901 Advisory Action Dated: Oct. 9, 1998.

Communication from U.S. Patent and Trademark Office Re: U.S. Appl. No. 08/355,901 Advisory Action Dated: Nov. 4, 1998.

Ergon Proprietary; "Performance Analyses Brief: Microminiature Emergency Locator Systems (MELS)"; May 1996.

Loran; 1992; "Users Handbook 1992 Edition"; *U.S. Coast Guard, Radionavigation Division*; 28 pgs.

Newton; 1981; "The Near-Term Potential of Doppler Location"; *John Hopkins APL Technical Digest*; pp. 16-31.

"ARGOS: Basic Description of the Argos System"; *ARGOS*; 7 pgs.

U.S. Appl. No. 08/191,984, filed Feb. 22, 1994, Loomis et al.

Rizzo et al.; "Integration of Location Services in the Open Distributed Office"; *Technical Report 14-94, Computing Laboratory, University of Kent, Cantebury, United Kingdom*; Aug. 1994; pp. 1-14.

Caffery, J. and Stüüber, G. L., "Vehicle Location and Tracking for IVHS in CDMA Microcells," *International Symposium on Personal, Indoor, and Mobile Radio Communications*, pp. 1227-1231, Sep. 1994.

Caffery et al.; "Radio Location in Urban CDMA Microcells"; *International Symposium on Personal, Indoor, and Mobile Radio Communications*, Sep. 1995; 5 pgs.

Beck et al.; "Simulation Results on the Downlink of a Qualcomm-like DS-CDMA-System Over Multipath fading channels"; Sep. 1994 pp. 1-7.

Pop et al.; "Site Engineering for Indoor Wireless Spread Spectrum Communication"; Jun. 2001; 3 pgs.

Caffery et al.; "Overview of Radiolocation in CDMA Cellular Systems"; *IEEE Communications Magazine*; Apr. 1998; pp. 38-45.

Salcic;"AGPCS—An Automatic GSM-based Positioning and Communication System" *Proceedings of GeoComputation 1997 & SIRC 1997*; Aug. 1997; pp. 15-22.

Ramanathan et al.; "A Survey of Routing Techniques for Mobile Communications Network"; *Mobile Networks and Applications*; Oct. 1996; vol. 1(2): pp. 1-31.

Pending Claims only: U.S. Appl. No. 10/262,413, filed Sep. 30, 2002 entitled "Wireless Location Using Hybrid Techniques," which is a continuation of the above listed U.S. Appl. No. 09/194,367, filed Nov. 24, 1998 entitled "Wireless Location Using Multiple Mobile Station Location Techniques," which is the U.S. National Phase Application of International Application Ser. No. PCT/US97/15892 with International Filing Date of Sep. 8, 1997, which was published under International Publication No. WO 98/10307 with International Filing Date of Mar. 12, 1998 (Copy of specification submitted previously in IDS.) (1003-2).

Pending Claims only: U.S. Appl. No. 10/262,338 filed Sep. 30, 2002 entitled "Wireless Location Using Signal Direction and Time Difference of Arrival," which is a continuation of the above listed U.S. Appl. No. 09/194,367 filed Nov. 24, 1998 entitled "Wireless Location Using Multiple Mobile Station Location Techniques," which is the U.S. National Phase Application of International Application Ser. No. PCT/US97/15892 with International Filing Date of Sep. 8, 1997, which was published under International Publication No. WO 98/10307 with International Filing Date of Mar. 12, 1998 (Copy of specification submitted previously in IDS.) (1003-3).

U.S. Appl. No. 09/230,109.

U.S. Appl. No. 10/297,449.

U.S. Appl. No. 10/337,807.

Kennemann, Oirik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.

Schopp, Michael, "User Modelling and Performance Evaluation of Distrubuted Location Management for Personal Communications Services," Proceedings of the 15th International Teletraffic Congress (ITC) 15, Washington, D.C., 1997, S. 23-34.

Smith, Jr., "Passive Location of Mobile Cellular Telephone Terminals," IEEE, CH3031-2/91/0000-0221; 1991 pp. 221-225.

Callan, James P., et al., "Searching Distributed Collections with Inference Networks," 18th Annual International ACM SIGIR Conference on Research and Development in Information Retrieval, 1995.

Orphanoudakis, C.E., et al., "$I^2$ Cnet: Content-Based Similarity Search in Geographically Distributed Repositories of Medical Images," vol. 20(4), pp. 193-207, *Computerized Medical Imaging and Graphics*, 1996.

Miller, RT, et al., "Protein fold recognition by sequence threading: tools and assessment techniques," Journal Announcement, Department of Biochemistry and Molecular Biology, University College, London, United Kingdom, Jan. 1996.

Dalley, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.

Dalley, D.J., et al., "ITS Data Fusion," Final Research Report, Research Project T9903, Task 9, ATIS/ATMS Regional IVHS Demonstration, University of Washington, Apr. 1996.

Dartmouth College, "Soldiers, Agents and Wireless Networks: A Report on a Military Application," PAAM 2000.

Bass, Tim, "Intrusion Detection Systems & Multisensor Data Fusion: Creating Cyberspace Situational Awareness," Communications of the ACM, date unknown.

Evans, 1998, "New Satellites for Personal Communications," *Scientfic American*, 278 (4):70-77.

Hill, 1998, "Terrestrial Wireless Networks, *Scientfic American*, 278 (4):86-91.

Pelton, 1998, "Telecommunications for the 21st Century," *Scientfic American*, 278 (4):80-85.

\* cited by examiner

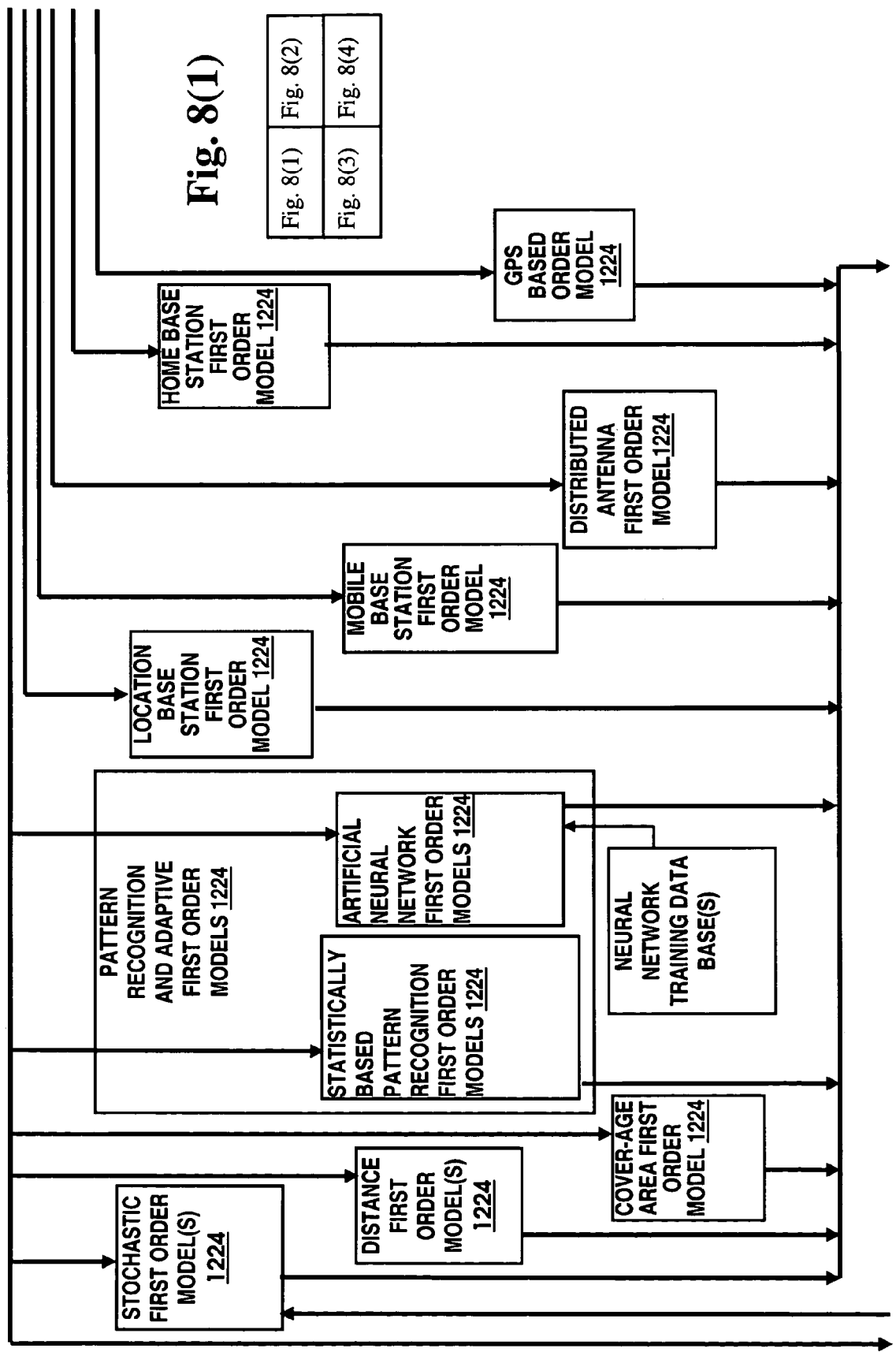

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est:* Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [-1.0, +1.0] indicating a likelihood that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est." If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem,

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster*: Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

FIG. 9B

MULTIPLE EVALUATORS FOR EVALUATION OF A PURALITY OF CONDITIONS

CROSS-REFERENCE TO RELATED APPLICATIONS

The present patent application claims the benefit of U.S. Provisional Application No. 60/062,931, filed Oct. 21, 1997; the present application also is: (a) a continuation-in-part of co-pending U.S. application Ser. No. 09/194,367 filed Nov. 24, 1998, which claims the benefit of International Application No. PCT/US97/15892 filed Sep. 8, 1997, and (b) a continuation-in-part of International Application No. PCT/US97/15892 filed Sep. 8, 1997; both (a) and (b) claim the benefit of the following U.S. Provisional Applications: U.S. Provisional Application No. 60/056,590 filed Aug. 20, 1997; U.S. Provisional Application No. 60/044,821 filed Apr. 25, 1997; and U.S. Provisional Application 60/025,855 filed Sep. 9, 1996. The U.S. Provisional Application No. 60/062, 931 and the U.S. Application No. 09/194,367 are hereby fully incorporated by reference.

FIELD OF THE INVENTION

The present invention is directed generally to a system and method for locating people or objects, and in particular, to a system and method for locating a wireless mobile station using a plurality of mobile station location estimators. More generally, the present invention is directed to a computational system and method for calibrating the relative performance of multiple models, wherein each such model is capable of being activated for generating hypotheses (e.g., estimates and/or predictions) of an unknown condition. Additionally, the present invention is directed to a computational system and method for generating enhanced hypotheses of the unknown condition, wherein the model generated hypotheses are used as queries into an archive that associates: (a) historical model generated hypotheses, (b) model input data used in generating the model hypotheses, and (c) verified hypotheses to which the model input data is known to correspond.

BACKGROUND

Introduction

Wireless communications systems are becoming increasingly important worldwide. Wireless cellular telecommunications systems are rapidly replacing conventional wire-based telecommunications systems in many applications. Cellular radio telephone networks ("CRT"), and specialized mobile radio and mobile data radio networks are examples. The general principles of wireless cellular telephony have been described variously, for example in U.S. Pat. No. 5,295,180 to Vendetti, et al, which is incorporated herein by reference.

There is great interest in using existing infrastructures for wireless communication systems for locating people and/or objects in a cost effective manner. Such a capability would be invaluable in a variety of situations, especially in emergency or crime situations. Due to the substantial benefits of such a location system, several attempts have been made to design and implement such a system.

Systems have been proposed that rely upon signal strength and trilateralization techniques to permit location include those disclosed in U.S. Pat. Nos. 4,818,998 and 4,908,629 to Apsell et al. ("the Apsell patents") and U.S. Pat. No. 4,891,650 to Sheffer ("the Sheffer patent"). However, these systems have drawbacks that include high expense in that special purpose electronics are required. Furthermore, the systems are generally only effective in line-of-sight conditions, such as rural settings. Radio wave surface reflections, refractions and ground clutter cause significant distortion, in determining the location of a signal source in most geographical areas that are more than sparsely populated. Moreover, these drawbacks are particularly exacerbated in dense urban canyon (city) areas, where errors and/or conflicts in location measurements can result in substantial inaccuracies.

Another example of a location system using time of arrival and triangulation for location are satellite-based systems, such as the military and commercial versions of the Global Positioning Satellite system ("GPS"). GPS can provide accurate position determination (i.e., about 100 meters error for the commercial version of GPS) from a time-based signal received simultaneously from at least three satellites. A ground-based GPS receiver at or near the object to be located determines the difference between the time at which each satellite transmits a time signal and the time at which the signal is received and, based on the time differentials, determines the object's location. However, the GPS is impractical in many applications. The signal power levels from the satellites are low and the GPS receiver requires a clear, line-of-sight path to at least three satellites above a horizon of about 60 degrees for effective operation. Accordingly, inclement weather conditions, such as clouds, terrain features, such as hills and trees, and buildings restrict the ability of the GPS receiver to determine its position. Furthermore, the initial GPS signal detection process for a GPS receiver is relatively long (i.e., several minutes) for determining the receiver's position. Such delays are unacceptable in many applications such as, for example, emergency response and vehicle tracking.

Summary of Factors Affecting RF Propagation

The physical radio propagation channel perturbs signal strength, frequency (causing rate changes, phase delay, signal to noise ratios (e.g., C/I for the analog case, or $E_{b/No}$, RF energy per bit, over average noise density ratio for the digital case) and Doppler-shift. Signal strength is usually characterized by:

Free Space Path Loss ($L_p$)
Slow fading loss or margin ($L_{slow}$)
Fast fading loss or margin ($L_{fast}$)

Loss due to slow fading includes shadowing due to clutter blockage (sometimes included in Lp). Fast fading is composed of multipath reflections which cause: 1) delay spread; 2) random phase shift or Rayleigh fading; and 3) random frequency modulation due to different Doppler shifts on different paths.

Summing the path loss and the two fading margin loss components from the above yields a total path loss of:

$$L_{total} = L_p + L_{slow} + L_{fast}$$

Referring to FIG. 3, the figure illustrates key components of a typical cellular and PCS power budget design process. The cell designer increases the transmitted power $P_{TX}$ by the shadow fading margin $L_{slow}$ which is usually chosen to be within the 1–2 percentile of the slow fading probability density function (PDF) to minimize the probability of unsatisfactorily low received power level $P_{RX}$ at the receiver. The $P_{RX}$ level must have enough signal to noise energy level (e.g., 10 dB) to overcome the receiver's internal noise level (e.g., −118dBm in the case of cellular 0.9 GHz), for a minimum voice quality standard. Thus in the example $P_{RX}$ must never be below −108 dBm, in order to maintain the quality standard.

Additionally the short term fast signal fading due to multipath propagation is taken into account by deploying fast fading margin $L_{fast}$, which is typically also chosen to be a few percentiles of the fast fading distribution. The 1 to 2 percentiles compliment other network blockage guidelines. For example the cell base station traffic loading capacity and network transport facilities are usually designed for a 1–2 percentile blockage factor as well. However, in the worst-case scenario both fading margins are simultaneously exceeded, thus causing a fading margin overload.

SUMMARY

Objects of the Disclosure

It is an objective of the present disclosure to present a system and method for to wireless telecommunication systems for accurately locating people and/or objects in a cost effective manner. Additionally, it is an objective of the present disclosure to present such location capabilities using the measurements from wireless signals communicated between mobile stations and a network of base stations, wherein the same communication standard or protocol is utilized for location as is used by the network of base stations for providing wireless communications with mobile stations for other purposes such as voice communication and/or visual communication (such as text paging, graphical or video communications). Related objectives for the present disclosure include presenting a system and method that:

(1.1) can be readily incorporated into existing commercial wireless telephony systems with few, if any, modifications of a typical telephony wireless infrastructure;

(1.2) can use the native electronics of typical commercially available telephony wireless mobile stations (e.g., handsets) as location devices;

(1.3) can be used for effectively locating people and/or objects wherein there are few (if any) line-of-sight wireless receivers for receiving location signals from a mobile station (herein also denoted MS);

(1.4) can be used not only for decreasing location determining difficulties due to multipath phenomena but in fact uses such multipath for providing more accurate location estimates;

(1.5) can be used for integrating a wide variety of location techniques in a straight-forward manner;

(1.6) can substantially automatically adapt and/or (re)train and/or (re)calibrate itself according to changes in the environment and/or terrain of a geographical area where the novel method and/or system of the present disclosure is utilized; and (1.7) can utilize a plurality of wireless location estimators based on different wireless location technologies (e.g., GPS location techniques, terrestrial base station signal timing techniques for triangulation and/or trilateration, wireless signal angle of arrival location techniques, techniques for determining a wireless location within a building, techniques for determining a mobile station location using wireless location data collected from the wireless coverage area for, e.g., location techniques using base station signal coverage areas, signal pattern matching location techniques and/or stochastic techniques), wherein each such estimator may be activated independently of one another, whenever suitable data is provided thereto and/or certain conditions, e.g., specific to the estimator are met;

(1.8) can provide a common interface module from which a plurality of the location estimators can be activated and/or provided with input;

(1.9) provides resulting mobile station location estimates to location requesting applications (e.g., for 911 emergency, the fire or police departments, taxi services, vehicle location, etc.) via an output gateway, wherein this gateway;

(a) routes the mobile station location estimates to the appropriate location application(s) via a communications network such as a wireless network, a public switched telephone network, a short messaging service (SMS), and the Internet, (b) determines the location granularity and representation desired by each location application requesting a location of a mobile station, and/or (c) enhances the received location estimates by, e.g., performing additional processing such as "snap to street" functions for mobile stations known to reside in a vehicle.

Yet another objective is to provide a low cost location system and method, adaptable to wireless telephony systems, for using simultaneously a plurality of location techniques for synergistically increasing MS location accuracy and consistency.

It is yet another objective that at least some of the following MS location techniques can be utilized by various embodiments of the novel method and/or system of the present disclosure:

(2.1) time-of-arrival wireless signal processing techniques;

(2.2) time-difference-of-arrival wireless signal processing techniques;

(2.3) adaptive wireless signal processing techniques having, for example, learning capabilities and including, for instance, artificial neural net and genetic algorithm processing;

(2.4) signal processing techniques for matching MS location signals with wireless signal characteristics of known areas;

(2.5) conflict resolution techniques for resolving conflicts in hypotheses for MS location estimates;

(2.6) enhancement of MS location estimates through the use of both heuristics and historical data associating MS wireless signal characteristics with known locations and/or environmental conditions.

Yet another objective is to provide the capability to activate serially one or more groups of one or more location estimating models, wherein each model may generate a location estimate for locating the same MS. Thus, for example, if a first group of models did not yield an appropriate location estimate, then another group may be activated. Accordingly, a first group may include a model based on global positioning satellite (GPS) technology, whereas a second group (or other group) may include base station triangulation models and pattern recognition models.

Yet another objective is to provide location estimates in terms of time vectors, which can be used to establish motion, speed, and an extrapolated next location in cases where the MS signal subsequently becomes unavailable.

Definitions

The following definitions are provided for convenience. In general, the definitions here are also defined elsewhere in this document as well.

(3.1) The term "wireless" herein is, in general, an abbreviation for "digital wireless", and in particular, "wireless" refers to digital radio signaling using one of standard digital protocols such as CDMA, NAMPS, AMPS, TDMA and GSM, as one skilled in the art will understand.

(3.2) As used herein, the term "mobile station" (equivalently, MS) refers to a wireless device that is at least a transmitting device, and in most cases is also a wireless receiving device, such as a portable radio telephony handset. Note that in some contexts herein instead or in addition to MS, the following terms are also used: "personal station" (PS), and "location unit" (LU). In general, these terms may be considered synonymous. However, the later two terms may be used when referring to reduced functionality communication devices in comparison to a typical digital wireless mobile telephone.

(3.3) The term, "infrastructure", denotes the network of telephony communication services, and more particularly, that portion of such a network that receives and processes wireless communications with wireless mobile stations. In particular, this infrastructure includes telephony wireless base stations (BS) such as those for radio mobile communication systems based on CDMA, AMPS, NAMPS, TDMA, and GSM wherein the base stations provide a network of cooperative communication channels with an air interface with the MS, and a conventional telecommunications interface with a Mobile Switch Center (MSC). Thus, an MS user within an area serviced by the base stations may be provided with wireless communication throughout the area by user transparent communication transfers (i.e., "handoffs") between the user's MS and these base stations in order to maintain effective telephony service. The mobile switch center (MSC) provides communications and control connectivity among base stations and the public telephone network.

(3.4) The phrase, "composite wireless signal characteristic values" denotes the result of aggregating and filtering a collection of measurements of wireless signal samples, wherein these samples are obtained from the wireless communication between an MS to be located and the base station infrastructure (e.g., a plurality of networked base stations). However, other phrases are also used herein to denote this collection of derived characteristic values depending on the context and the likely orientation of the reader. For example, when viewing these values from a wireless signal processing perspective of radio engineering, as in the descriptions of the subsequent Detailed Description sections concerned with the aspects of the present disclosure for receiving MS signal measurements from the base station infrastructure, the phrase typically used is: "RF signal measurements". Alternatively, from a data processing perspective, the phrases: "location signature cluster" and "location signal data" are used to describe signal characteristic values between the MS and the plurality of infrastructure base stations substantially simultaneously detecting MS transmissions. Moreover, since the location communications between an MS and the base station infrastructure typically include simultaneous communications with more than one base station, a related useful notion is that of a "location signature" which is the composite wireless signal characteristic values for signal samples between an MS to be located and a single base station. Also, in some contexts, the phrases: "signal characteristic values" or "signal characteristic data" are used when either or both a location signature(s) and/or a location signature cluster(s) are intended.

SUMMARY DISCUSSION

In one embodiment, the present disclosure relates to a novel method and system for performing wireless mobile station location. In particular, the present disclosure presents a wireless mobile station location computing method and system that utilizes multiple wireless location computational estimators (these estimators also denoted herein as MS location hypothesizing computational models, "first order models" and/or "location estimating models"), for providing a plurality of location estimates of a target mobile station, wherein ambiguities and/or conflicts between the location estimates may be effectively and straightforwardly resolved. More particularly, the present disclosure presents a technique for calibrating the performance of each of the location estimators so that a confidence value (e.g., a probability) can be assigned to each generated location estimate. Additionally, the present disclosure presents provides a straightforward technique for using the confidence values (probabilities) for deriving a resulting most likely location estimate of a target wireless mobile station.

More generally, the present disclosure relates to a novel computational method and architecture for synergistically combining the results of a plurality of computational models in a straightforward way that allows the models to be calibrated relative to one another so that differences in results generated by the models can be readily resolved. Accordingly, the computational method and architecture of the present disclosure may be applied to wide range applications where synergies between multiple models are expected to be enhance performance.

For a particular application having a plurality of computational models (each generating an estimate of a desired result(s) in a space of hypothesis results), the novel method and/or system present herein may be described, at a high level, as any method or system that performs the following steps:

(4.1.1) A step of determining a classification scheme for determining an input class for each input data set supplied (e.g., substantially simultaneously) to the plurality of computational models (FOMs), wherein for each range, R, of a plurality ranges of desired results in the hypothesis space, there is an input class, and the input data sets of this input class are expected to have their corresponding desired result(s) in the range R. Some examples will be illustrative. For a wireless location system, the present step determines geographical subareas of a wireless network coverage area that have "similar" wireless signal characteristics. Such subareas may be relatively easy to determine, and there may be no constraint on the size of the subareas. The intention is to determine: (a) such a subarea as only a general area where a target MS must reside, and (b) the subarea should be relatively homogeneous in its wireless signaling characteristics. Accordingly, (a) and (b) are believed to be substantially satisfied by grouping together into the same input class the wireless signal data sets (i.e., input data sets) from corresponding target MS locations wherein at each of the target MS locations: (i) the set of base stations detected by the target MS (at the location) is substantially the same, and/or (b) the set of base stations detecting the target MS is substantially the same set of base stations.

Note that there are numerous techniques and commercial packages for determining such a classification scheme. In particular, the statistically based system, "CART" (an acronym for Classification and Regression Trees) by ANGOSS Software International Limited of Toronto, Canada is one such package. Further, note that this step is intended to provide reliable but not necessarily highly accurate ranges R for the desired results. Also note that in some applications there may be only a single input class, thus assuring high reliability (albeit, likely low accuracy). Accordingly, in this latter case the present step may be omitted.

(4.1.2) A step of calibrating each of the plurality of computational models (FOMs) so that each subsequent hypothesis generated by one of the models has a confidence value (e.g., probability) associated therewith that is indicative of the likeliness of the hypothesis being correct. The calibrating of this step is performed using the input classification scheme determined in the above step (4.1.1). In one embodiment of this step, each model is supplied with inputs from a given fixed input class, wherein each of these inputs have corresponding known results that constitute a correct hypothesis (i.e., a desired result). Subsequently, the performance of each model is determined for the input class and a confidence value is assigned to the model for inputs received from the input class. Note that this procedure is repeated with each input class available from the input classification scheme. In performing this procedure, an application domain specific criteria is used to determine whether the hypotheses generated by the models identify the desired results in the hypothesis space. Accordingly, for each of the models, when supplied with an input data set from a fixed input class, the hypothesis generated by the model will be given the confidence value determined for this input class as an indication of the likelihood of the generated hypothesis being correct (i.e., the desired result). Note that the confidence value for each generated hypothesis may be computed as a probability that the hypothesis is correct.

Note that for a wireless location application, the criteria (in one embodiment) is whether a location hypothesis contains the actual location where the MS was when the corresponding input data set (wireless signal measurements) was communicated between this MS and the wireless network.

For applications related to the diagnosis of electronic systems, this criteria may be whether an hypothesis identifies a proper functional unit such as a circuit board or chip.

For economic forecasting applications, this criteria may be whether an hypothesis is within a particular range of the correct hypothesis. For example, if an application according to the novel method and/or system disclosed herein predicts the U.S. gross national product (GNP) six months into the future according to certain inputs (defining input data sets), then hypotheses generated from historical data that has associated therewith the actual corresponding GNP (six months later), may be used for calibrating each of the plurality of economic forecasting models (FOMs). Thus, the application specific criteria for this case may be that a generated hypothesis is within, say, 10% of the actual corresponding six month GNP prediction.

Note that the applications described herein are illustrative, but not comprehensive of the scope of the novel method and/or system disclosed herein. Further note that this step typically is performed at least once prior to inputting input data sets whose resulting hypotheses are to be used to determine the desired or correct results. Additionally, once an initial calibration has been performed, this step may also be performed: (a) intermittently between the generation of hypotheses, and/or (b) substantially continuously and in parallel with the generation of hypotheses by the models.

(4.1.3) A step of providing one or more input data sets to the models (FOMs) for generating a plurality of hypotheses, wherein the result(s) desired to be hypothesized are unknown. Moreover, note that the generated hypotheses are preferred to have a same data structure definition.

For example, for a wireless location system, the present step provides an input data set including the composite signal characteristic values to one or more MS location hypothesizing computational models, wherein each such model subsequently determines one or more initial estimates (also denoted location hypotheses) of the location of the target MS. Note that one or more of these model may be based on, for example, the signal processing techniques 2.1 through 2.3 above.

(4.1.4) A step of adjusting or modifying the generated hypotheses output by the models, wherein for such an hypothesis, adjustments may be performed on one or both of its hypothesized result H.R, and its confidence value for further enhancing the performance of the novel method and/or system of the present disclosure. In one embodiment of this step, H.R is used as an index to retrieve other results from an archival database, wherein this database associates hypothesized results with their corresponding desired or correct results. Thus, H.R may be used to identify data from other archived hypothesized results that are "nearby" to H.R, and subsequently use the nearby data to retrieve the corresponding desired results. Thus, the set of retrieved desired results may be used to define a new "adjusted" hypothesis.

For example, for a wireless location system utilizing the novel method and/or system of the present disclosure, each location hypothesis, H, identifies an area for a target MS, and H can used to identify additional related locations included in archived hypotheses generated by the same FOM as generated H. For instance, such related locations may be the area centroids of the archived hypotheses, wherein these centroids reside within the area hypothesized by H. Accordingly, such centroids may be used to retrieve the corresponding actual verified MS locations (i.e., the corresponding desired results), and these retrieved verified locations may be used to generate a new adjusted area that is likely to be more accurate than H. In particular, a convex hull of the verified locations may be used as a basis for determining a new location hypothesis of the target MS.

For other application domains, the present step requires a first technique to determine both "nearby" archived data from previously archived hypotheses, and a second technique to determine an "adjusted" hypothesis from the retrieved desired results. In general, such techniques can be relatively straightforward to provide when the hypothesized results reside in a vector space, and more particularly, in a Cartesian product of the real numbers. Accordingly, there are numerous applications that can be configured to generate hypothesized results in a vector space (or Cartesian product of the real numbers). For instance, economic financial forecasting applications typically result in numeric predictions where the first and second techniques can be, e.g., substantially identical to the centroid and convex hull techniques for the wireless location application; and (4.1.5) A step of subsequently computing a "most likely" estimate is computed for outputting to a requesting application (e.g., a location requesting application, such as 911 emergency, the fire or police departments, taxi services, etc.). Note that in computing the most likely target MS location estimate a plurality of location hypotheses may be taken into account. In fact, it is an important aspect of the novel method and/or system disclosed herein that the most likely MS location estimate is determined by computationally forming a composite MS location estimate utilizing such a plurality of location hypotheses so that, for example, location estimate similarities between location hypotheses can be effectively utilized.

Referring to (4.1.) there may be hypotheses for estimating not only desired result(s), but also hypotheses may be generated that indicate where the desired result(s) is not. Thus, if the confidence values are probabilities, an hypothesis may be generated that has a very low (near zero) probability of having the desired result. As an aside, note that in general, for each generated hypothesis, H, having a probability, P, there is a dual hypothesis $H^c$ that may be generated, wherein the $H^c$ represents the complementary hypothesis that the desired result is in the space of hypothesized results outside of H. Thus, the probability that the desired result(s) is outside of the result hypothesized by H is 1−P. Accordingly, with each location hypothesis having a probability favorably indicating where a desired result may be (i.e., P>=0.5), there is a corresponding probability for the complement hypothesis that indicates where the desired result(s) is unlikely to be. Thus, applying this reasoning to a wireless location application utilizing the novel method and/or system of the present disclosure, then for an hypothesis H indicating that the target MS is in a geographical area A, there is a dual location estimate $H^c$ that may be generated, wherein the $H^c$ represents the area outside of A and the probability that the target MS is outside of A is 1−P. Thus, with each location hypothesis having a probability favorably indicating where a target MS may be (i.e., P>=0.5), there is a corresponding probability for the complement area not represented by the location hypothesis that does not favor the target MS being in this complement area. Further, note that similar dual hypotheses can be used in other applications using the multiple model architecture of the present disclosure when probabilities are assigned to hypotheses generated by the models of the application.

Referring to (4.1.4) as it relates to a wireless location system provided by the novel method and/or system of the present disclosure, note that, it is an aspect of the present disclosure to provide location hypothesis enhancing and evaluation techniques that can adjust target MS location estimates according to historical MS location data and/or adjust the confidence values of location hypotheses according to how consistent the corresponding target MS location estimate is: (a) with historical MS signal characteristic values, (b) with various physical constraints, and (c) with various heuristics. In particular, the following capabilities are provided by the novel method and/or system of the present disclosure:

(5.1) A capability for enhancing the accuracy of an initial location hypothesis, H, generated by a first order model, $FOM_H$, by using H as, essentially, a query or index into an historical data base (denoted herein as the location signature data base), wherein this data base includes: (a) a plurality of previously obtained location signature clusters (i.e., composite wireless signal characteristic values) such that for each such cluster there is an associated actual or verified MS locations where an MS communicated with the base station infrastructure for locating the MS, and (b) previous MS location hypothesis estimates from $FOM_H$ derived from each of the location signature clusters stored according to (a);

(5.2) A capability for analyzing composite signal characteristic values of wireless communications between the target MS and the base station infrastructure, wherein such values are compared with composite signal characteristics values of known MS locations (these latter values being archived in the location signature data base). In one instance, the composite signal characteristic values used to generate various location hypotheses for the target MS are compared against wireless signal data of known MS locations stored in the location signature data base for determining the reliability of the location hypothesizing models for particular geographic areas and/or environmental conditions;

(5.3) A capability for reasoning about the likeliness of a location hypothesis wherein this reasoning capability uses heuristics and constraints based on physics and physical properties of the location geography;

(5.4) An hypothesis generating capability for generating new location hypotheses from previous hypotheses.

Note, (5.5) and (5.6) following are alternative descriptions of various inventive aspects of the novel method and/or system of the present disclosure;

(5.5) A method for determining from a plurality of conditions a particular unknown condition, wherein for substantially every one of said conditions there is a corresponding set of measurements for identifying the condition, comprising:

classifying or partitioning said plurality of conditions into a collection of classes, wherein for each said class, and each of said conditions therein, said corresponding set of measurements for identifying the condition is related to said corresponding set of measurements for identifying another one of said conditions in said class;

determining a plurality of estimators for estimating said conditions when supplied with said corresponding set of measurements;

storing a plurality of data item collections, wherein for each of a plurality of said conditions, there is one of said data item collections having:

(a1) a representation of the condition, and (a2) a representation of a set of measurements for identifying said condition of (a1);

for each of said estimators, and each of class of a plurality of said classes, perform (b1) and (b2):

(b1) inputting said representation of (a2) of each of a plurality of said data item collections to the estimator for generating a corresponding estimated condition, wherein said representation (a2) is contained in the class:

(b2) comparing, for each of said data item collections, said representation (a1) with said corresponding estimate for determining a corresponding performance measurement of the estimator for the class:

activating a first and a second of said estimators with a particular set of measurements for estimating, respectively, a first and a second estimate of said particular unknown condition:

finding a particular one of said classes containing said particular set of measurements:

determining, for said first estimate, a first of said performance measurements for the first estimator using an identification of said particular class:

determining, for said second estimate, a second of said performance measurements for the second estimator using an identification of said particular class:

obtaining a resulting estimate for the unknown condition using each of said first and second estimates, and said first and second Performance measurements.

(5.6) A method for determining from a plurality of conditions a particular unknown condition, wherein for substantially every one of said conditions there is a corresponding set of measurements for identifying the condition, comprising:

classifying or partitioning said plurality of conditions into a collection of classes, wherein for each said class, and each of said conditions therein, said corresponding set of measurements for identifying the condition is related to said corresponding set of measurements for identifying another one of said conditions in said class:

determining a plurality of estimators for estimating said conditions when supplied with said corresponding set of measurements:

storing a plurality of data item collections, wherein for each of said estimators and each of a plurality of said conditions, there is one of said data item collections having:

(a1) a representation of the condition, and (a2) a representation of a set of measurements for identifying said condition of (a1): and (a3) an estimate of said condition generated by said estimator when said representation of (a2) is input to said estimator:

activating a first of said estimators with a particular set of measurements for determining a first estimate of said particular unknown condition:

retrieving one or more of said data items wherein for each of said retrieved data items, said estimate (a3) has a desired relationship to said first estimate, and said estimate (a3) was generated by said first estimator:

determining a second estimate of said particular unknown condition using said representations of (a1) from said retrieved data items.

As also mentioned above in (2.3), the novel method and/or system of the present disclosure may utilize adaptive signal processing techniques. One particularly important utilization of such techniques includes the automatic tuning of the novel method and/or system of the present disclosure so that, e.g., such tuning can be applied to adjusting the values of location processing system parameters that affect the processing performed by the method and/or system of the present disclosure. For example, such system parameters as those used for determining the size of a geographical area to be specified when retrieving location signal data of known MS locations from the historical (location signature) data base can substantially affect the location processing. In particular, a system parameter specifying a minimum size for such a geographical area may, if too large, cause unnecessary inaccuracies in locating an MS. Accordingly, to accomplish a tuning of such system parameters, an adaptation engine is included in the novel system disclosed herein for automatically adjusting or tuning parameters used by the system disclosed herein. Note that in one embodiment, the adaptation engine is based on genetic algorithm techniques.

A novel aspect of the present method and/or system disclosed herein relies on the discovery that in many areas where MS location services are desired, the wireless signal measurements obtained from communications between the target MS and the base station infrastructure are extensive enough to provide sufficiently unique or peculiar values so that the pattern of values alone may identify the location of the target MS. Further, assuming a sufficient amount of such location identifying pattern information is captured in the composite wireless signal characteristic values for a target MS, and that there is a technique for matching such wireless signal patterns to geographical locations, then a FOM based on this technique may generate a reasonably accurate target MS location estimate. Moreover, if the novel method and/or system disclosed herein (e.g., the location signature data base) has captured sufficient wireless signal data from location communications between MSs and the base station infrastructure wherein the locations of the MSs are also verified and captured, then this captured data (e.g., location signatures) can be used to train or calibrate such models to associate the location of a target MS with the distinctive signal characteristics between the target MS and one or more base stations. Accordingly, in one embodiment, the novel method and/or system disclosed herein includes one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, the novel system and/or method disclosed herein may include the capability for training and retraining such classification FOMs to automatically maintain the accuracy of these models even though substantial changes to the radio coverage area may occur, such as the construction of a new high rise building or seasonal variations (due to, for example, foliage variations). As used herein, "training" refers to iteratively presenting "training data" to a computational module for changing the behavior of the module so that the module may perform progressively better as it learns appropriate behavioral responses to the training data. Accordingly, training may include, for example, the repeated input of training data to an artificial neural network, or repeated statistical regression analyses on different and/or enhanced training data (e.g., statistical sample data sets).

Note that such classification FOMs that are trained to identify target MS locations by the wireless signal patterns produced constitute a particularly novel aspect of the present disclosure. It is well known in the wireless telephony art that the phenomenon of signal multipath and shadow fading renders most analytical location computational techniques such as time-of-arrival (TOA) or time-difference-of-arrival (TDOA) substantially useless in urban areas and particularly in dense urban areas. However, this same multipath phenomenon also may produce substantially distinct or peculiar signal measurement patterns, wherein such a pattern coincides with a relatively small geographical area. Thus, in one embodiment, the novel method and/or system disclosed herein utilizes multipath as an advantage for increasing accuracy where for previous location systems multipath has been a source of substantial inaccuracies. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured by the novel method and/or system disclosed herein for training or calibrating such classification FOMs and for progressively improving the MS location accuracy of such models.

Moreover, it is also an aspect of the novel method and/or system disclosed herein that classification FOMs may be utilized that determine target MS locations by correlating and/or associating network anomalous behavior with geographic locations where such behavior occurs. That is, network behaviors that are problematic for voice and/or data communication may be used advantageously for locating a target MS. For example, it is well known that wireless networks typically have within their coverage areas persistent subareas where voice quality is problematic due to, e.g., measurements related to high total errors, a high error rate, or change in error rate. In particular, such measurements may be related to frame error rates, redundancy errors, co-channel interference, excessive handoffs between base stations, and/or other call quality measurements. Additionally, measurements may be used that are related to subareas where wireless communication between the network and a target MS is not sufficient to maintain a call (i.e., "deadzones"). Thus, information about such so called problematic behaviors may used by, e.g., a location estimator (FOM) to generate a more accurate estimate of a target MS. For example, such network behavioral measurements may be provided for training an artificial neural network and/or for providing to a statistical regression analysis technique and/or statistical prediction models (e.g., using principle decomposition, partial least squares, or other regression techniques for associating or correlating such measurements with the geographic area for which they likely derive. Moreover, note that such network behavioral measurements can also be used to reduce the likelihood of a target MS being in an area if such measurements are not what would be expected for the area.

It is also a related aspect of the present novel method and/or system disclosed herein to include a plurality stationary, low cost, low power "location detection base stations" (LBS), each such LBS having both restricted range MS detection capabilities, and a built-in MS. Accordingly, a grid of such LBSs can be utilized for providing wireless signaling characteristic data (from their built-in MSs) for: (a) (re)training such classification FOMs, and (b) calibrating the FOMs so that each generated location hypothesis has a reliable confidence value (probability) indicative of the likeliness of the target MS being in an area represented by the location hypothesis.

It is a further aspect of the novel method and/or system disclosed herein that the personal communication system (PCS) infrastructures currently being developed by telecommunication providers offer an appropriate localized infrastructure base upon which to build various personal location systems (PLS) employing embodiments the novel method and/or system disclosed herein, and/or utilizing the techniques disclosed herein. In particular, the novel method and/or system is especially suitable for the location of people and/or objects using code division multiple access (CDMA) wireless infrastructures, although other wireless infrastructures, such as, time division multiple access (TDMA) infrastructures and GSM are also contemplated.

Note that CDMA personal communications systems are described in the Telephone Industries Association standard IS-95, for frequencies below 1 GHz, and in the Wideband Spread-Spectrum Digital Cellular System Dual-Mode Mobile Station-Base Station Compatibility Standard, for frequencies in the 1.8–1.9 GHz frequency bands, both of which are incorporated herein by reference. Furthermore, CDMA general principles have also been described, for example, in U.S. Pat. No. 5,109,390, to Gilhousen, et al, filed Nov. 7, 1989 and CDMA Network Engineering Handbook by Qualcomm, Inc., each of which is also incorporated herein by reference.

As mentioned in the discussion of classification FOMs above, embodiments of the novel method and/or system disclosed herein can substantially automatically retrain itself to compensate for variations in wireless signal characteristics (e.g., multipath) due to environmental and/or topographic changes to a geographic area serviced by such as embodiment the present novel method and/or system. For example, in one embodiment, the novel method and/or system optionally includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, the novel method and/or system disclosed herein may substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(6.1) assuming that the co-located base station capabilities and the stationary transceiver of an LBS are such that the base station capabilities and the stationary transceiver communicate with one another, the stationary transceiver can be signaled by another component(s) of the novel method and/or system disclosed herein to activate or deactivate its associated base station capability, thereby conserving power for the LBS that operate on a restricted power such as solar electrical power;

(6.2) the stationary transceiver of an LBS can be used for transferring target MS location information obtained by the LBS to a conventional telephony base station;

(6.3) since the location of each LBS is known and can be used in location processing, the novel method and/or system disclosed herein is able to (re)train itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training various of the location processing modules of the novel method and/or system disclosed herein, such as the classification FOMs discussed above. In particular, such training and/or calibrating may include:

(i) (re)training FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

One embodiment of the novel method and/or system disclosed herein utilizes a mobile (location) base station (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(7.1) a mobile station (MS) for both communicating with other components of an embodiment of the novel method and/or system disclosed herein (such as a location processing center provided by such an embodiment);

(7.2) a GPS receiver for determining a location of the mobile location base station;

(7.3) a gyroscope and other dead reckoning devices; and (7.4) devices for operator manual entry of a mobile location base station location.

Furthermore, a mobile location base station includes modules for integrating or reconciling distinct mobile location base station location estimates that, for example, can be obtained using the components and devices of (7.1) through (7.4) above. That is, location estimates for the mobile location base station may be obtained from: GPS satellite data, mobile location base station data provided by the location processing center, dead reckoning data obtained from the mobile location base station vehicle dead reckoning devices, and location data manually input by an operator of the mobile location base station.

The location estimating system embodiment of the novel method and/or system disclosed herein offers many advantages over existing location systems. The novel method and/or system, for example, is readily adaptable to existing wireless communication systems and can accurately locate people and/or objects in a cost effective manner. The embodiments of the novel method and/or system may employ a number of distinctly different location estimators which provide a greater degree of accuracy and reliability than is possible with existing wireless location systems. For instance, the location models provided may include not only the radius-radius/TOA and TDOA techniques but also adaptive artificial neural net techniques.

Further, embodiments of the novel method and/or system disclosed herein can adapt to the topography of an area in which location service is desired. Such embodiments may also be able to adapt to environmental changes substantially as frequently as desired. Thus, such embodiments may also be able to take into account changes in the location topography over time without extensive manual data manipulation. Moreover, embodiments of the novel method and/or system can be utilized with varying amounts of signal measurement inputs. Thus, if a location estimate is desired in a very short time interval (e.g., less than approximately one to two seconds), then the present location estimating system can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Moreover, there are numerous additional advantages of embodiments of the novel method and/or system when applied to wireless location in CDMA communication systems. A location system embodiment of the novel method and/or system readily benefits from the distinct advantages of the CDMA spread spectrum scheme. Namely, these advantages include the exploitation of radio frequency spectral efficiency and isolation by (a) monitoring voice activity, (b) management of two-way power control, (c) provisioning of advanced variable-rate modems and error correcting signal encoding, (d) inherent resistance to fading, (e)

enhanced privacy, and (f) multiple "rake" digital data receivers and searcher receivers for correlation of signal multipaths.

At a more general level, it is within the scope of the novel method and/or system disclosed herein to utilize various novel computational paradigms such as:

(8.1) providing a multiple hypothesis computational architecture (as illustrated best in FIG. 8 and/or FIG. 13) wherein the hypotheses may be:

(8.1.1) generated by modular independent hypothesizing computational models (FOMs), wherein the FOMs have been calibrated to thereby output confidence values (probabilities) related to the likelihood of correspondingly generated hypotheses being correct;

(8.1.2) the FOMs are embedded in the computational architecture in a manner wherein the architecture allows for substantial amounts of application specific processing common or generic to a plurality of the models to be straightforwardly incorporated into the computational architecture;

(8.1.3) the computational architecture enhances the hypotheses generated by the models both according to past performance of the models and according to application specific constraints and heuristics without requiring complex feedback loops for recalibrating one or more of the FOMs;

(8.1.4) the FOMs are relatively easily integrated into, modified and extracted from the computational architecture;

(8.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

Further, note that the present multiple model (FOM) architecture provides additional advantages in that large software systems may be developed more easily. For example, if for a given application (e.g., wireless location, or another application such as those listed hereinbelow), there are a plurality of computational models that may be used, but each model in and of itself is less than completely satisfactory, then by integrating two or more such models into the architecture of the novel method and/or system disclosed herein, at least the following advantages are provided:

(a) the models themselves may be integrated into the desired application embodiment as substantially a "black box" thus reducing the development effort;

(b) the models may be easily added and deleted as appropriate. Thus, if an enhanced version of a model and/or an entirely new model becomes available, these models can be straightforwardly incorporated into the application;

(c) a generic embodiment of the architecture of the novel method and/or system disclosed herein may be provided wherein, e.g., messages (having a common structure regardless of the application) may be passed between various components of the embodiment, and an application development system can be provided that is based on the architecture of the novel method and/or system which may be used in a number of different technical fields;

(d) the models may be activated in parallel on different computational devices. Thus, the architecture of the novel method and/or system lends itself to parallel computing.

Thus, the multiple hypothesis architecture provided herein is useful in implementing solutions in a wide range of applications. In fact, most of the Detailed Description hereinbelow can be immediately translated into other application areas, as one skilled in the art of computer application architectures will come to appreciate. For example, the following additional applications are within the scope of the method and/or system disclosed herein:

(9.1) document scanning applications for transforming physical documents in to electronic forms of the documents. Note that in many cases the scanning of certain documents (books, publications, etc.) may have a 20% character recognition error rate. Thus, the novel computation architecture of the novel method and/or system can be utilized by (i) providing a plurality of document scanning models as the first order models, (ii) building a character recognition data base for archiving a correspondence between characteristics of actual printed character variations and the intended characters (according to, for example, font types), and additionally archiving a correspondence of performance of each of the models on previously encountered actual printed character variations (note, this is analogous to the Signature Data Base of the MS location application described herein), and (iii) determining any generic constraints and/or heuristics that are desirable to be satisfied by a plurality of the models. Accordingly, by comparing outputs from the first order document scanning models, a determination can be made as to whether further processing is desirable due to, for example, discrepancies between the output of the models. If further processing is desirable, then an embodiment of the multiple hypothesis architecture provided herein may be utilized to correct such discrepancies. Note that in comparing outputs from the first order document scanning models, these outputs may be compared at various granularities; e.g., character, sentence, paragraph or page;

(9.2) diagnosis and monitoring applications such as medical diagnosis/monitoring, communication network diagnosis/monitoring. Note that in many cases, the domain wherein a diagnosis is to be performed has a canonical hierarchical order among the components within the domain. For example, in automobile diagnosis, the components of an auto may be hierarchically ordered according to ease of replacement in combination within function. Thus, within an auto's electrical system (function), there may be a fuse box, and within the fuse box there will be fuses. Thus, these components may be ordered as follows (highest to lowest): auto, electrical system, fuse box, fuses. Thus, if different diagnostic FOMs provide different hypotheses as to a problem with an auto, the confidence values for each component and its subcomponents maybe summed together to provide a likelihood value that the problem within the component. Accordingly, the lowest component having, for example, at least a minimum threshold of summed confidences can be selected as the most likely component for either further analysis and/or replacement. Note that such summed confidences may be normalized by dividing by the number of hypotheses generated from the same input so that the highest summed confidence is one and the lowest is zero. Further note that this example is merely representative of a number of different diagnosis and/or prediction applications to which the novel method and/or system is applicable, wherein there are components that have canonical hierarchical decompositions. For example, a technique similar to the auto illustration above may be provided for the diagnosis of computer systems, networks (LANs, WANs, Internet and telephony networks), medical diagnosis from, e.g., x-rays, MRIs, sonograms, etc;

(9.3) robotics applications such as scene and/or object recognition. That is, various FOMs may process visual image input differently, and it may be that for expediency, an object is recognized if the summed confidence values for the object being recognized is above a certain threshold;

(9.4) seismic and/or geologic signal processing applications such as for locating oil and gas deposits;

(9.5) recognition of terrestrial and/or airborne objects from satellites, wherein there may be various spectral bands monitored.

(9.6) Additionally, note that this architecture need not have all modules co-located. In particular, it is an additional aspect of embodiments of the novel method and/or system disclosed herein that various modules can be remotely located from one another and communicate with one another via telecommunication transmissions such as telephony technologies and/or the Internet. Accordingly, the novel method and/or system is particularly adaptable to such distributed computing environments. For example, some number of the first order models may reside in remote locations and communicate their generated hypotheses via the Internet.

For instance, in weather prediction applications it is not uncommon for computational models to require large amounts of computational resources. Thus, such models running at various remote computational facilities can transfer weather prediction hypotheses (e.g., the likely path of a hurricane) to a site that performs hypothesis adjustments according to: (i) past performance of the each model; (ii) particular constraints and/or heuristics, and subsequently outputs a most likely estimate for a particular weather condition.

In an alternative embodiment of the novel method and/or system disclosed herein, the processing following the generation of location hypotheses (each having an initial location estimate) by the first order models may be such that this processing can be provided on Internet user nodes and the first order models may reside at Internet server sites. In this configuration, an Internet user may request hypotheses from such remote first order models and perform the remaining processing at his/her node.

In other embodiments of the novel method and/or system disclosed herein, a fast, albeit less accurate location estimate may be initially performed for very time critical location applications where approximate location information may be required. For example, less than 1 second response for a mobile station location embodiment of the novel method and/or system may be desired for 911 emergency response location requests. Subsequently, once a relatively coarse location estimate has been provided, a more accurate most likely location estimate can be performed by repeating the location estimation processing a second time with, e.g., additional with measurements of wireless signals transmitted between a mobile station to be located and a network of base stations with which the mobile station is communicating, thus providing a second, more accurate location estimate of the mobile station.

Additionally, note that it is within the scope of the novel method and/or system disclosed herein to provide one or more central location development sites that may be networked to, for example, geographically dispersed location centers providing location services according to the novel method and/or system, wherein the FOMs may be accessed, substituted, enhanced or removed dynamically via network connections (via, e.g., the Internet) with a central location development site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that in some embodiments of the novel method and/or system disclosed herein, since there is a lack of sequencing between the FOMs and subsequent processing of location hypotheses, the FOMs can be incorporated into an expert system, if desired. For example, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

The novel method and/or system may also be configured as a blackboard system with intelligent agents (e.g., FOMs). In this embodiment, each of the intelligent agents is calibrated using archived data so that for each of the input data sets provided either directly to the intelligent agents or to the blackboard, each hypothesis generated and placed on the blackboard by the intelligent agents has a corresponding confidence value indicative of an expected validity of the hypothesis.

Of course, other software architectures may also to used in implementing the processing of the location center without departing from scope of the novel method and/or system. In particular, object-oriented architectures are also within the scope of the novel method and/or system. For example, the FOMs may be object methods on an MS location estimator object, wherein the estimator object receives substantially all target MS location signal data output by the signal filtering subsystem. Alternatively, software bus architectures are contemplated by the novel method and/or system, as one skilled in the art will understand, wherein the software architecture may be modular and facilitate parallel processing.

Further features and advantages of the novel method and/or system are provided by the figures and detailed description accompanying this summary.

BRIEF DESCRIPTION OF THE DRAWINGS

FIGS. 9A and 9B are a high level data structure diagram describing the fields of a location hypothesis object generated by the first order models 1224 of the location center.

DETAILED DESCRIPTION

Detailed Description Introduction

Figure 1:
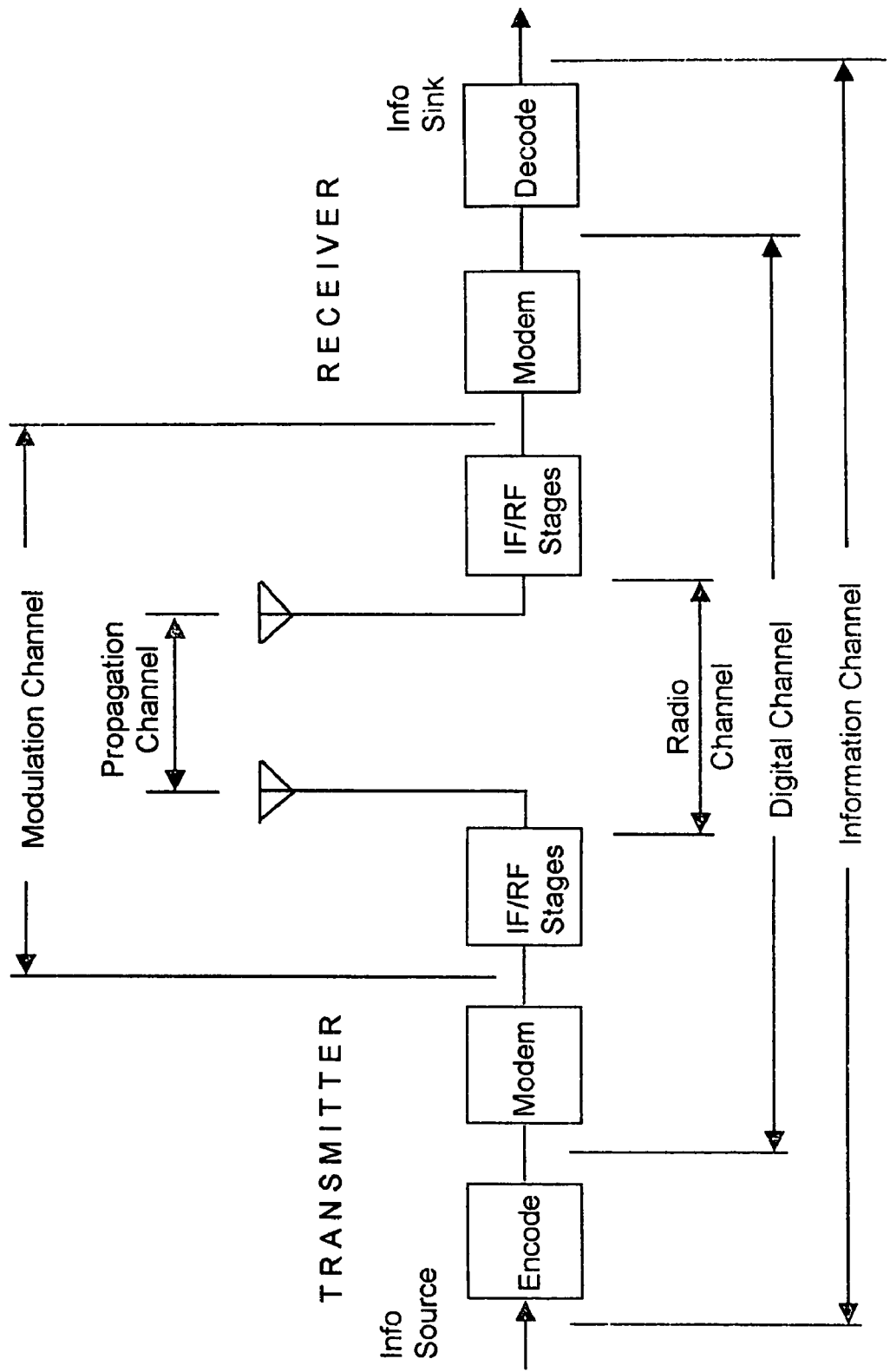
FIG. 1 illustrates various perspectives of radio propagation opportunities which may be considered in addressing correlation with mobile to base station ranging.
Figure 2:
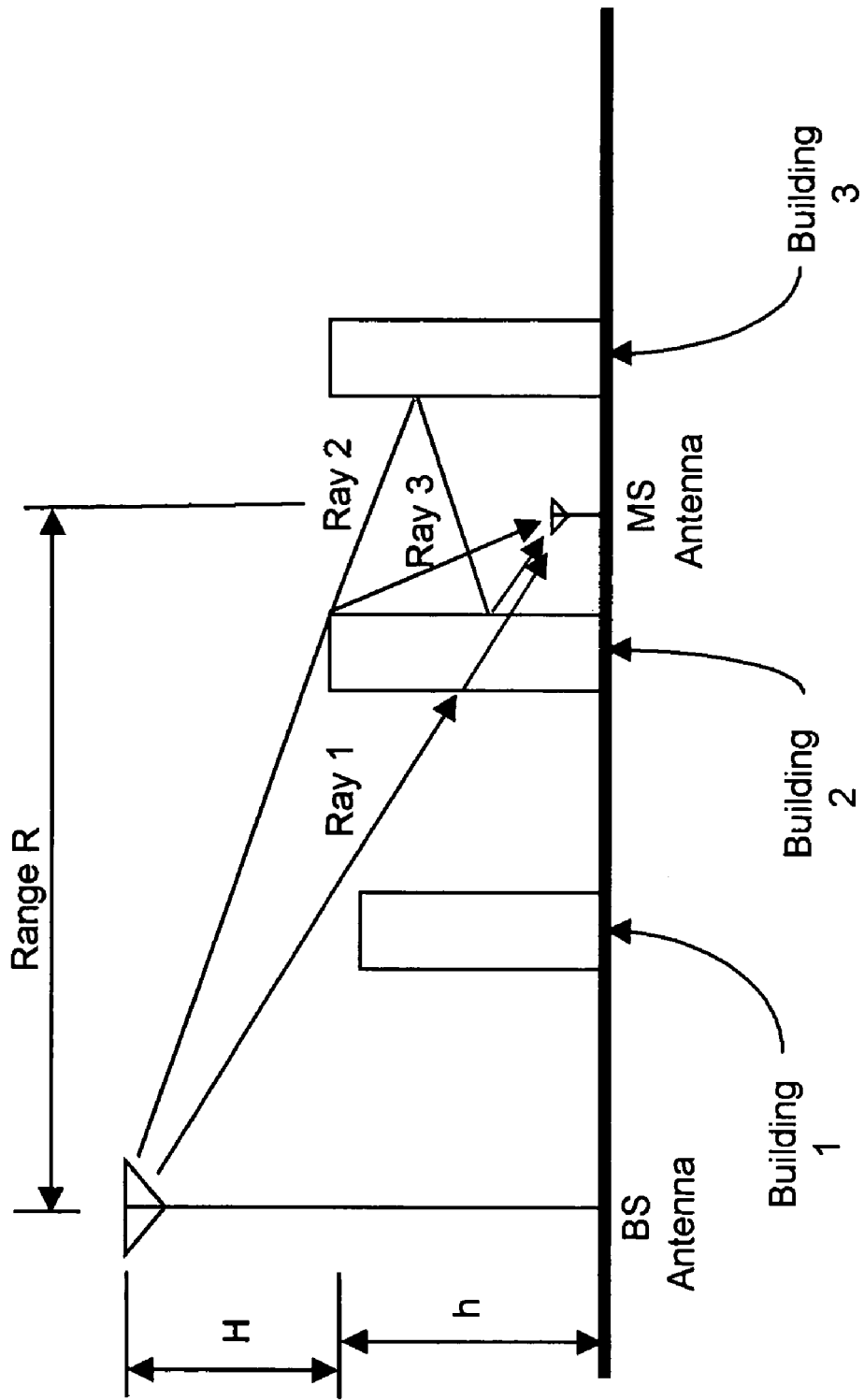
FIG. 2 shows aspects of the two-ray radio propagation model and the effects of urban clutter.
Figure 3:
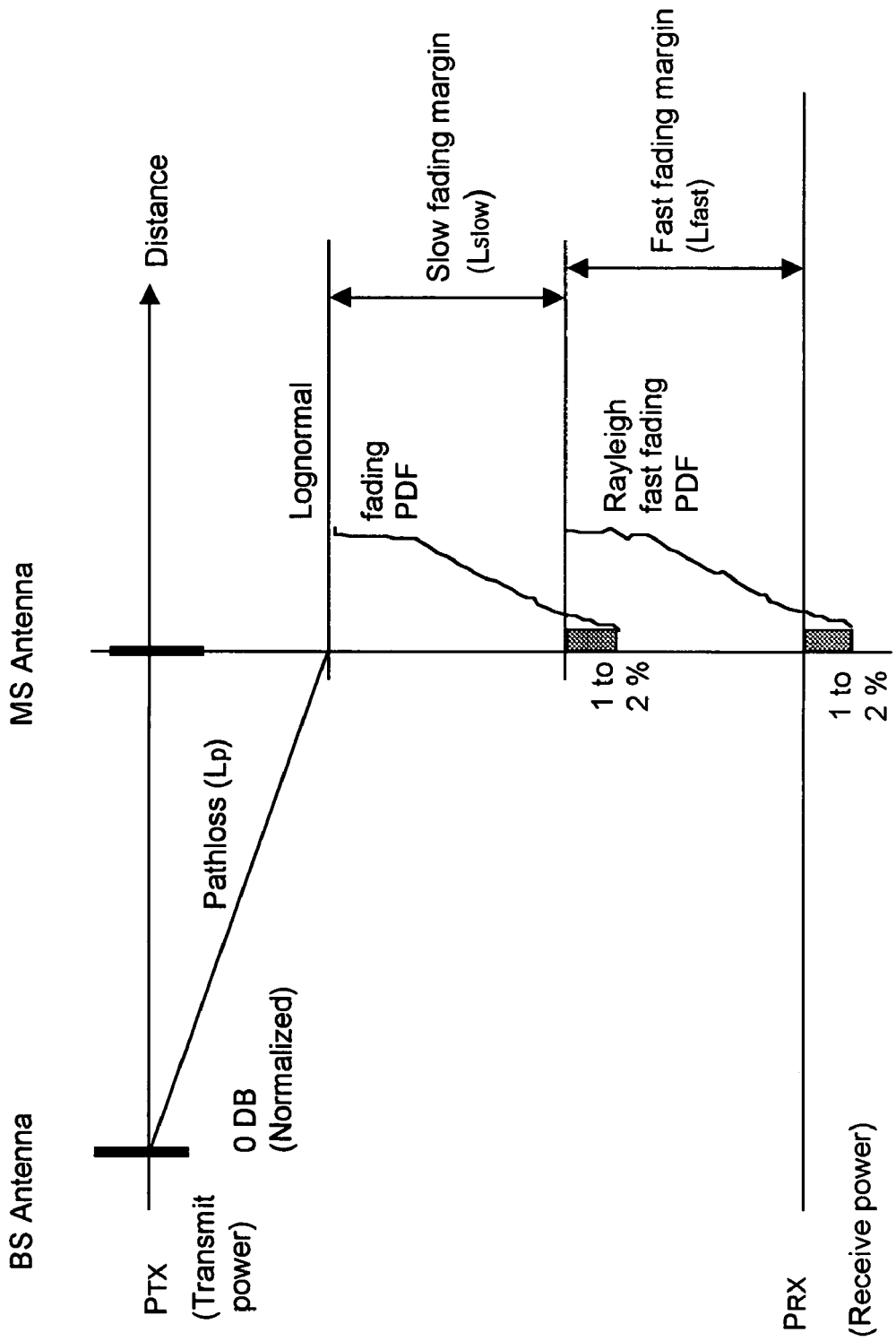
FIG. 3 provides a typical example of how the statistical power budget is calculated in design of a Commercial Mobile Radio Service Provider (CMRS) network.
Figure 4:
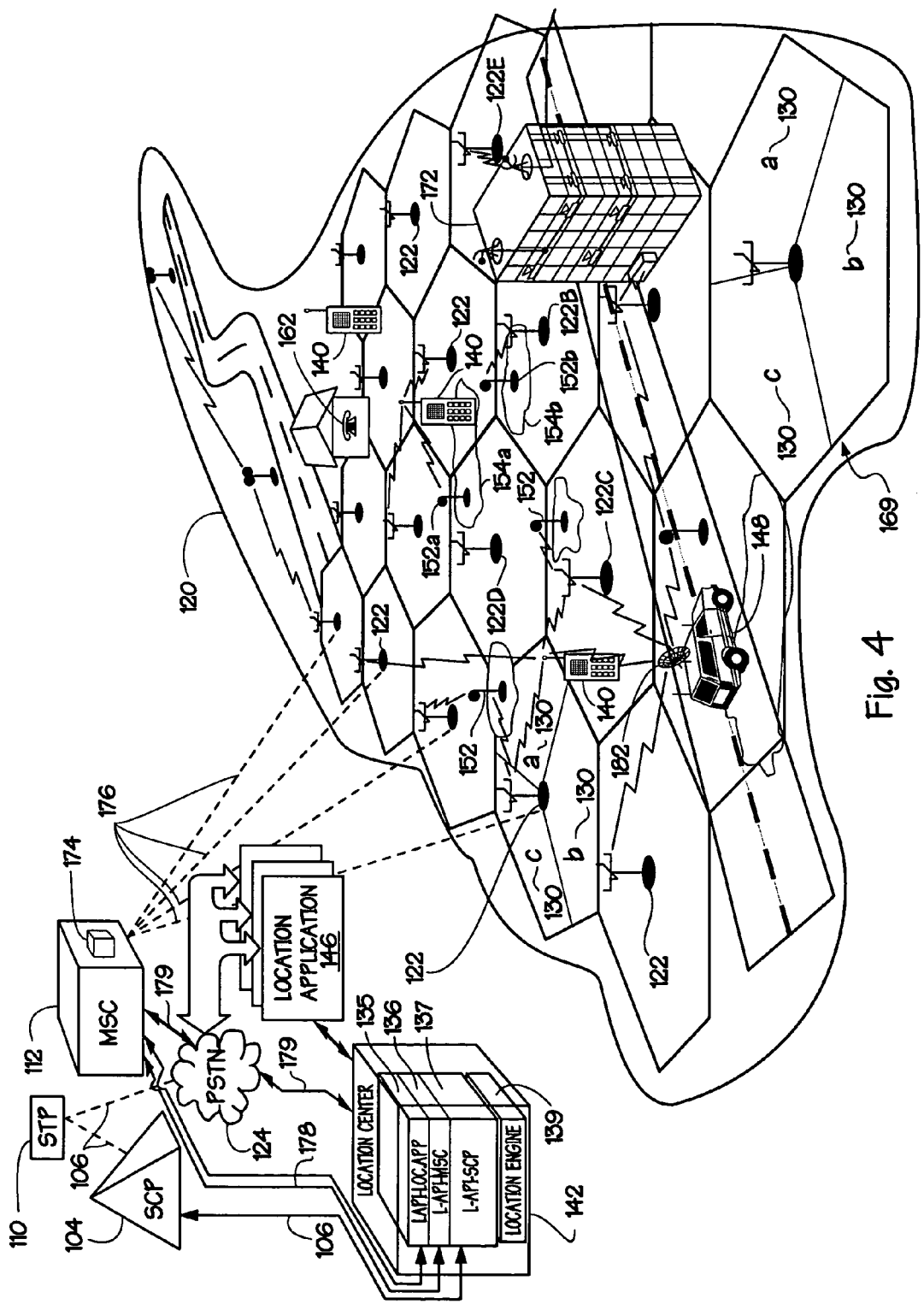
FIG. 4 illustrates an overall view of a wireless radio location network architecture, based on AIN principles.

FIG. 4 is a high level diagram of a wireless digital radio location intelligent network architecture for the novel method and/or system. Accordingly, this figure illustrates the interconnections between the components, for example, of a typical PCS network configuration and various components that are specific to wireless location embodiments of the novel method and/or system. In particular, as one skilled in the art will understand, a typical wireless (PCS) network includes:

(a) a (large) plurality of conventional wireless mobile stations (MSs) 140 for at least one of voice related communication, visual (e.g., text) related communication, and (according to the novel method and/or system) location related communication;

(b) a mobile switching center (MSC) 112;

(c) a plurality of wireless cell sites in a radio coverage area 120, wherein each cell site includes an infrastructure base station such as those labeled 122 (or variations thereof such as 122A–122D). In particular, the base stations 122 denote the standard high traffic, fixed location base stations used for voice and data communication with a plurality of MSs 140, and, according to the novel method and/or system disclosed herein, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as "location base station(s) 152" or simply "LBS(s) 152");

(d) a public switched telephone network (PSTN) 124 (which may include signaling system links 106 having network control components such as: a service control point (SCP) 104, one or more signaling transfer points (STPs) 110.

Added to this wireless network, an embodiment of the novel method and/or system disclosed herein provides the following additional components:

(10.1) a location center 142 which is required for determining a location of a target MS 140 using signal characteristic values for this target MS;

(10.2) one or more mobile base stations 148 (MBS) which are optional, for physically traveling toward the target MS 140 or tracking the target MS;

(10.3) a plurality of location base stations 152 (LBS) which are optional, distributed within the radio coverage areas 120, each LBS 152 having a relatively small MS 140 detection area 154;

Since location base stations can be located on potentially each floor of a multi-story building, the wireless location technology described herein can be used to perform location in terms of height as well as by latitude and longitude.

In operation, the MS 140 may utilize one of the wireless technologies, CDMA, TDMA, AMPS, NAMPS or GSM techniques for radio communication with: (a) one or more infrastructure base stations 122, (b) mobile base station(s) 148, (c) an LBS 152.

Referring to FIG. 4 again, additional detail is provided of typical base station coverage areas, sectorization, and high level components within a radio coverage area 120, including the MSC 112. Although base stations may be placed in any configuration, a typical deployment configuration is approximately in a cellular honeycomb pattern, although many practical tradeoffs exist, such as site availability, versus the requirement for maximal terrain coverage area. To illustrate, three such exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communication of location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links.

When a mobile station 140 (such as a CDMA, AMPS, NAMPS mobile telephone) is powered on and in the idle state, it constantly monitors the pilot signal transmissions from each of the base stations 122 located at nearby cell sites. Since base station/sector coverage areas may often overlap, such overlapping enables mobile stations 140 to detect, and, in the case of certain wireless technologies, communicate simultaneously along both the forward and reverse paths, with multiple base stations 122 and/or sectors 130. In FIG. 4 the constantly radiating pilot signals from base station sectors 130, such as sectors a, b and c of BS 122A, are detectable by mobile stations 140 within the coverage area 169 for BS 122A. That is, the mobile stations 140 scan for pilot channels, corresponding to a given base station/sector identifiers (IDs), for determining which coverage area 169 (i.e., cell) it is contained. This is performed by comparing signals strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except in the case of a 911 call, wherein no registration process is required). At this point calls may be originated from the mobile station 140 or calls or short message service messages can be received from the network. The MSC 112 communicates as appropriate, with a class 4/5 wireline telephony circuit switch or other central offices, connected to the PSTN 124 network. Such central offices connect to wireline terminals, such as telephones, or any communication device compatible with the line. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Referring to FIG. 4 again, the location center (LC) 142 interfaces with the MSC 112 either via dedicated transport facilities 178, using for example, any number of LAN/WAN technologies, such as Ethernet, fast Ethernet, frame relay, virtual private networks, etc., or via the PSTN 124. The LC 142 receives autonomous (e.g., unsolicited) command/response messages regarding, for example: (a) the state of the wireless network of each service provider, (b) MS 140 and BS 122 radio frequency (RF) measurements, (c) any MBSs 148, (d) location applications requesting MS locations using the location center. Conversely, the LC 142 provides data and control information to each of the above components in (a)–(d). Additionally, the LC 142 may provide location information to an MS 140, via a BS 122. Moreover, in the case of the use of a mobile base station (MBS) 148, several communications paths may exist with the LC 142.

The MBS 148 acts as a low cost, partially-functional, moving base station, and is, in one embodiment, situated in a vehicle where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station for data communication with the LC 142, via a BS 122. In particular, such data communication includes telemetering the geographic position of the MBS 148 as well as various RF measurements related to signals received from the target MS 140. In some embodiments, the MBS 148 may also utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a global positioning system (GPS), distance sensors, dead-reckoning electronics, as well as an on-board computing system and display devices for locating both the MBS 148 itself as well as tracking and locating the target MS 140. The computing and display provides a means for communicating the position of the target MS 140 on a map display to an operator of the MBS 148.

Each location base station (LBS) 152 is a low cost location device. Each such LBS 152 communicates with one or more of the infrastructure base stations 122 using one or more wireless technology interface standards. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., and wherein the location of the LBS may be determined as accurately as, for example, the accuracy of the locations of the infrastructure BSs 122. Assuming the wireless technology CDMA is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, nor would it interfere with neighboring LBSs 152. However, as one skilled in the art will understand, time offsets, in CDMA chip sizes, may be re-used within a PCS system, thus providing efficient use of pilot time offset chips, thereby achieving spectrum efficiency. Each LBS 152 may also contain multiple wireless receivers in order to monitor transmissions from a target MS 140. Additionally, each LBS 152 contains mobile station 140 electronics, thereby allowing the LBS to both be controlled by the LC 142, and to transmit information to the LC 142, via at least one neighboring BS 122.

As mentioned above, when the location of a particular target MS 140 is desired, the LC 142 can request location information about the target MS 140 from, for instance, one or more activated LBSs 152 in a geographical area of interest. Accordingly, whenever the target MS 140 is in such an area, or is suspected of being in the area, either upon command from the LC 142, or in a substantially continuous fashion, the LBS's pilot channel appears to the target MS 140 as a potential neighboring base station channel, and consequently, is placed, for example, in the CDMA neighboring set, or the CDMA remaining set, of the target MS 140 (as one familiar with the CDMA standards will understand).

During the normal CDMA pilot search sequence of the mobile station initialization state (in the target MS), the target MS 140 will, if within range of such an activated LBS 152, detect the LBS pilot presence during the CDMA pilot channel acquisition substate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 will telemeter back to the LC 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions would dictate preference here. GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBS. No expensive terrestrial transport link is typically required since two-way communication is provided by the included MS 140 (or an electronic variation thereof). Thus, LBSs 152 may be placed in numerous locations, such as:

(a) in dense urban canyon areas (e.g., where signal reception may be poor and/or very noisy);
(b) in remote areas (e.g., hiking, camping and skiing areas);
(c) along highways (e.g., for emergency as well as monitoring traffic flow), and their rest stations; or
(d) in general, wherever more location precision is required than is obtainable using other wireless infrastructure network components.

Location Center—Network Elements API Description

A location application programming interface, or L-API 14 (see FIG. 14, and including L-API-Loc_APP 135, L-API-MSC 136, and L-API-SCP 137 shown in FIG. 4), is required between the location center 142 (LC) and the mobile switch center (MSC) network element type, in order to send and receive various control, signals and data messages. The L-API 14 should be implemented using a preferably high-capacity physical layer communications interface, such as IEEE standard 802.3 (10 baseT Ethernet), although other physical layer interfaces could be used, such as fiber optic ATM, frame relay, etc. Two forms of API implementation are possible. In the first case the signals control and data messages are realized using the MSC 112 vendor's native operations messages inherent in the product offering, without any special modifications. In the second case the L-API includes a full suite of commands and messaging content specifically optimized for wireless location purposes, which may require some, although minor development on the part of the MSC vendor.

Signal Processor Description

Figure 14:
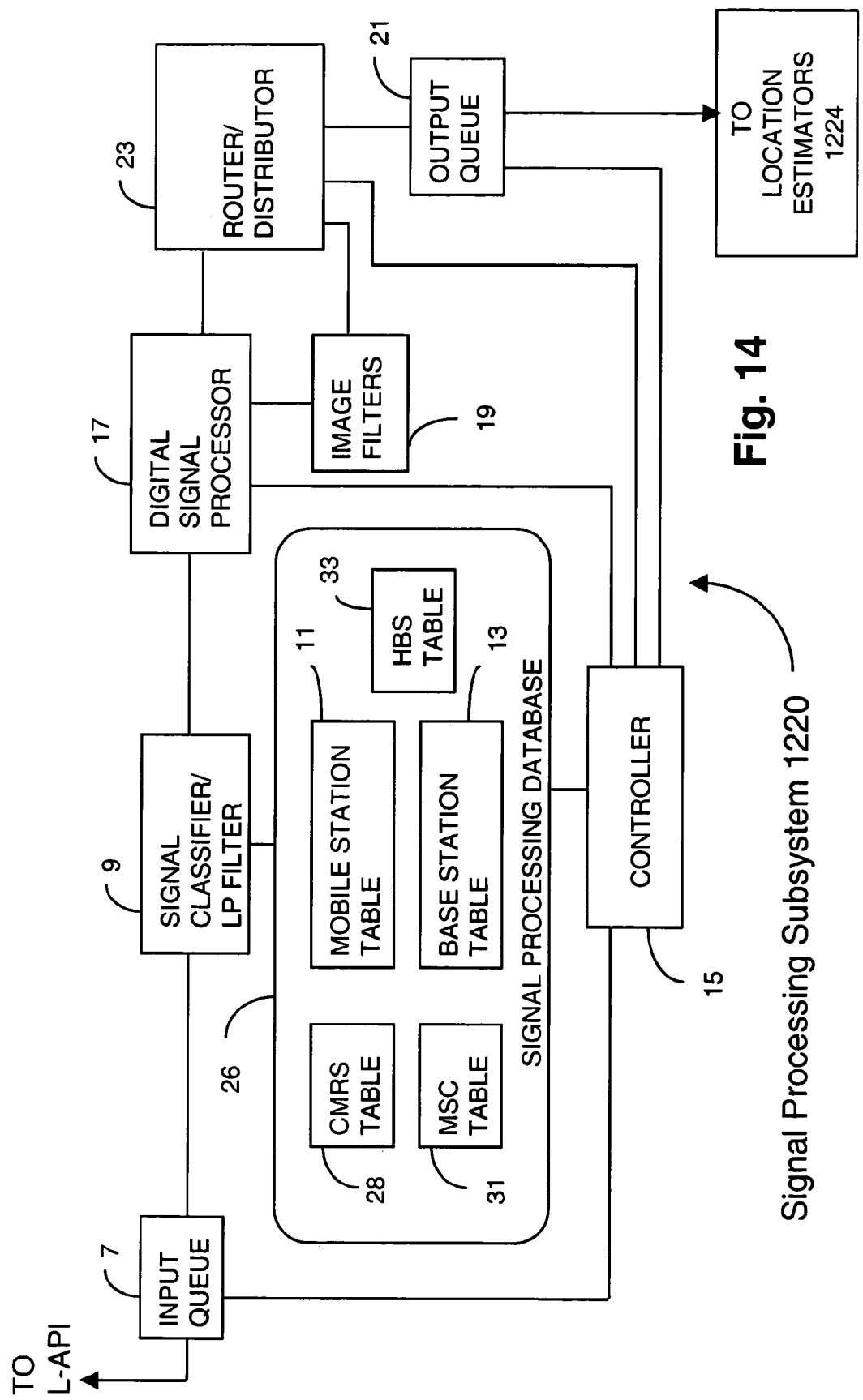
FIG. 14 illustrates the primary components of the signal processing subsystem.

Referring to FIG. 14, the signal processing subsystem 1220 receives control messages and signal measurements and transmits appropriate control messages to the wireless network via the location applications programming interface referenced earlier, for wireless location purposes. The signal processing subsystem additionally provides various signal identification, conditioning and pre-processing functions, including buffering, signal type classification, signal filtering, message control and routing functions to the location estimate modules.

One adjustment variable and one factor value are required by the signal processing subsystem in the CDMA air interface case: 1.) instantaneous relative power level in dBm (IRPL) of the mobile station transmitter, and 2.) the mobile station Power Class. By adding the IRPL to the $RRSS_{MS}$, a synthetic relative signal strength ($SRSS_{MS}$) of the mobile station 140 signal detected at the BS 122 is derived, which can be used by location estimate model analysis, as shown below:

$$SRSS_{MS}=RRSS_{MS}+IRPL \text{ (in dBm)}$$

$SRSS_{MS}$, a corrected indication of the effective path loss in the reverse direction (mobile station to BS), is now comparable with $RRSS_{BS}$ and can be used to provide a correlation with either distance or shadow fading because it now accounts for the change of the mobile station transmitter's power level. The two signals $RRSS_{BS}$ and $SRSS_{MS}$ can now be processed in a variety of ways to achieve a more robust correlation with distance or shadow fading.

The signal processing subsystem 1220 provides the low level processing wireless signal measurements received from a target MS 140 via the network of base stations 122. In particular, the signal processing subsystem 1220 aggregates such measurements for decreasing the volatility of such measurements. Moreover, the signal processing subsystem 1220 outputs ensembles of data that are suitable for processing by the FOMs 1224. A more detailed description of the signal processing subsystem 1220 can be found in the publication, "Location Of A Mobile Station Using A Plurality Of Commercial Wireless Infrastructures," by LeBlanc, Dupray and Karr having International Patent Application No. PCT/US97/15933 filed Sep. 8, 1997, and also having a corresponding U.S. national patent application Ser. No. 09/230,109 filed Jan. 22, 1999, now U.S. Pat. No. 6,236,365, wherein these documents are full incorporated herein by reference.

Location Center High Level Functionality

Figure 5:
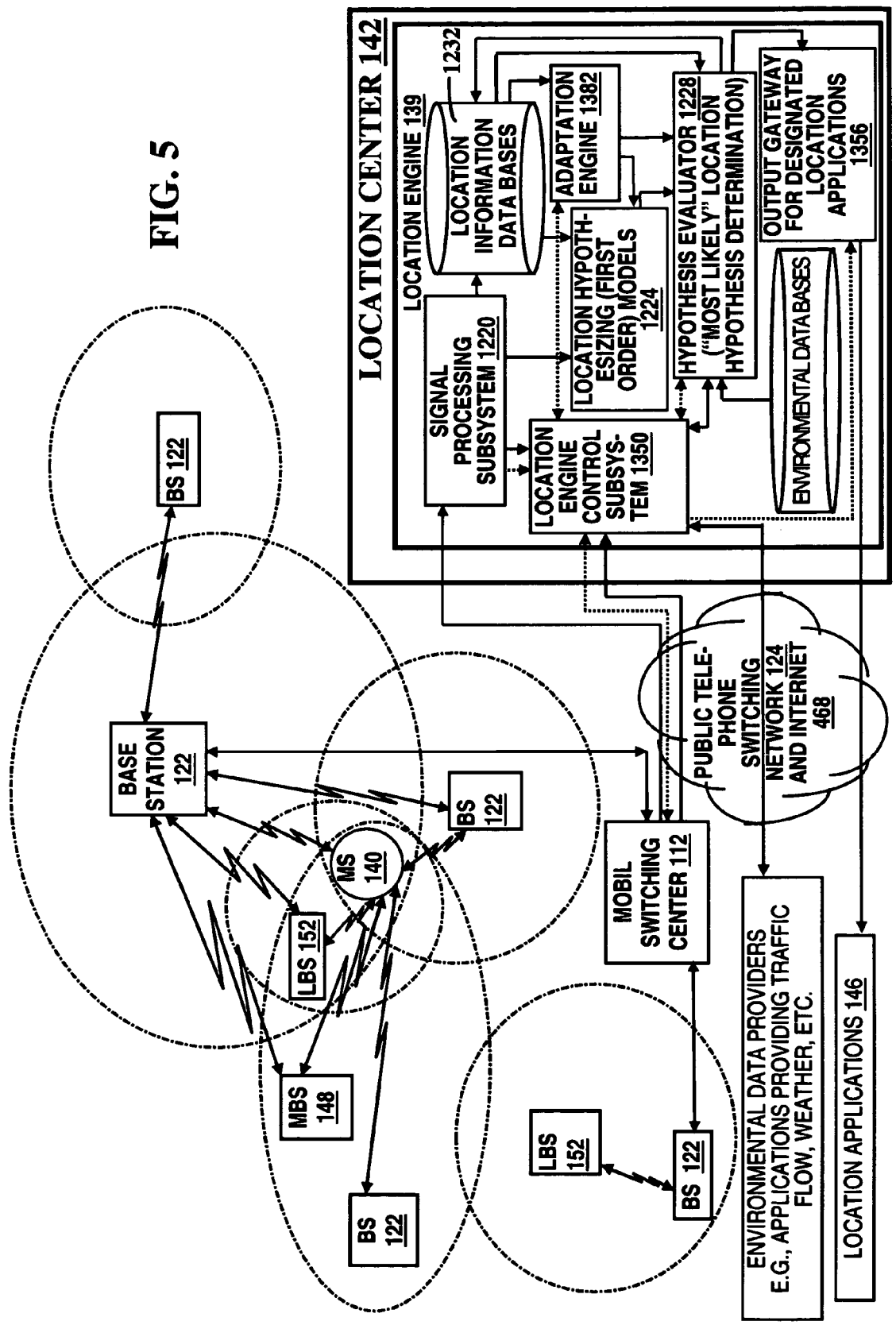
FIG. 5 is a high level block diagram of an embodiment of the novel method and/or system for locating a mobile station (MS) within a radio coverage area for the novel method and/or system.

At a very high level the location center 142 computes location estimates for a wireless Mobile Station 140 (denoted the "target MS" or "MS") by performing the following steps:

(23.1) receiving signal transmission characteristics of communications communicated between the target MS 140 and one or more wireless infrastructure base stations 122;

(23.2) filtering the received signal transmission characteristics (by the signal processing subsystem 1220 illustrated in FIG. 5) as needed so that target MS location data can be generated that is uniform and consistent with location data generated from other target MSs 140. In particular, such uniformity and consistency is both in terms of data structures and interpretation of signal characteristic values provided by the MS location data;

(23.3) inputting the generated target MS location data to one or more MS location estimating models (denoted First order models or FOMs, and labeled collectively as 1224 in FIG. 5), so that each such model may use the input target MS location data for generating a "location hypothesis" providing an estimate of the location of the target MS 140;

(23.4) providing the generated location hypotheses to an hypothesis evaluation module (denoted the hypothesis evaluator 1228 in FIG. 5):

(a) for adjusting at least one of the target MS location estimates of the generated location hypotheses and related confidence values indicating the confidence given to each location estimate, wherein such adjusting uses archival information related to the accuracy of previously generated location hypotheses, (b) for evaluating the location hypotheses according to various heuristics related to, for example, the radio coverage area 120 terrain, the laws of physics, characteristics of likely movement of the target MS 140; and (c) for determining a most likely location area for the target MS 140, wherein the measurement of confidence associated with each input MS location area estimate is used for determining a "most likely location area"; and (23.5) outputting a most likely target MS location estimate to one or more applications 146 (FIG. 5) requesting an estimate of the location of the target MS 140.

Location Hypothesis Data Representation

In order to describe how the steps (23.1) through (23.5) are performed in the sections below, some introductory remarks related to the data denoted above as location hypotheses will be helpful. Additionally, it will also be helpful to provide introductory remarks related to historical location data and the data base management programs associated therewith.

For each target MS location estimate generated and utilized by a wireless location embodiment of the novel and/or system disclosed herein, the location estimate is provided in a data structure (or object class) denoted as a "location hypothesis" (illustrated in Table LH-1). Brief descriptions of the data fields for a location hypothesis is provided in the Table LH-1.

TABLE LH-1

| | |
|---|---|
| FOM_ID | First order model ID (providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |
| valid_area | Boolean indicating the validity of "area_est" (one of "pt_est" and "area_est" must be valid). |

TABLE LH-1-continued

| | |
|---|---|
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |
| extrapolation_area | Reference to (if non-NULL) an extrapolated MS target estimate area provided by the location extrapolator submodule 1432 of the hypothesis analyzer 1332. That is, this field, if non-NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering". |
| confidence | In one embodiment, this is a probability indicating a likeliness that the target MS 140 is in (or out) of a particular area. If "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". Other embodiments, are also within the scope of the present invention that are not probabilities; e.g., translations and/or expansions of the [0, 1] probability range as one skilled in the art will understand. |
| Original_Timestamp | Date and time that the location signature cluster (defined hereinbelow) for this location hypothesis was received by the signal processing subsystem 1220. |
| Active_Timestamp | Run-time field providing the time to which this location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original_Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the first order models by the signal processing subsystem 1220; i.e., access to the "loc sigs" (received at "timestamp" regarding the location of the target MS) |
| descriptor | Original descriptor (from the First order model indicating why/how the Location Area Estimate and Confidence Value were determined). |

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since such confidence values are an important aspect of the novel method and/or system disclosed herein, the description and use of such confidence values are provided further below; however, a brief description is provided here.

In one embodiment, each confidence value is a probability indicative of a likeliness that the target MS 140 resides within an geographic area represented by the hypothesis to which the confidence value applies. Accordingly, each such confidence value is in the range [0, 1]. Moreover, for clarity of discussion, it is assumed that unless stated otherwise that the probabilistic definition provided here is to be used when confidence values are discussed.

Note, however, other definitions of confidence values are within the scope of the novel method and/or system disclosed herein, wherein such other definitions may be more general than probabilities, and/or that have different ranges other than [0, 1]. For example, one such alternative is that each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 may be interpreted to mean that the target MS 140 is NOT in such a corresponding MS area estimate of the location hypothesis area, (b) 0 may be interpreted to mean that it is unknown as to the likelihood of whether the MS 140 in the corresponding MS area estimate, and (c) +1.0 may be interpreted to mean that the MS 140 is perceived to positively be in the corresponding MS area estimate.

Additionally, note that it is within the scope of the novel method and/or system disclosed herein that the location hypothesis data structure may also include other related "perception" measurements related to a likelihood of the target MS 140 being in a particular MS location area estimate. For example, it is within the scope of the novel method and/or system to also utilize measurements such as, (a) "sufficiency factors" for indicating the likelihood that an MS location estimate of a location hypothesis is sufficient for locating the target MS 140; (b) "necessity factors" for indicating the necessity that the target MS be in an particular area estimate. However, to more easily describe the novel method and/or system disclosed herein, a single confidence field is used having the interpretation given above.

Additionally, in utilizing location hypotheses in, for example, the location evaluator 1228 as in (23.4) above, it is important to keep in mind that each location hypothesis confidence value is a relative measurement. That is, for confidences, $cf_1$ and $cf_2$, if $cf_1 <= cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, $CS_A$, can be assigned to A, wherein the confidence score for such an area is a function of the confidences for all the location hypotheses whose (most pertinent) target MS location estimates contain A. That is, in order to determine a most likely target MS location area estimate for outputting from the location center 142, a confidence score is determined for areas within the location center service area. More particularly, if a function, "f", is a function of the confidence(s) of location hypotheses, and f is a monotonic function in its parameters and $f(cf_1, cf_2, cf_3, \ldots, cf_N)=CS_A$ for confidences $cf_i$ of location hypotheses $H_i$, $i=1,2,\ldots,N$, with A contained in the area estimate for $H_i$, then "f" is denoted a confidence score function. Accordingly, there are many embodiments for a confidence score function f that may be utilized in computing confidence scores with the novel method and/or system disclosed herein; e.g., (a) $f(cf_1, cf_2, \ldots, cf_N)=\Sigma cf_i=CS_A$;
(b) $f(cf_1, cf_2, \ldots, cf_N)=\Sigma cf_i^n=CS_A$, n=1, 2, 3, 4, 5, \ldots;
(c) $f(cf_1, cf_2, \ldots, cf_N)=\Sigma(K_i * cf_i)=CS_A$, wherein $K_i$, i=1, 2, \ldots N are positive system (tunable) constants (possibly dependent on environmental characteristics such as topography, time, date, traffic, weather, and/or the type of base station(s) 122 from which location signatures with the target MS 140 are being generated, etc.).

For the present description of the novel method and/or system, the function f as defined in (c) immediately above is utilized. However, for obtaining a general understanding of the novel method and/or system, the simpler confidence score function of (a) may be more useful. It is important to note, though, that it is within the scope of the novel method and/or system to use other functions for the confidence score function.

Coverage Area: Area Types and their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the novel method and/or system to have a more operational definition of area types that is more closely associated with wireless signal transmission behaviors.

To describe embodiments of the an area type scheme used in the novel method and/or system disclosed herein, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infrastructure in the area; e.g., the arrangement and signal communication characteristics of the base stations 122 in the area (e.g., base station antenna downtilt). Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signaling characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The novel method and/or system disclosed herein provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the novel method and/or system is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning for radio coverage area into subareas, wherein each subarea is an estimate of an area having included MS 140 locations that are likely to have is at least a minimal amount of similarity in their wireless signaling characteristics. To obtain the partition $P_0$ of the radio coverage area 120, the following steps are performed:

(23.8.4.1) Partition the radio coverage area 120 into subareas, wherein in each subarea is: (a) connected, (b) the subarea is not too oblong, e.g., the variations in the lengths of chords sectioning the subarea through the centroid of the subarea are below a predetermined threshold, (c) the size of the subarea is below a predetermined value, and (d) for most locations (e.g., within a first or second standard deviation) within the subarea whose wireless signaling characteristics have been verified, it is likely (e.g., within a first or second standard deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or remaining sets of base stations 122 detected by "most" MSs 140 in the subarea. Additionally (or alternatively), a second such collection may be the base stations 122 that are expected to detect MSs 140 at locations within the subarea. Of course, the union or intersection of the first and second collections is also within the scope of the present method and/or system for partitioning the radio coverage area 120 according to (d) above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite imaging. For example, EarthWatch Inc. of Longmont, Colo. can provide geographic with 3 meter resolution from satellite imaging data. Denote the resulting partition here as $P_2$.

(23.8.4.3) Overlay both of the above partitions, $P_1$ and $P_2$ of the radio coverage area 120 to obtain new subareas that are intersections of the subareas from each of the above partitions. This new partition is $P_0$ (i.e., $P_0 = P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(d) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) within A, there are 2 base stations that are expected to be detected by a target MS 140 in A but these base stations can not detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of wireless location embodiments of the novel method and/or system disclosed herein that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastructure configuration in the radio coverage area 120.

(23.8.4.7) For each $P_0$ subarea, A, of $P_0$ perform the following step(s):
  (a) Determine a centroid, C(A), for A;
  (b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the wireless location embodiments of the novel method and/or system, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.
  (c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are known or expected to generate substantial multipath.
  (d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, $P_3$, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Other embodiments of area types are also within the scope of the novel method and/or system disclosed herein. As mentioned above, each of the first order models 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but can not be detected by the target mobile station, and (c) the identifiers for base stations that can be detected by a target mobile station at each location of A, but these base stations can not detect the target mobile station. That is, two locations, $l_1$ and $l_2$ are identified as being in A if and only if the three sets of (a), (b), and (c) for l1 are, respectively, identical to the three sets of (a), (b), and (c) for $l_2$.

Accordingly, assuming the partition $P_0$ as described immediately above is used, a description can be given as to how probabilities may be assigned as the confidence values of location hypotheses generated by the first order models 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple first order models, such that each such probability indicates a likelihood that the target mobile station is in the corresponding intersection.

Location Information Data Bases and Data

Location Data Bases Introduction

It is an aspect of wireless location embodiments of the novel method and/or system disclosed herein that MS location processing performed by the location center 142 should become increasingly better at locating a target MS 140 both by (a) building an increasingly more detailed model of the signal characteristics of locations in the service area for such a wireless location embodiment, and also (b) by providing capabilities for the location center processing to adapt to environmental changes.

One way the functionality of (a) and (b) immediately above is realized is by providing one or more data base management systems and data bases for:
  (a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristic affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location of the MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of wireless location embodiments of the novel method and/or system disclosed herein to utilize such historical MS signal location data for enhancing the correctness and/or confidence of certain location hypotheses as will be described in detail in other sections below.

Data Representations for the Location Signature Data Base

There are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between; (i) a target MS 140 at a (possibly verified) presumed substantially stationary location, and (ii) each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating first order models 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2 to 5 second interval in one embodiment of the novel method and/or system), during communication with the MS 140 for obtaining a single instance of loc sig data, although the MS location may or may not be known. Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

Loc sigs have the following functions or object methods associated therewith:

(26.1) A "normalization" method for normalizing loc sig data according to the associated MS 140 and/or BS 122 signal processing and generating characteristics. That is, the signal processing subsystem 1220, one embodiment being described in the PCT patent application, PCT/US97/15933, titled, "Wireless Location Using A Plurality of Commercial Network Infrastructures," now U.S. Pat. No. 6,236,365, by F. W. LeBlanc and the present inventor, provides (methods for loc sig objects) for "normalizing" each loc sig so that variations in signal characteristics resulting from variations in (for example) MS signal processing and generating characteristics of different types of MS's may be reduced. In particular, since wireless network designers are typically designing networks for effective use of hand set MS's 140 having a substantially common minimum set of performance characteristics, the normalization methods provided here transform the loc sig data so that it appears as though the loc sig was provided by a common hand set MS 140. However, other methods may also be provided to "normalize" a loc sig so that it may be compared with loc sigs obtained from other types of MS's as well. Note that such normalization techniques include, for example, interpolating and extrapolating according to power levels so that loc sigs may be normalized to the same power level for, e.g., comparison purposes.

Normalization for the BS 122 associated with a loc sig is similar to the normalization for MS signal processing and generating characteristics. Just as with the MS normalization, the signal processing subsystem 1220 provides a loc sig method for "normalizing" loc sigs according to base station signal processing and generating characteristics.

Note, however, loc sigs stored in the location signature data base 1320 are NOT "normalized" according to either MS or BS signal processing and generating characteristics. That is, "raw" values of the wireless signal characteristics are stored with each loc sig in the location signature data base 1320.

(26.2) A method for determining the "area type" corresponding to the signal transmission characteristics of the area(s) between the associated BS 122 and the associated MS 140 location for the loc sig. Note, such an area type may be designated by, for example, the techniques for determining transmission area types as described hereinabove.

(26.3) Other methods are contemplated for determining additional environmental characteristics of the geographical area between the associated BS 122 and the associated MS 140 location for the loc sig; e.g., a noise value indicating the amount of noise likely in such an area.

Referring now to the composite location objects and verified location signature clusters of (24.3) and (24.2) respectively, the following information is contained in these aggregation objects:

(27.1.1) an identification of the BS 122 designated as the primary base station for communicating with the target MS 140;

(27.1.2) a reference to each loc sig in the location signature data base 1320 that is for the same MS location at substantially the same time with the primary BS as identified in (27.1);

(27.1.3) an identification of each base station (e.g., 122 and 152) that can be detected by the MS 140 at the time the location signal measurements are obtained. Note that in one embodiment, each composite location object includes a bit string having a corresponding bit for each base station, wherein a "1" for such a bit indicates that the corresponding base station was identified by the MS, and a "0" indicates that the base station was not identified. In an alternative embodiment, additional location signal measurements may also be included from other non-primary base stations. For example, the target MS 140 may communicate with other base stations than it's primary base station. However, since the timing for the MS 140 is typically derived from it's primary base station and since timing synchronization between base stations is not exact (e.g., in the case of CDMA, timing variations may be plus or minus 1 microsecond) at least some of the location signal measurements may be less reliable that the measurements from the primary base station, unless a forced hand-off technique is used to eliminate system timing errors among relevant base stations;

(27.1.4) a completeness designation that indicates whether any loc sigs for the composite location object have been removed from (or invalidated in) the location signature data base 1320.

Note, a verified composite location object is designated as "incomplete" if a loc sig initially referenced by the verified composite location object is deleted from the location signature data base 1320 (e.g., because of a confidence that is too low). Further note that if all loc sigs for a composite location object are deleted, then the composite object is also deleted from the location signature data base 1320. Also note that common fields between loc sigs referenced by the same composite location object may be provided in the composite location object only (e.g., timestamp, etc.).

Accordingly, a composite location object that is complete (i.e., not incomplete) is a verified location signature cluster as described in (24.2).

Location Center Architecture

Overview of Location Center Functional Components

FIG. 5 presents a high level diagram of the location center 142 and the location engine 139 in the context of the infrastructure for the entire location system according to the novel method and/or system disclosed herein.

It is important to note that the architecture for the location center 142 and the location engine 139 disclosed herein is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein. One embodiment of such a subsystem is described in the PCT patent application, PCT/US97/15933, titled, "Wireless Location Using A Plurality of Commercial Network Infrastructures," now U.S. Pat. No. 6,236,365 by F. W. LeBlanc, Karr, and the present inventor filed Jul. 8, 1999.

Initial Location Estimators: First Order Models

Figure 8:
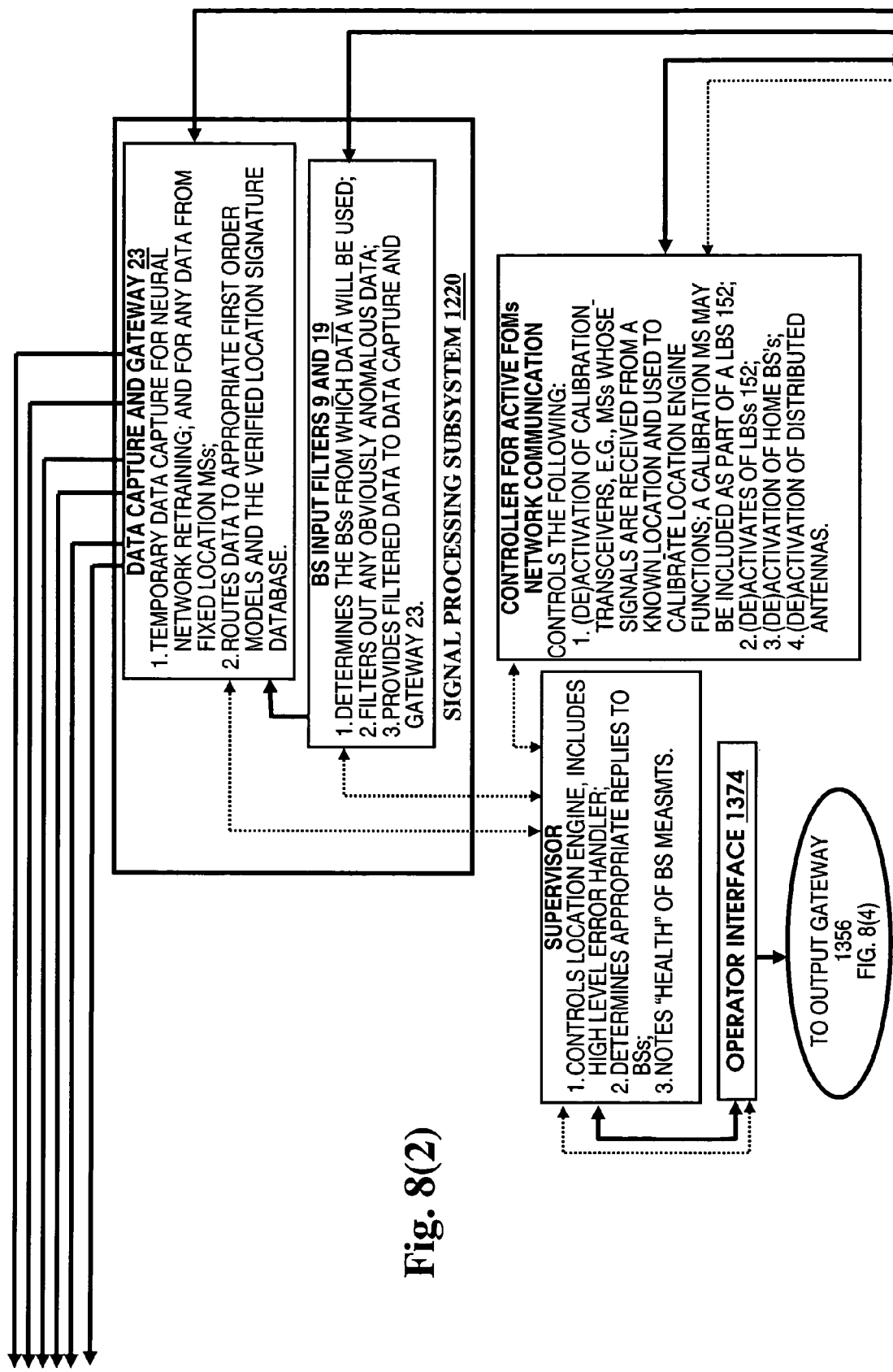
FIG. 8 is a substantially comprehensive high level block diagram illustrating data and control flows between the components of an embodiment of the location center 142, as well the functionality of the components.
Figure 8:
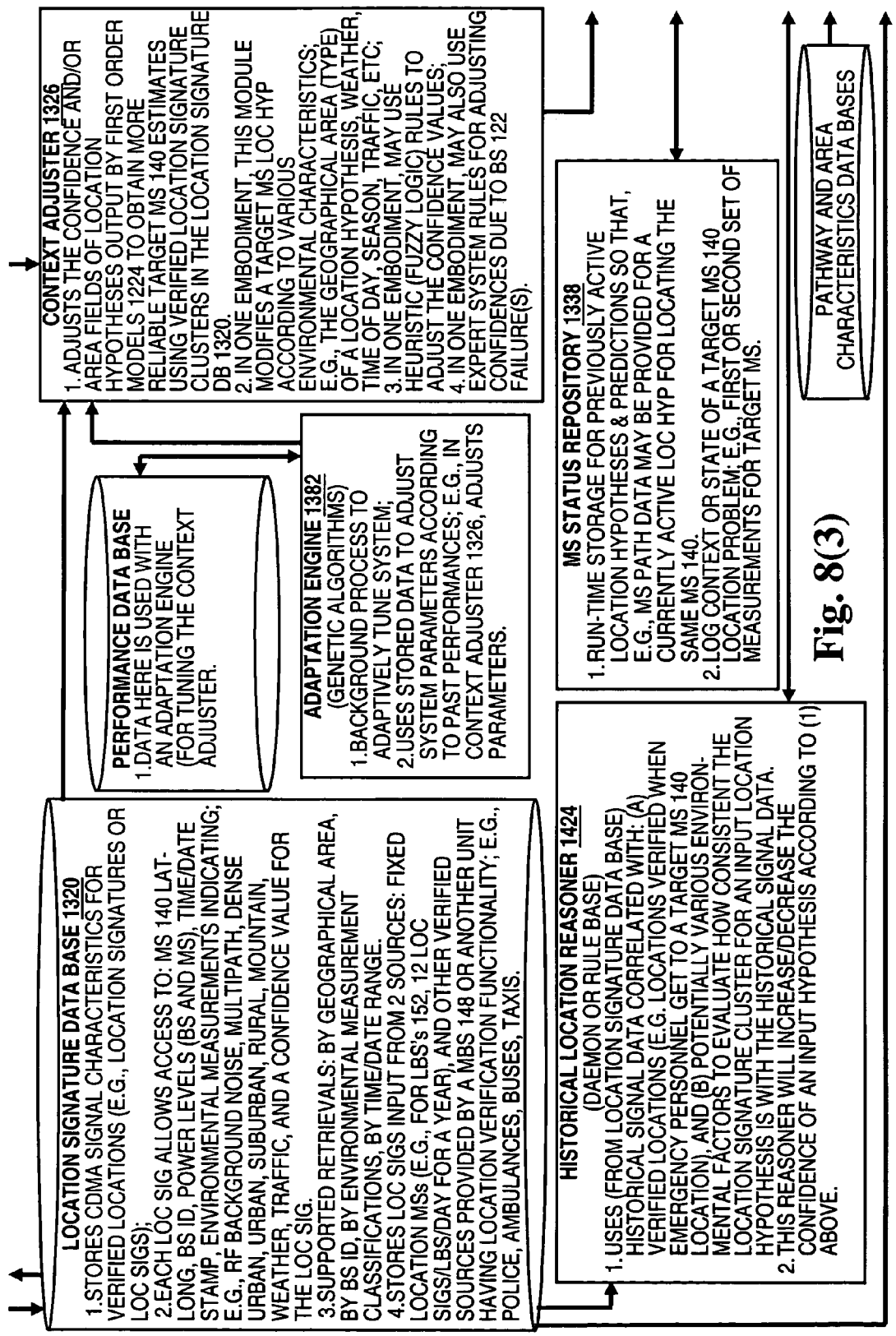
Figure 8:
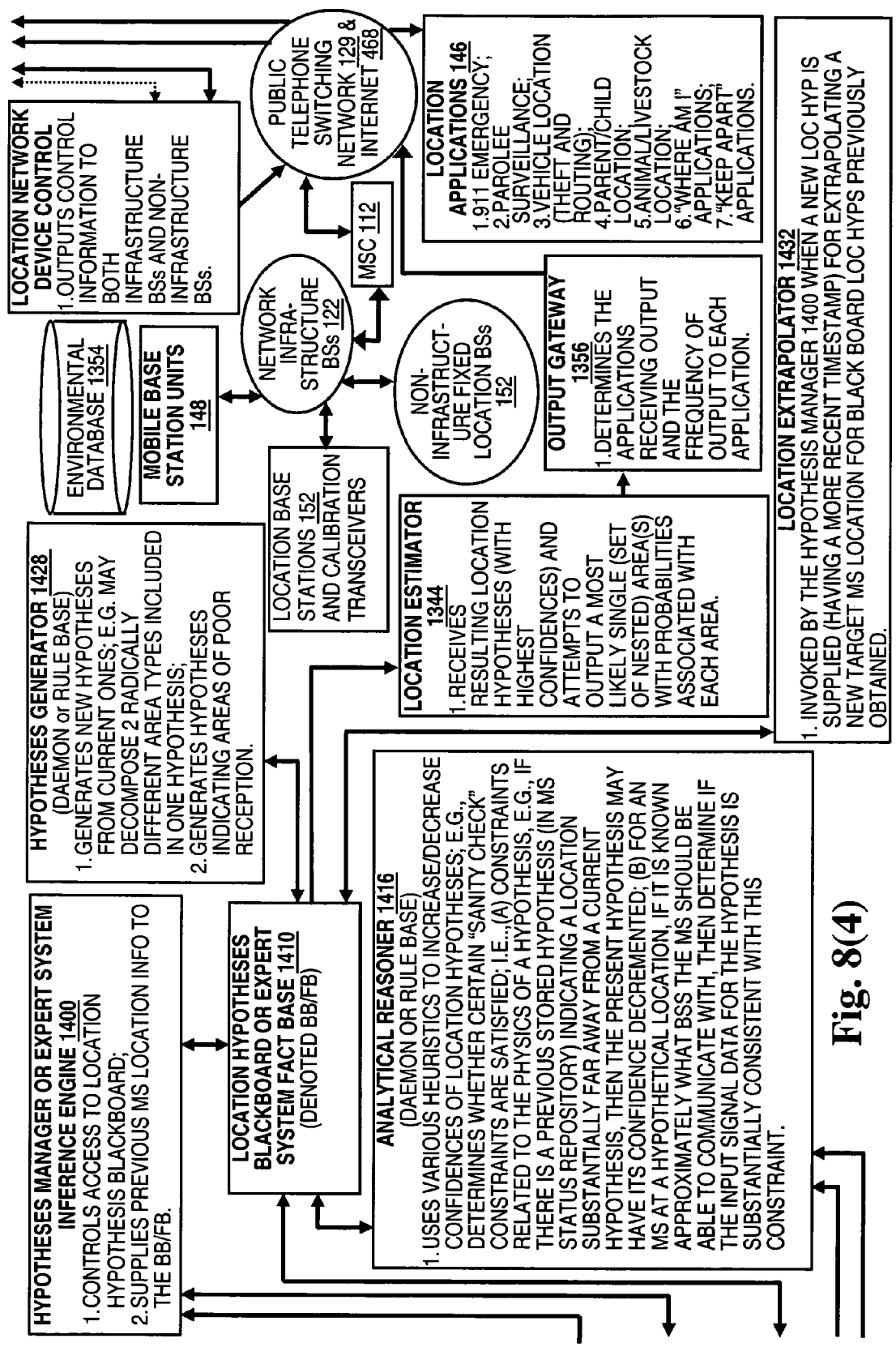

A second functional group of location engine 139 modules is for generating various target MS 140 location initial estimates, as described in step (23.3). Accordingly, the modules here use input provided by the signal processing subsystem 1220. This second functional group includes one or more signal analysis modules or models, each hereinafter denoted as a first order model 1224 (FOM), for generating location hypotheses for a target MS 140 to be located. Note that it is intended that each such FOM 1224 use a different technique for determining a location area estimate for the target MS 140. A brief description of some types of first order models is provided immediately below. Note that FIG. 8 illustrates another, more detailed view of the location system according to the novel method and/or system disclosed herein. In particular, this figure illustrates some of the FOMs 1224 contemplated by a wireless location embodiment of the novel method and/or system, and additionally illustrates the primary communications with other modules of the present wireless location system. However, it is important to note that the embodiments are not limited to the FOMs 1224 shown and discussed herein. That is, it is a primary aspect of wireless location embodiments of the novel method and/or system to easily incorporate FOMs using other signal processing and/or computational location estimating techniques than those presented herein. Further, note that each FOM type may have a plurality of its models incorporated into an embodiment of a wireless location system according to the novel method and/or system disclosed herein.

For example, (as will be described in further detail below), one such type of model or FOM 1224 (hereinafter models of this type are referred to as "distance models") may be based on a range or distance computation and/or on a base station signal reception angle determination between the target MS 140 from each of one or more base stations. Basically, such distance models 1224 determine a location estimate of the target MS 140 by determining a distance offset from each of one or more base stations 122, possibly in a particular direction from each (some of) the base stations, so that an intersection of each area locus defined by the base station offsets may provide an estimate of the location of the target MS.

In one embodiment, such a distance model may perform the following steps:
(a) Determines a minimum distance between the target MS and each BS using TOA, TDOA, signal strength on both forward and reverse paths;
(b) Generates an estimated error;
(c) Outputs a location hypothesis for estimating a location of a MS: each such hypothesis having: (a) one or more (nested) location area estimates for the MS, each location estimate having a confidence value (e.g., provided using the estimated error) indicating a perceived accuracy, and (b) a reason for both the location estimate (e.g., substantial multipath, etc) and the confidence.

Another type of FOM 1224 is a statistically based first order model 1224, wherein a statistical technique, such as regression techniques (e.g., least squares, partial least squares, principle decomposition), or e.g., Bollenger Bands (e.g., for computing minimum and maximum base station offsets). In general, models of this type output location hypotheses that are determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model."

In one embodiment, such a stochastic signal model may output location hypotheses determined by one or more statistical comparisons with loc sigs in the Location Signature database 1320 (e.g., comparing MS location signals with verified signal characteristics for predetermined geographical areas).

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location. Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

In one embodiment, an adaptive learning model such as a model based on an artificial neural network may determine an MS 140 location estimate using base station IDs, data on signal-to-noise, other signal data (e.g., a number of signal characteristics including, e.g., all CDMA fingers). Moreover, the output from such a model may include: a latitude and longitude for a center of a circle having radius R (R may be an input to such an artificial neural network), and is in the output format of the distance model(s).

Yet another type of FOM 1224 can be based on global positioning satellite (GPS) signals. For example, in some embodiments of the MS 140, there may be electronics that at least are capable of receiving GPS signals and using such signals for determining the position of the MS 140. In general, if an appropriate number of GPS signals from different satellites are received by the MS 140 (e.g., signals from two, three or four satellites depending on the GPS technology used and the location resolution desired), such signals may provide highly accurate location estimates. However, such signals may not be available in, e.g., high rise buildings, parking garages, and dense urban canyons. Moreover, such signals can in some circumstances be subject to the multipath phenomenon which could cause gross errors in a location estimate of the target MS 140, or no location estimate being generated.

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastructure coverage for providing a desired level of MS 140 location accuracy.

In one embodiment, such a location base station model may perform the following steps:
(a) If an input is received then the target MS 140 is detected by a location base station 152 (i.e., a LBS being a unit having a reduced power BS and a MS).
(b) If an input is obtained, then the output is a hypothesis data structure having a small area of the highest confidence.
(c) If no input is received from a LBS then a hypothesis having an area with highest negative confidence is output.

Yet another type of FOM 1224 can be based on input from a mobile base station 148, wherein location hypotheses may be generated from target MS 140 location data received from the mobile base station 148. In one embodiment, such a mobile station model may provide output similar to the distance FOM 1224 described hereinabove.

Still other types of FOM 1224 can be based on various techniques for recognizing wireless signal measurement patterns and associating particular patterns with locations in the coverage area 120. For example, artificial neural networks or other learning models can used as the basis for various FOMs.

It is important to keep in mind that a novel aspect of the novel method and/or system disclosed herein is the use or activation, simultaneously or serially, of a potentially large number of such first order models 1224, wherein such FOMs are not limited to those described herein. Thus, a wireless location system according to the novel method and/or system provides a framework for incorporating MS location estimators to be subsequently provided as new FOMs in a straightforward manner. For example, a FOM 1224 based on wireless signal time delay measurements from a distributed antenna system 168 for wireless communication may be incorporated into a wireless location system according to the novel method and/or system for locating a target MS 140 in an enclosed area serviced by the distributed antenna system (such a FOM is more fully described in the U.S. Pat. No. 6,236,365 filed Jul. 8, 1999). Accordingly, by using such a distributed antenna FOM, such a wireless location system may determine the floor of a multi-story building from which a target MS is transmitting. Thus, MSs 140 can be located in three dimensions using such a distributed antenna FOM.

It is important to note the following aspects of the novel method and/or system relating to FOMs 1224:

(28.1) Each such first order model 1224 may be relatively easily incorporated into and/or removed from an embodiment of the novel method and/or system disclosed herein. For example, assuming that the signal processing subsystem 1220 provides uniform input to the FOMs, and there is a uniform FOM output interface, it is believed that a large majority (if not substantially all) viable MS location estimation strategies may be accommodated. Thus, it is straightforward to add or delete such FOMs 1224.

(28.2) Each such first order model 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, a wireless location system according to the novel method and/or system disclosed herein may be modular and extensible such that, for example, (and importantly) different first order models 1224 may be utilized depending on the signal transmission characteristics of the geographic region serviced by the wireless location system. Thus, a simple configuration of the wireless location system may have a small number of FOMs 1224 for a simple wireless signal environment (e.g., flat terrain, no urban canyons and low population density). Alternatively, for complex wireless signal environments such as in cities like San Francisco, Tokyo or New York, a large number of FOMs 1224 may be simultaneously or serially utilized for generating MS location hypotheses.

(28.3) A wireless location system according to the novel method and/or system disclosed herein provides the capability to activate serially one or more groups of one or more models 1224, wherein each model may generate a location estimate for locating the same target MS 140. Thus, for example, if a first group of models do not yield an appropriate location estimate (e.g., having a sufficiently high confidence value), then another group of models may be activated. Accordingly, a first group may include a model based on global positioning satellite (GPS) technology, whereas a second group may include base station triangulation models and pattern recognition models. Thus, for a target MS 140 having the capability to receive GPS signals, if measurements of such signals can be received from the MS, then in many situations a location estimate derived therefrom will be sufficient for locating the MS for such applications as embodiments of the novel method and/or system is intended (e.g., E-911, auto tracking, selective wireless advertising based on location, railroad box car tracking, tracking of trucks between cities or states, penal restrictions on the location areas to which an individual has access). However, if such GPS signals are not available, due to environmental conditions and/or due to the target MS 140 not having the electronics for receiving GPS signals, then a second group of models may be activated. This capability for serially activating groups of models may be embodied using a data driven approach wherein the location center control subsystem 1350 activates, e.g., all models that are capable of being activated from the types of wireless measurement data received from a target MS 140 according to a particular priority. Thus, assuming GPS data is received, possibly along with additional signal time delay measurements, then a GPS location estimating model may be invoked as a first level of location processing. Thus, if each confidence value for the (one or more) GPS model generated location hypotheses have a sufficiently high probability (and substantially overlap if more than one), then no further processing may be required, thereby conserving computational resources of the location center 142. However, in the case that such confidence values are not sufficient (or that the estimates do not substantially overlap), then an additional second group of models 1224 may be activated that are based on other computational techniques for obtaining estimates of the target MS 140. Thus, the second group may include the models 1224 that perform various forms of pattern recognition. Additionally, if the combination of the first and second groups do not provide an estimate of sufficiently high confidence, then an third group of, e.g., triangulation based models 1224 may be invoked.

An Introduction to an Evaluator for Location Hypotheses: Hypothesis Evaluator

A third functional group of location engine 139 modules evaluates location hypotheses output by the first order models 1224 and thereby provides a "most likely" target MS location estimate. The modules for this functional group are collectively denoted the hypothesis evaluator 1228.

Hypothesis Evaluator Introduction

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the novel method and/or system disclosed herein. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty; i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis may be increased (decreased), and/or (ii) the MS location area estimate can be decreased (increased). Moreover, note that when the confidence values are probabilities, such adjustments are may require the reactivation of one or more FOMs 1224 with requests to generate location hypotheses having location estimates of different sizes. Alternatively, adjuster modules 1436 and/or 1440 (FIG. 15 discussed hereinbelow) may be invoked for generating location hypotheses having area estimates of different sizes. Moreover, the confidence value on such an adjusted location hypothesis (actually a new location hypothesis corresponding to the originally generated hypothesis) may also be a probability in that combinations of FOMs 1224 and adjuster modules 1436 and 1440 can also be calibrated for thereby yielding probabilities as confidence values to the resulting location hypotheses.

In a first class of embodiments (typically wherein the confidence values are not maintained as probabilities), the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Alternatively, in a second class of embodiments for the hypothesis evaluator 1228 (also typically wherein the confidence values are not maintained as probabilities), MS location area estimates can be adjusted while confidence values remain substantially fixed. However, in one preferred embodiment of the present embodiment, both location hypothesis area estimates and confidence values are modified.

The hypothesis evaluator 1228 may perform any or most of the following tasks depending on the embodiment of the hypothesis evaluator. That is, (30.1) it may enhance the accuracy of an initial location hypothesis generated by an FOM by using the initial location hypothesis as, essentially, a query or index into the location signature data base 1320 for obtaining one or more corresponding enhanced location hypotheses, wherein the enhanced location hypotheses have both an adjusted target MS location area estimates and an adjusted confidences based on past performance of the FOM in the location service surrounding the target MS location estimate of the initial location hypothesis;

Additionally, for embodiments of the hypothesis evaluator 1228 wherein the confidence values for location hypotheses are not maintained as probabilities, the following additional tasks (30.2) through (30.7) may be performed:

(30.2) the hypothesis evaluator 1228 may utilize environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.3) the hypothesis evaluator 1228 may determine how well the associated signal characteristics used for locating a target MS compare with particular verified loc sigs stored in the location signature data base 1320 (see the location signature data base section for further discussion regarding this aspect of the novel method and/or system). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 may determine if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:

(a2) moving at an appropriate velocity for the area being traversed, or (b2) moving along an established path (e.g., a freeway), then the confidence in the current location hypothesis may be increased.

(30.5) the hypothesis evaluator 1228 may determine consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different area types. Additionally, this module may generate location hypotheses indicating areas of poor reception; and (30.7) the hypothesis evaluator 1228 determines and outputs a most likely location hypothesis for a target MS.

Note that the hypothesis evaluator may accomplish the above tasks, (30.1)–(30.7), by employing various data processing tools including, but not limited to, fuzzy mathematics, genetic algorithms, neural networks, expert systems and/or blackboard systems.

Figure 6:
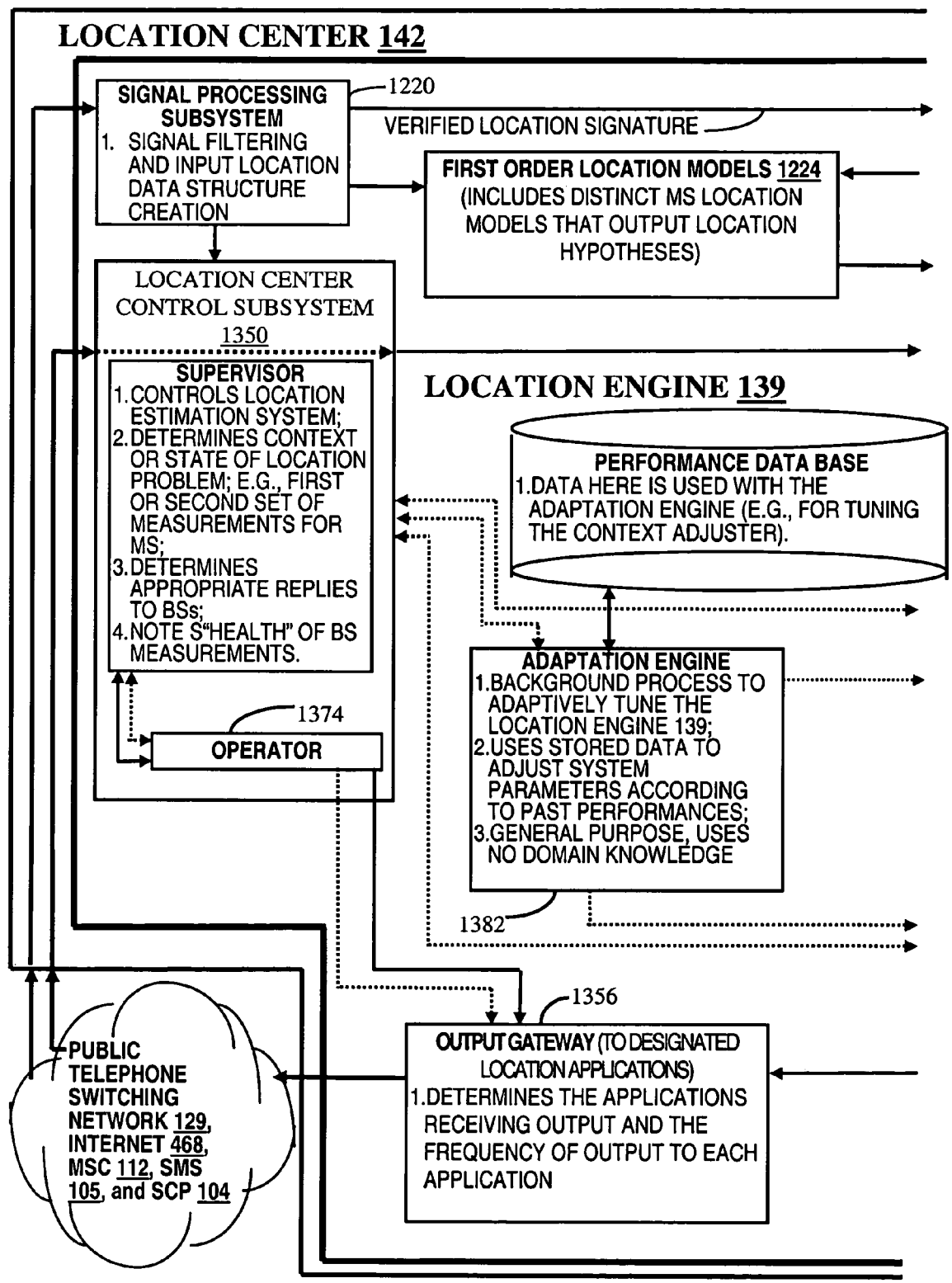
FIG. 6 is a high level block diagram of an embodiment of the location center 142.
Figure 6:
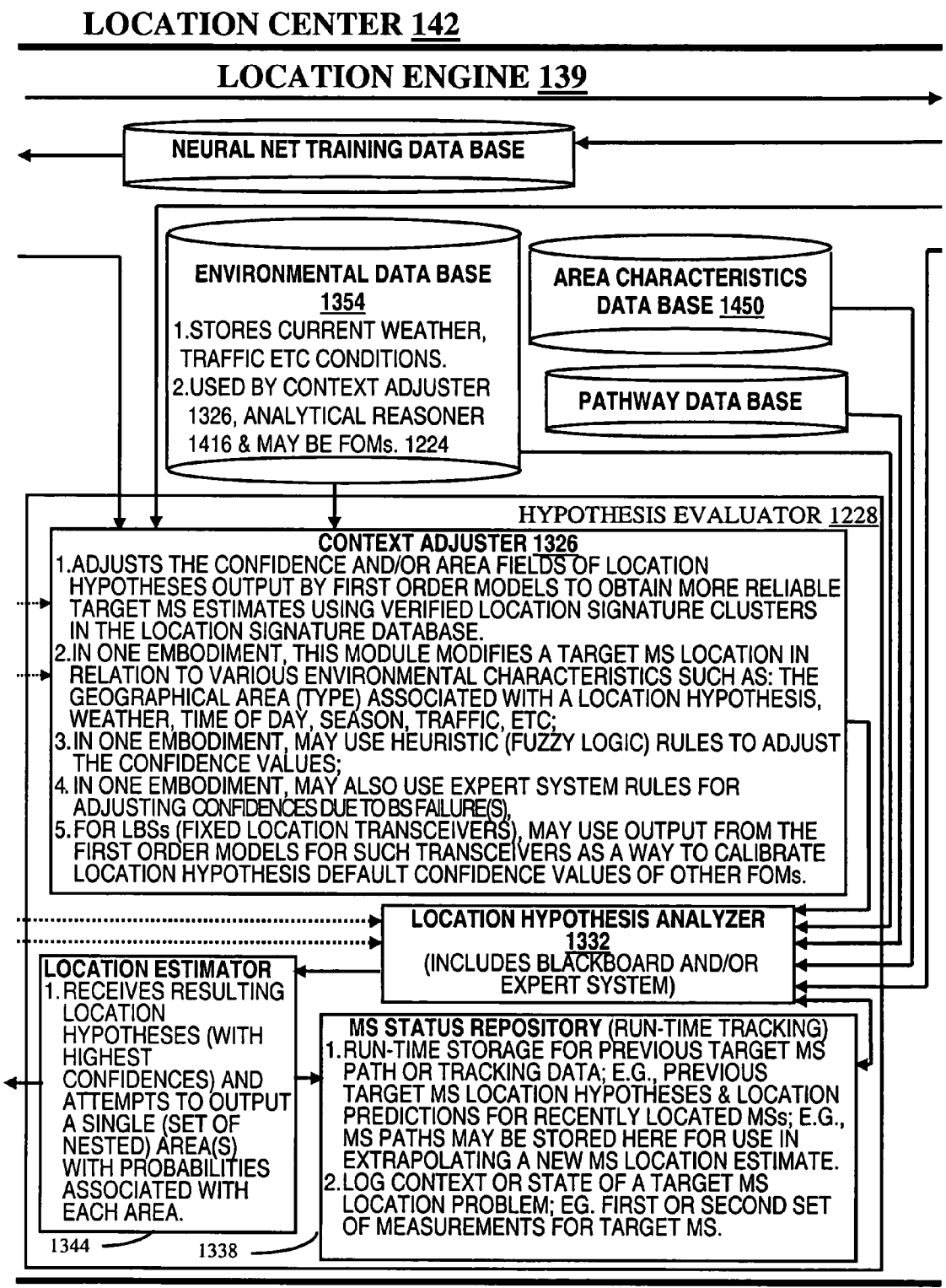
Figure 6:
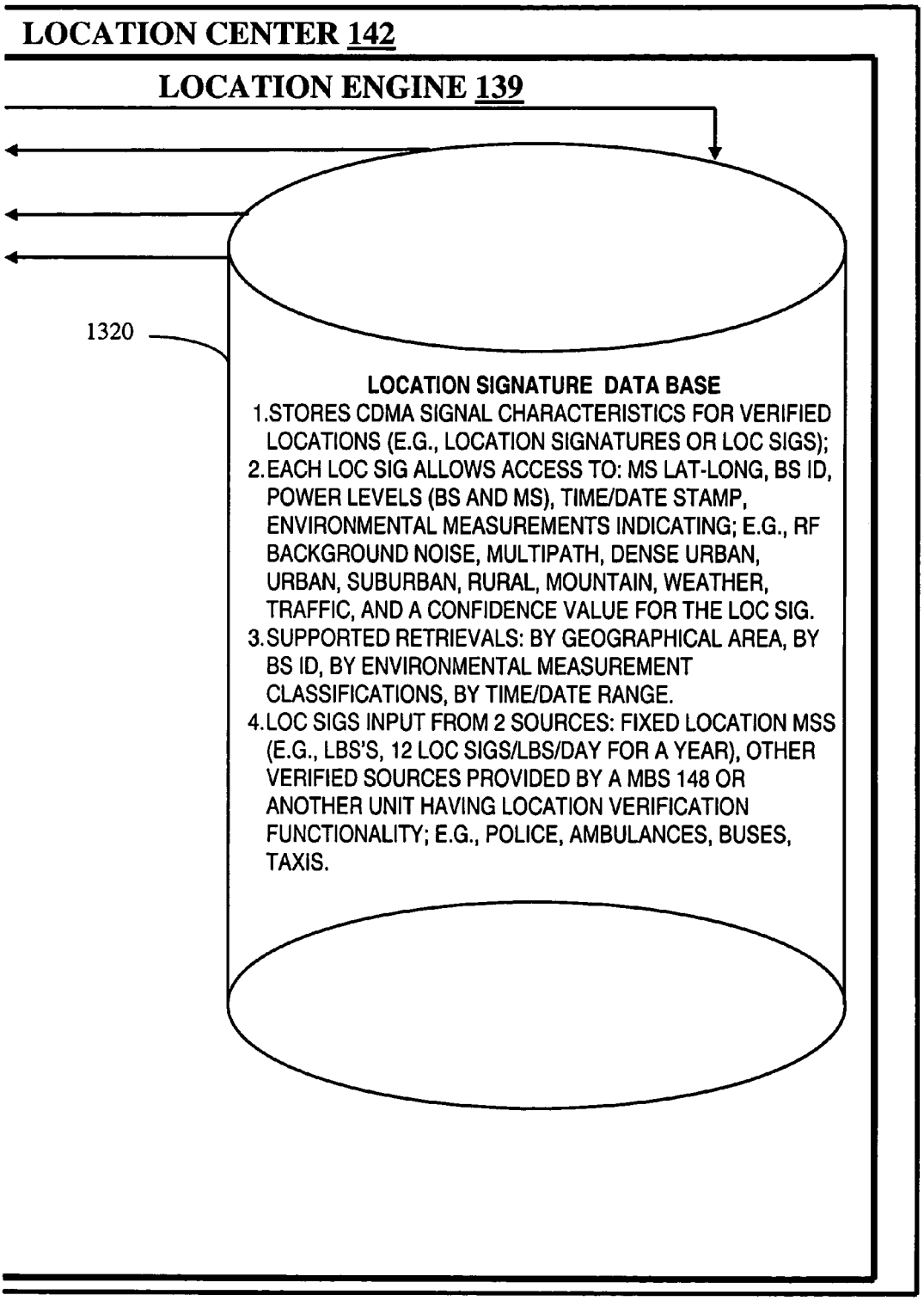
Figure 7:
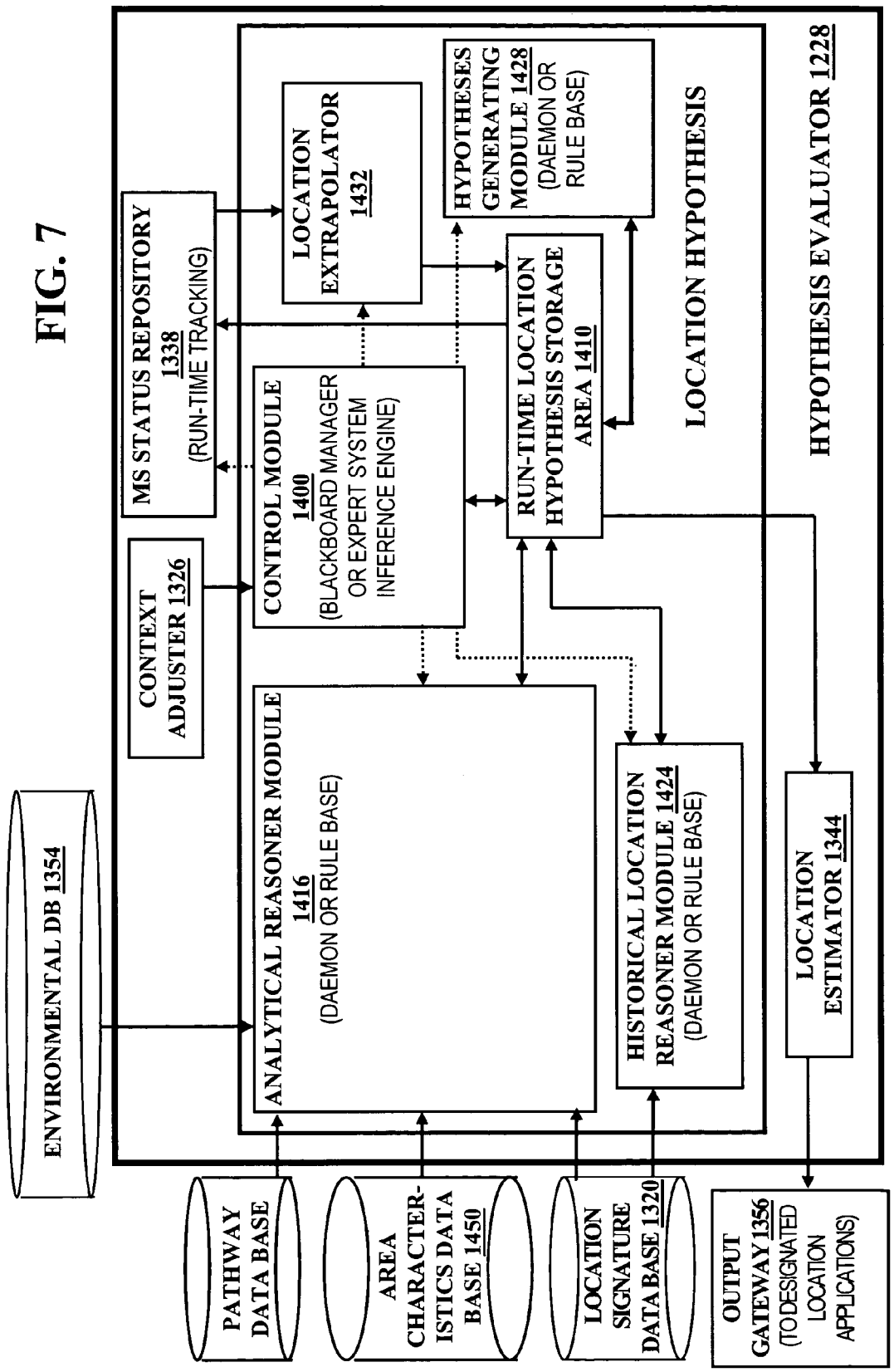
FIG. 7 is a high level block diagram of one embodiment of the hypothesis evaluator for the location center.
Figure 15:
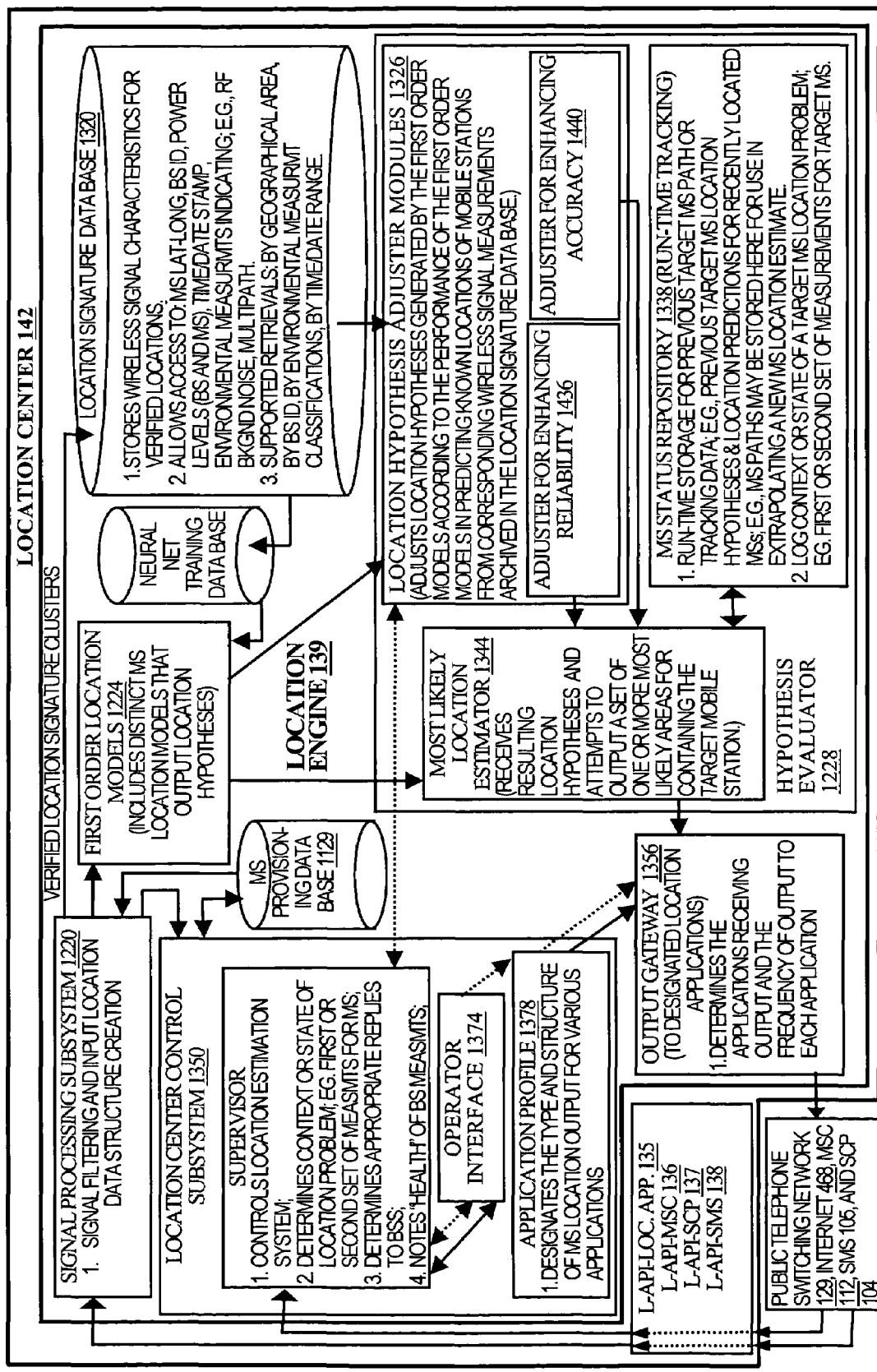
FIG. 15 illustrates another embodiment of the location engine 139, wherein the context adjuster 1326 (denoted in this figure as "location hypothesis adjuster modules") includes a module (1436) that is capable of adjusting location hypotheses for reliability, and another module (1440) that is capable of adjusting location hypotheses for accuracy.

Note that in the embodiments where confidence values are not maintained as probabilities, such as those of FIGS. 6 and 7, the hypothesis evaluator 1228 includes the following four high level modules for processing output location hypotheses from the first order models 1224: a context adjuster 1326, a hypothesis analyzer 1332, an MS status repository 1338 and a most likelihood estimator 1334. These four modules are briefly described hereinbelow. Alternatively, FIG. 15 shows an embodiment of the hypothesis evaluator 1228 where confidence values are maintained as probabilities.

As mentioned above, each of the first order models 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but can not be detected by the target mobile station, and (c) the identifiers for base stations that can be detected by a target mobile station at each location of A, but these base stations can not detect the target mobile station. That is, two locations, $l_1$ and $l_2$ are identified as being in A if and only if the three sets of (a), (b), and (c) for $l_1$ are, respectively, identical to the three sets of (a), (b), and (c) for $l_2$. Other embodiments of $P_0$ may be provided by the area types described in the "Coverage Area: Area Types And Their Determination" section.

Accordingly, assuming such a partition $P_0$ is used, a description can be given as to how probabilities may be assigned as the confidence values of location hypotheses generated by the first order models 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple first order models, such that each such probability indicates a likelihood that the target mobile station is in the corresponding intersection.

Reliability and Accuracy of a Multiple Model Approach

To illustrate how both reliability and accuracy can both be enhanced by this multiple model architecture of the novel method and/or system disclosed herein, examples believed to illustrate the plausibility of such enhancements immediately follow. However, note that the general architecture is within the scope of the novel method and/or system independently of these examples.

(i) Theoretical Computations Related to Location Estimation Reliability

Regarding reliability, let the reliability for each first order model in a particular area, A, be defined as the probability of a target MS being in a corresponding location estimate of a location hypothesis generated by the first order model, wherein the probability is determined from an analysis of past performance of the model. Thus, a first order model whose past location estimates were shown to have included the corresponding target MS 6 out of 10 times has a reliability of 0.6. Now suppose there are five first order models, $F_1$, $F_2$, $F_3$, $F_4$, and $F_5$. Further, suppose that historically these models have the following reliabilities: $F_1$ is 0.7, $F_2$ is 0.6, $F_3$ is 0.55, $F_4$ is 0.8, and $F_5$ is 0.75. Additionally, assume that these models $F_i$ are substantially "independent" in a statistical sense. For a particular target MS, also suppose that each of the models $F_i$ generates a single corresponding location hypothesis, $H_i$, $1<=i<=5$ for estimating a location of the particular target MS. Accordingly, one "system reliability" measurement of the reliability of the combination of all the models is the probability that the particular target MS resides in a subcombination of the location hypotheses $H_1$, $H_2$, $H_3$, $H_4$, and $H_5$ simultaneously, wherein, for example, the subcombination always includes at least three of the location hypothesis $H_i$. Accordingly, this probability can be determined using the reliabilities of the first order models $F_i$. Accordingly, this probability is approximately 0.92. Note that this resulting reliability is substantially greater than the reliability of each of the first order models.

Moreover, suppose a sixth and seventh first order model, $F_6$ and $F_7$, are introduced, and further suppose that each of these models have only 0.5 reliability in area A (i.e., a target MS is as likely to be in a location estimate generated by this model as it is not). Additionally, suppose that the criteria for measuring reliability is made more rigorous in that it is required that the target MS must be in four location estimates simultaneously. Under these conditions, the reliability is approximately 0.85. That is, even with a more rigorous reliability definition, and with a majority of the first order models providing low reliability (i.e., less than or equal to 0.60), the synergies of the simultaneous location estimates produces a substantial magnification in the reliability of the entire location system.

It is important, however, to keep in mind that, as mentioned above, the analysis performed here assumes that the models are substantially independent. It is believed that seven such independent first order models can be obtained that substantially satisfy this constraint. Also note that in many cases multiple instantiations of such models can be activated simultaneously with wireless signal measurements from different collections of base stations. Moreover, since the forward transmissions from the base station network to a target MS is in a different bandwidth from the reverse transmissions from the target MS to the base station network, the forward and reverse signals can behave differently. Thus, for a first order model based on forward signal measurements, there is likely to be a corresponding first order model based on reverse signal measurements that has a similar computational technique. It is also important to note that the analysis performed here does not take into account the location hypothesis adjustment step mentioned above (and described further below). Accordingly, it is believed that even better system reliabilities can be obtained by performing the adjusting step.

(ii) Theoretical Computations Related to Location Estimation Accuracy

Turning now to the accuracy aspect of wireless location, accuracy as used herein is intended to substantially correspond to the area sizes of MS location estimates, that is, assuming the shapes of the location estimates are not, in general, grossly oblong. Accordingly, circles, squares, hexagons and other similar polygonal area shapes are considered appropriate. Moreover, for simplicity it is assumed that there are no "holes" (i.e., excluded areas encircled by a location estimate) in the location estimates. However, even with such assumptions in place, to compute accuracy by computing expected area sizes for overlaps in location estimates is beyond the scope of this document. Accordingly, in order to provide a quantitative indication as to accuracy enhancements possible by using multiple simultaneous independent MS location estimates, squares of the same size will be assumed for the location estimates generated by the first order models. Thus, to estimate accuracy, an average or expected area size overlap between two of the generated square location estimates will be first computed.

To compute the average area size overlap, a grid is superimposed on each such generated location estimate square so that a cell mesh of smaller cell squares is obtained. In particular, the mesh provided is an N by N array of cells, where N>=3. Additionally, to estimate an average size of an overlap (i.e., intersection) between two generated location estimate squares, having N by N cell meshes, also assume that each intersection must be on mesh boundaries of the intersecting generated location estimates. The following diagram illustrates two generated location estimate squares overlapping in the two pattern filled smaller cell mesh squares (for a 4 by 4 cell mesh).

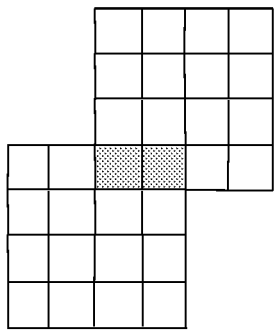

Further, assume that all possible overlaps have the same probability of occurring.

Accordingly, the area size of an average intersection between two such generated location estimate squares can be computed by determining the number of different intersections and the areas of each intersection. Note that for two location estimate squares having N by N cell meshes, the number of different intersections is: $[N*(N-1)*4]+1$. Thus, using the average intersection size, a ratio of the area of the average intersection to the total area of one of the generated location estimate squares can be computed. Unfortunately, this ratio varies with the number N. However, the ratio appears to asymptotically converge as TABLE A below illustrates (i.e., the deltas of the third column). Thus, it is believed that this ratio is generally less than 0.3 of the original square area as the second column of the following table indicates.

TABLE A

| Cell Mesh Configuration | Ratio of Average Overlap Area to Original Location Estimate Square Area | Overlap Ratio Deltas (previous-current) | Average number of Mesh Cells in an Intersection of Two Original Location Estimates | Average difference between length and width of an overlap |
| --- | --- | --- | --- | --- |
| 3 by 3 | 0.3600 | | 3.24 | 0.80 |
| 4 by 4 | 0.3265 | 0.0335 | 5.22 | 1.14 |
| 5 by 5 | 0.3086 | 0.0179 | 7.71 | 1.48 |
| 6 by 6 | 0.2975 | 0.0111 | 10.7 | 1.82 |
| 7 by 7 | 0.2899 | 0.0076 | 14.2 | 2.15 |
| 8 by 8 | 0.2844 | 0.0055 | 18.2 | 2.49 |
| 9 by 9 | 0.2803 | 0.0042 | 22.7 | 2.82 |
| 10 by 10 | 0.2770 | 0.0033 | 27.7 | 3.16 |

Thus, using 0.3 as a conservative estimate of the ratio of the area of the average intersection to the area of one of the generated location estimate squares, this implies that an average intersection size will be only 0.3 of the area of one of the generated location estimates. Additionally, note that in all examples of TABLE A, by comparing the average number of mesh cells in an intersection (column four) with the corresponding average difference between the length and the width of an intersection (column five), it can be seen that a typical intersection is very close to also being a square.

Accordingly, to illustrate the accuracy enhancements possible simply by using multiple simultaneous independent MS location estimates, let $I_{1,2}$ be a non-empty intersection of generated location estimate squares $L_1$ and $L_2$, and, let $I_{3,4}$ be a non-empty intersection of generated location estimate squares $L_3$ and $L_4$. Then as TABLE A illustrates, both intersections are likely to be very close to being squares. However, $I_{1,2}$ and $I_{3,4}$ may be of very different sizes. Assume that $I_{1,2}$ is of a size less than or equal to that of $I_{3,4}$, then if cell rows and/or cell columns were added to $I_{1,2}$ so that it has a size comparable to $I_{3,4}$ and additionally is square (or substantially so), then it is expected that the intersection of $I_{1,2}$ and $I_{3,4}$ would be 0.3 (or less) of $I_{3,4}$. Thus, if the generated location estimate squares $L_1$, $L_2$, $L_3$, and $L_4$ are generated in a manner that is substantially independent of the way the others are generated, then it is expected that the reduction in area size over the size of the original generated location estimate squares is on the order of 0.09.

Referring back to the seven first order models, $F_i$, discussed above, an example can now be given tying the above accuracy analysis with the reliability analysis preceding it. If each of the seven first order models $F_i$ simultaneously generates a location hypothesis having a corresponding location estimate square of equal size, then it is expected that approximately 85% of the time a simultaneous intersection of four of the location estimates contains the target MS, and further that the intersection of these location estimates yields an area that is likely nearly square with an area on the order of 0.09 of one of the original location estimate squares. Thus, for illustration, if each of the original generated location estimate squares is approximately 1,460 feet on a side, then such squares can be circumscribed by a circle with a diameter of approximately 2,065 feet (i.e., about 0.4 miles). Further, the simultaneous intersection of four of these squares is likely to provide an area of 191,844 sq. ft. in a generally square area. Thus, this intersection area should likely be close to a square of 438 feet per side. Accordingly, such a square can be contained within circular area, C, having a diameter of 619 feet. Accordingly, approximately 85% of the time the target MS is within 310 feet of the center of C.

Thus, in one simple embodiment of the novel method and/or system disclosed herein, each of the first order models can be provided with a corresponding set of reliability measurements, wherein for each set, each measurement therein is a measurement of the reliability of the model (corresponding to the set) within a particular area of the wireless coverage area. In particular, the reliability measurements of each set can be determined by activating each model on archived historical measurements of wireless signals from target mobile stations whose locations have been both verified and also archived. Accordingly, when a particular first order model outputs a location hypothesis having an MS location area estimate, E, the reliability measurement for the model in an area containing A can be used as a confidence value indicating the likelihood of the target MS being in E. Since the confidence values are probabilities, calculations similar to (or identical to) those used to determine reliability above can be performed for determining a measurement of the likelihood that the target MS is in each of the (any) intersections of the location hypotheses output by the models.

It is also worthwhile to mention that further enhancements in reliability can be obtained by increasing the reliability of the models $F_i$. The above illustration is believed to be conservative in that four of the first order models $F_i$ have relatively poor reliability (i.e., 0.60 or less). Said other way, reliabilities exceeding those of at least some the models $F_i$ are believed to be attainable. For example, since a wireless location system according to the novel method and/or system disclosed herein may utilize multiple trainable location generating models such as artificial neural networks (ANNs), and since such ANNs are commonly trained to perform at levels of 90% or better in many problem domains, it is believed that increases in reliability and/or accuracy of the generated location hypotheses is achievable. Moreover, such increases are likely in areas of high population density since in such areas there is likely to be a greater number of network base stations detected by and/or detecting a target MS simultaneously. That is, there is the capability for increasing the amount of independent wireless signal measurement data that can be utilized by such trainable first order models in locating the target MS.

Context Adjuster Introduction.

The context adjuster (alternatively denoted "location adjuster modules) 1326 module enhances both the comparability and predictability of the location hypotheses output by the first order models 1224. In one embodiment (typically where confidence values of location hypotheses are not maintained as probabilities), this module modifies location hypotheses received from the FOMs 1224 so that the resulting location hypotheses output by the context adjuster 1326 may be further processed uniformly and substantially without concern as to differences in accuracy between the first order models from which location hypotheses originate. Further, embodiments of the context adjuster may determine those factors that are perceived to impact the perceived accuracy (e.g., confidence) of the location hypotheses. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.).

It is also an important and novel aspect of the context adjuster 1326 that the methods for adjusting location hypotheses provided in this module may be generalized and thereby also utilized with multiple hypothesis computational architectures related to various applications wherein a terrain, surface, volume or other "geometric" interpretation (e.g., a metric space of statistical samples) may be placed on a large body of stored application data for relating hypothesized data to verified data. Moreover, it is important to note that various techniques for "visualizing data" may provide such a geometric interpretation. Thus, the methods herein may be utilized in applications such as:

(a) sonar, radar, x-ray or infrared identification of objects such as occurs in robotic navigation, medical image analysis, geological, and radar imaging.

More generally, the novel computational paradigm of the context adjuster 1326 may be utilized in a number of applications wherein there is a large body of archived information providing verified or actual application process data related to the past performance of the application process.

It is worth mentioning that the computational paradigm used in the context adjuster 1326 is a hybrid of a hypothesis adjuster and a data base query mechanism. For example, the context adjuster 1326 uses an input (location) hypothesis both as an hypothesis and as a data base query or index into the location signature data base 1320 for constructing a related but more accurate location hypothesis.

The context adjuster 1326 tends to create hypotheses that are more accurate than the hypotheses generated by the initial hypotheses generators. That is, for each hypothesis, H, provided by one of the initial hypothesis generators, G (e.g., a FOM 1224), a corresponding enhanced hypothesis, provided by the context adjuster 1326, is generated by mapping the past performance of G into the archived verified application data (as will be discussed in detail hereinbelow). In particular, the context adjuster hypothesis generation is based on the archived verified (or known) performance application data that is related to both G and H. For example, in the present wireless location application, if a FOM 1224, G, substantially consistently generates, in a particular geographical area, location hypotheses that are biased approximately 1000 feet north of the actual verified MS 140 location, then the context adjuster 1326 can generate corresponding hypotheses without this bias. Thus, the context adjuster 1326 tends to filter out inaccuracies in the initially generated hypotheses.

Therefore in a multiple hypothesis architecture where typically the generated hypotheses may be evaluated and/or combined for providing a "most likely" result, it is believed that a plurality of relatively simple (and possibly inexact) initial hypothesis generators may be used in conjunction with the hybrid computational paradigm represented by the context adjuster 1326 for providing enhanced hypotheses with substantially greater accuracy.

Additionally, note that this hybrid paradigm applies to other domains that are not geographically based. For instance, this hybrid paradigm applies to many prediction and/or diagnostic applications for which:

(a) the application data and the application are dependent on a number of parameters whose values characterize the range of outputs for the application. That is, there is a set of parameters, $p_1, p_2, p_3, \ldots, p_N$ from which a parameter space $p_1 \times p_2 \times p_3 \times \ldots \times p_N$ is derived whose points characterize the actual and estimated (or predicted) outcomes. As examples, in the MS location system, $p_1$=latitude and $p_2$=longitude;

(b) there is historical data from which points for the parameter space, $p_1 \times p_2 \times p_3 \times \ldots \times p_N$ can be obtained, wherein this data relates to (or indicates) the performance of the application, and the points obtained from this data are relatively dense in the space (at least around the likely future actual outcomes that the application is expected to predict or diagnose). For example, such historical data may associate the predicted outcomes of the application with corresponding actual outcomes;

(c) there is a metric or distance-like evaluation function that can be applied to the parameter space for indicating relative closeness or accuracy of points in the parameter space, wherein the evaluation function provides a measurement of closeness that is related to the actual performance of the application.

Note that there are numerous applications for which the above criteria are applicable. For instance, computer aided control of chemical processing plants are likely to satisfy the above criteria. Certain robotic applications may also satisfy this criteria. In fact, it is believed that a wide range of signal processing applications satisfy this criteria.

A second embodiment of the context adjuster will now be described. Referring now to FIG. 19, each location hypothesis generated by the first order models 1224 can be provided to one or more adjuster modules (F*ig*. 15) for adjusting the generated location hypothesis according to the performance of the first order model in the specific localized area "nearby" the newly generated location estimate of the location hypothesis. Thus, for partition areas where there is substantial archived verified location data in the Location Signature Data Base 1320, such an adjuster module can generate an additional derived location estimate. That is, for archived mobile station location estimates previously generated by the first order model wherein these archived location estimates are also "nearby" or adjacent to the centroid or point location estimate of a newly generated location estimate, these archived location estimates are used to retrieve their corresponding verified or actual mobile station locations. Subsequently, the retrieved verified mobile station locations are used to derive an area that becomes another location estimate of the target mobile station, this derived location estimate being denoted herein as an "adjusted image". In particular, the retrieved locations may be used to generate a convex hull in the coverage area, and subsequently cover the convex hull with a minimal covering of cells from a cell mesh that also partitions the coverage area (each cell of this mesh being, for example, a 300 ft by 300 ft square). Accordingly, it is believed that such adjusted location hypotheses can, in many circumstances, provide enhanced mobile station location estimating performance. Moreover, a probability can also be computed for each adjusted location hypothesis indicating the likelihood that the target mobile station is contained in the location estimate of the adjusted location hypothesis. Note that this probability can be computed in a manner similar to the computation of the probabilities discussed above for location hypotheses generated directly from the first order models. That is, by considering the first order model 1224 and the adjuster module as a single location hypothesis generating computational unit, and providing this unit, iteratively, with archived measurements of wireless transmissions between the base station network and target mobile stations at various corresponding archived verified locations within a partition area A, a probability for the partition area can be determined as to how likely this computational unit is to generate a location hypothesis having a location estimate containing a target mobile station location for the partition area A. Accordingly, a table of location partition area probabilities can be determined for each such computational unit. Thus, when an adjusted location hypothesis is derived for one of the partition areas, the corresponding probability may be assigned as the confidence value.

In FIG. 15, two such adjuster modules are shown, namely, an adjuster for enhancing reliability 1436 and an adjuster for enhancing accuracy 1440. Both of these adjusters perform their location hypothesis adjustments in the manner described above. The difference between these two adjuster modules 1436 and 1440 is primarily the size of the localized area "nearby" the newly generated location estimate. In particular, since it is believed that the larger (smaller) the localized nearby area is, the more likely (less likely) the corresponding adjusted image is to contain the target mobile station location, the adjuster for enhancing reliability 1436 may determine its localized areas "nearby" a newly generated location estimate as, for example, having a 40% larger diameter (alternatively, area) than the location area estimate generated by a first order model 1224. Alternatively, the adjuster for enhancing accuracy 1444 may determine its localized areas "nearby" a newly generated location estimate as, for example, having a 30% smaller diameter (alternatively, area) than the location area estimate generated by a first order model 1224. Thus, each newly generated location hypothesis can potentially be used to derive at least two additional adjusted location hypotheses with some of these adjusted location hypotheses being more reliable and some being more accurate than the location hypotheses generated directly from the first order models 1224.

MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous location engine 139 activations to determine, for example, a movement of the target MS 140 between evaluations of the target MS location Control and Output Gating Modules A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

(a) controls and monitors location estimating processing for each target MS 140. Note that this includes high level exception or error handling functions;

(b) receives and routes external information as necessary. For instance, this subsystem may receive (via, e.g., the public telephone switching network and Internet 1362) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet 468);

(d) performs accounting and billing procedures;

(e) interacts with location center operators by, for example, receiving operator commands and providing output indicative of processing resources being utilized and malfunctions;

(f) provides access to output requirements for various applications requesting location estimates. For example, an Internet location request from a trucking company in Los Angeles to a location center 142 in Denver may only want to know if a particular truck or driver is within the Denver area. Alternatively, a local medical rescue unit is likely to request as precise a location estimate as possible.

Note that in FIG. 6 (a)–(d) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided according to a particular protocol.

System Tuning and Adaptation: The Adaptation Engine

A fifth functional group of location engine 139 modules provides the ability to enhance the MS locating reliability and/or accuracy of a wireless location system according to the novel method and/or system dislcosed herein by providing it with the capability to adapt to particular operating configurations, operating conditions and wireless signaling environments without performing intensive manual analysis of the performance of various embodiments of the location engine 139. That is, this functional group automatically enhances the performance of the location engine for locating MSs 140 within a particular coverage area 120 using at least one wireless network infrastructure therein. More precisely, this functional group allows the wireless location system to adapt by tuning or optimizing certain system parameters according to location engine 139 location estimate accuracy and reliability.

Implementations of First Order Models

Further descriptions of various first order models 1224 are provided in this section.

Distance First Order Models (TOA/DOA)

As discussed in the Location Center Architecture Overview section herein above, distance models determine a presumed direction and/or distance that a target MS 140 is from one or more base stations 122. In some embodiments of distance models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA),
(b) signal strength measurements, and/or
(c) signal angle of arrival measurements.

Furthermore, such signal analysis techniques are likely predicated on certain very general assumptions that can not fully account for signal attenuation and multipath due to a particuar radio coverage area topography.

Taking a CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristics measurements (e.g., TOA and/or TDOA measurements) between the target MS 140 and the base stations in one more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration of the time difference multilateration algorithms along with the known positions of the corresponding base stations 122 to thereby obtain one or more location estimates of the target MS 140. For example, if there are, four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates of the location of the target MS 140. Further, since such measurements and BS 122 positions can be sent either to the network of the target MS 140, location can be determined in either entity.

Since many of the signal measurements utilized by embodiments of distance models are subject to signal attenuation and multipath due to a particular area topography. Many of the sets of base stations from which target MS location estimates are desired may result in either no location estimate, or an inaccurate location estimate.

Accordingly, some embodiments of distance FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying by filtering can be performed by, for example, an expert system residing in the distance FOM.

A second approach for mitigating such ambiguity or conflicting MS location estimates is particularly novel in that each of the target MS location estimates is used to generate a location hypothesis regardless of its apparent accuracy. Accordingly, these location hypothesis are input to an alternative embodiment of the context adjuster 1326 that is substantially (but not identical to) the context adjuster as described as described in detail in Appendix D of U.S. Pat. Appl. Ser. No. 09/194,367 (from which the present patent application claims priority), so that each location hypothesis may be adjusted to enhance its accuracy. In contradistinction to the embodiment of the context adjuster 1326 of APPENDIX D of U.S. Pat. Appl. Ser. No. 09/194,367, where each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypothesis generated by a distance first order model according to a past performance of the model as applied to signal characteristic measurements from the same set of base stations 122 as were used in generating the location hypothesis. That is, instead of only using only an identification of the distance model (i.e., its FOM_ID) to, for example, retrieve archived location estimates generated by the model in an area of the location hypothesis' estimate (when determining the model's past performance), the retrieval retrieves only the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

Stochastic First Order Model

The stochastic first order models may use statistical prediction techniques such as principle decomposition partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature data base 1320.

Pattern Recognition and Adaptive First Order Models

It is a particularly important aspect of a wireless location system according to the novel method and/or system disclosed herein to provide:
  (a) one or more FOMs 1224 that generate target MS 140 location estimates by using pattern recognition or associativity techniques, and/or
  (b) one or more FOMs 1224 that are adaptive or trainable so that such FOMs may generate increasingly more accurate target MS location estimates from additional training.

Statistically Based Pattern Recognition First Order Models

Regarding FOMs 1224 using pattern recognition or associativity techniques, there are many such techniques available. For example, there are statistically based systems such as "CART" (an acronym for Classification and Regression Trees) by ANGOSS Software International Limited of Toronto, Canada that may be used for automatically detecting or recognizing patterns in data that were unprovided (and likely previously unknown). Accordingly, by imposing a relatively fine mesh or grid of cells on the radio coverage area, wherein each cell is entirely within a particular area type categorization such as the transmission area types (discussed in the section, "Coverage Area: Area Types And Their Determination" above), the verified location signature clusters within the cells of each area type may be analyzed for signal characteristic patterns. If such patterns are found, then they can be used to identify at least a likely area type in which a target MS is likely to be located. That is, one or more location hypotheses may be generated having target MS 140 location estimates that cover an area having the likely area type wherein the target MS 140 is located. Further note that such statistically based pattern recognition systems as "CART" include software code generators for generating expert system software embodiments for recognizing the patterns detected within a training set (e.g., the verified location signature clusters).

Accordingly, although an embodiment of a FOM as described here may not be exceedingly accurate, it may be very reliable. Thus, since a fundamental aspect of the novel method and/or system disclosed herein is to use a plurality MS location techniques for generating location estimates and to analyze the generated estimates (likely after being adjusted) to detect patterns of convergence or clustering among the estimates, even large MS location area estimates are useful. For example, it can be the case that four different and relatively large MS location estimates, each having very high reliability, have an area of intersection that is acceptably precise and inherits the very high reliability from each of the large MS location estimates from which the intersection area was derived.

Adaptive/Trainable First Order Models

Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive" by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the novel method and/or system disclosed herein to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

Artificial Neural Networks for MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the novel method and/or system disclosed herein that the training of such artificial neural net based FOMs (ANN FOMs) is provided without manual intervention as will be discussed hereinbelow.

Detailed Description of the Hypothesis Evaluator Modules

Context Adjuster Embodiments

The context adjuster 1326 performs the first set of potentially many adjustments to at least the confidences of location hypotheses, and in some important embodiments, both the confidences and the target MS location estimates provided by FOMs 1224 may be adjusted according to previous performances of the FOMs. More particularly, as mentioned above, the context adjuster adjusts confidences so that, assuming there is a sufficient density verified location signature clusters captured in the location signature data base 1320, the resulting location hypotheses output by the context adjuster 1326 may be further processed uniformly and substantially without concern as to differences in accuracy between the first order models from which location hypotheses originate. Accordingly, the context adjuster adjusts location hypotheses both to environmental factors (e.g., terrain, traffic, time of day, etc., as described in 30.1 above), and to how predictable or consistent each first order model (FOM) has been at locating previous target MS's whose locations were subsequently verified.

Of particular importance is the novel computational paradigm utilized herein. That is, if there is a sufficient density of previous verified MS location data stored in the location signature data base 1320, then the FOM location hypotheses are used as an "index" into this data base (i.e., the location signature data base) for constructing new target MS 140 location estimates. A more detailed discussion of this aspect of the novel method and/or system disclosed herein is given hereinbelow. Accordingly, only a brief overview is provided here. Thus, since the location signature data base 1320 stores previously captured MS location data including:

(a) clusters of MS location signature signals (see the location signature data base section for a discussion of these signals) and (b) a corresponding verified MS location, for each such cluster, from where the MS signals originated, The context adjuster 1326 uses newly created target MS location hypotheses output by the FOMs as indexes or pointers into the location signature data base for identifying other geographical areas where the target MS 140 is likely to be located based on the verified MS location data in the location signature data base.

In particular, at least the following two criteria are addressed by the context adjuster 1326:

(32.1) Confidence values for location hypotheses are to be comparable regardless of first order models from which the location hypotheses originate. That is, the context adjuster moderates or dampens confidence value assignment distinctions or variations between first order models so that the higher the confidence of a location hypothesis, the more likely (or unlikely, if the location hypothesis indicates an area estimate where the target MS is NOT) the target MS is perceived to be in the estimated area of the location hypothesis regardless of the First Order Model from which the location hypothesis was output;

(32.2) Confidence values for location hypotheses may be adjusted to account for current environmental characteristics such as month, day (weekday or weekend), time of day, area type (urban, rural, etc.), traffic and/or weather when comparing how accurate the first order models have previously been in determining an MS location according to such environmental characteristics. For example, in one embodiment such environmental characteristics are accounted for by utilizing a transmission area type scheme (as discussed in section 5.9 above) when adjusting confidence values of location hypotheses.

Note that in satisfying the above two criteria, the context adjuster 1326, at least in one embodiment, may use heuristic (fuzzy logic) rules to adjust the confidence values of location hypotheses from the first order models. Additionally, the context adjuster may also satisfy the following criteria:

(33.1) The context adjuster may adjust location hypothesis confidences due to BS failure(s), (33.2) Additionally in one embodiment, the context adjuster may have a calibration mode for at least one of:
   (a) calibrating the confidence values assigned by first order models to their location hypotheses outputs;
   (b) calibrating itself.

Additional details of embodiments of the context adjuster 1326 can be found in the publication, "Wireless Location System," by Dupray and Karr having International Patent Application No. PCT/US97/15892 filed Sep. 8, 1997, and also having a corresponding U.S. national patent application Ser. No. 09/194,367 filed Nov. 24, 1998, wherein both of these documents are fully incorporated herein by reference.

Location Hypothesis Analyzer Embodiment

The location hypothesis analyzer is primarily for embodiments of a wireless location system according to the novel method and/or system disclosed herein where the location hypothesis confidence values are not probabilities, and may therefore be modified easily. Referring now to FIG. 7, an embodiment of the Hypothesis Analyzer is illustrated. The control component is denoted the control module 1400. Thus, this control module manages or controls access to the run time location hypothesis storage area 1410. The control module 1400 and the run time location hypothesis storage area 1410 may be implemented as a blackboard system and/or an expert system. Accordingly, in the blackboard embodiment, and the control module 1400 determines when new location hypotheses may be entered onto the blackboard from other processes such as the context adjuster 1326 as well as when location hypotheses may be output to the most likelihood estimator 1344.

The following is a brief description of each submodule included in the location hypothesis analyzer 1332.

(35.1) A control module 1400 for managing or controlling further processing of location hypotheses received from the context adjuster. This module controls all location hypothesis processing within the location hypothesis analyzer as well as providing the input interface with the context adjuster. There are numerous embodiments that may be utilized for this module, including, but not limited to, expert systems and blackboard managers.

(35.2) A run-time location hypothesis storage area 1410 for retaining location hypotheses during their processing by the location hypotheses analyzer. This can be, for example, an expert system fact base or a blackboard. Note that in some of the discussion hereinbelow, for simplicity, this module is referred to as a "blackboard". However, it is not intended that such notation be a limitation i.e., the term "blackboard" hereinafter will denote a run-time data repository for a data processing paradigm wherein the flow of control is substantially data-driven.

(35.3) An analytical reasoner module 1416 for determining if (or how well) location hypotheses are consistent with well known physical or heuristic constraints as, e.g., mentioned in (30.4) above. Note that this module may be a daemon or expert system rule base.

(35.4) An historical location reasoner module 1424 for adjusting location hypotheses' confidences according to how well the location signature characteristics (i.e., loc sigs) associated with a location hypothesis compare with "nearby" loc sigs in the location signature data base as indicated in (30.3) above. Note that this module may also be a daemon or expert system rule base.

(35.5) A location extrapolator module 1432 for use in updating previous location estimates for a target MS when a more recent location hypothesis is provided to the location hypothesis analyzer 1332. That is, assume that the control module 1400 receives a new location hypothesis for a target MS for which there are also one or more previous location hypotheses that either have been recently processed (i.e., they reside in the MS status repository 1338, as shown best in FIG. 6), or are currently being processed (i.e., they reside in the run-time location hypothesis storage area 1410). Accordingly, if the active_timestamp (see FIGS. 9A, B regarding location hypothesis data fields) of the newly received location hypothesis is sufficiently more recent than the active_timestamp of one of these previous location hypotheses, then an extrapolation may be performed by the location extrapolator module 1432 on such previous location hypotheses so that all target MS location hypotheses being concurrently analyzed are presumed to include target MS location estimates for substantially the same point in time. Thus, initial location estimates generated by the FOMs using different wireless signal measurements, from different signal transmission time intervals, may have their corresponding dependent location hypotheses utilized simultaneously for determining a most likely target MS location estimate. Note that this module may also be daemon or expert system rule base.

(35.6) hypothesis generating module 1428 for generating additional location hypotheses according to, for example, MS location information not adequately utilized or modeled. Note, location hypotheses may also be decomposed here if, for example it is determined that a location hypothesis includes an MS area estimate that has subareas with radically different characteristics such as an MS area estimate that includes an uninhabited area and a densely populated area. Additionally, the hypothesis generating module 1428 may generate "poor reception" location hypotheses that specify MS location areas of known poor reception that are "near" or intersect currently active location hypotheses. Note, that these poor reception location hypotheses may be specially tagged (e.g., with a distinctive FOM_ID value or specific tag field) so that regardless of substantially any other location hypothesis confidence value overlapping such a poor reception area, such an area will maintain a confidence value of "unknown" (i.e., zero). Note that substantially the only exception to this constraint is location hypotheses generated from mobile base stations 148. Note that this module may also be daemon or expert system rule base.

In the blackboard system embodiment of the location hypothesis analyzer, a blackboard system is the mechanism by which the last adjustments are performed on location hypotheses and by which additional location hypotheses may be generated. Briefly, a blackboard system can be described as a particular class of software that typically includes at least three basic components. That is:

(36.1) a data base called the "blackboard," whose stored information is commonly available to a collection of programming elements known as "daemons", wherein, in a wireless location system according to the novel method and/or system disclosed herein, the blackboard includes information concerning the current status of the location hypotheses being evaluated to determine a "most likely" MS location estimate. Note that this data base is provided by the run time location hypothesis storage area 1410;

(36.2) one or more active (and typically opportunistic) knowledge sources, denoted conventionally as "daemons," that create and modify the contents of the blackboard. The blackboard system employed requires only that the daemons have application knowledge specific to the MS location problem addressed by a wireless location system according to the novel method and/or system disclosed herein. As shown in FIG. 7, the knowledge sources or daemons in the hypothesis analyzer include the analytical reasoner module 1416, the hypothesis generating module 1428, and the historical location reasoner module 1416;

(36.3) a control module that enables the realization of the behavior in a serial computing environment. The control element orchestrates the flow of control between the various daemons. This control module is provided by the control module 1400.

Note that this blackboard system may be commercially available, however, the knowledge sources, i.e., daemons, may be developed specifically for an embodiment of the novel method and/or system disclosed herein. For further information regarding such blackboard systems, the following references are incorporated herein by reference: (a) Jagannathan, V., Dodhiawala, R., & Baum, L. S. (1989). Blackboard architectures and applications. Boston, Mass.: Harcourt Brace Jovanovich Publishers; (b) Engelmore, R., & Morgan, T. (1988). Blackboard systems. Reading, Mass.: Addison-Wesley Publishing Company.

Alternatively, the control module 1400 and the run-time location hypothesis storage area 1410 may be implemented as an expert system or as a fuzzy rule inferencing system, wherein the control module 1400 activates or "fires" rules related to the knowledge domain (in the present case, rules relating to the accuracy of MS location hypothesis estimates), and wherein the rules provide a computational embodiment of, for example, constraints and heuristics related to the accuracy of MS location estimates. Thus, the control module 1400 for the present embodiment is also used for orchestrating, coordinating and controlling the activity of the individual rule bases of the location hypothesis analyzer (e.g. as shown in FIG. 7, the analytical reasoner module 1416, the hypothesis generating module 1428, the historical location reasoner module 1424, and the location extrapolator module 1432). For further information regarding such expert systems, the following reference is incorporated herein by reference: Waterman, D. A. (1970). A guide to expert systems. Reading, Mass.: Addison-Wesley Publishing Company.

MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location Most Likelihood Estimator Embodiment The most likelihood estimator 1344 is a module for determining a "most likely" location estimate for a target MS 140 being located (e.g., as in (30.7) above). In one embodiment, the most likelihood estimator performs an integration or summing of all location hypothesis confidence values for any geographic region(s) of interest having at least one location hypothesis that has been provided to the most likelihood estimator, and wherein the location hypothesis has a relatively (or sufficiently) high confidence. That is, the most likelihood estimator 1344 determines the area(s) within each such region having high confidences (or confidences above a threshold) as the most likely target MS 140 location estimates.

In one embodiment of the most likelihood estimator 1344, this module utilizes an area mesh, M, over which to integrate, wherein the mesh cells of M are preferably smaller than the greatest location accuracy desired. That is, each cell, c, of M is assigned a confidence score indicating a likelihood that the target MS 140 is located in c, wherein the confidence score for c is determined by the confidence values of the target MS location estimates provided to the most likelihood estimator 1344. Thus, to obtain the most likely location determination(s) the following steps are performed:

(a) For each of the active location hypotheses output by, e.g., the hypothesis analyzer 1332 (alternatively, the context adjuster 1326), each corresponding MS location area estimate, LAE, is provided with a smallest covering, $C_{LEA}$, of cells c from M.

(b) Subsequently, assuming confidence values are probabilities, adjust the confidence score of each of the cells of $C_{LEA}$ by adding to it the confidence value for LAE divided by the number of cells in $C_{LEA}$. Also, for each cell outside of $C_{LEA}$ and within some reasonable larger area A (e.g., the intersection of the coverage areas of each base station detected by the target MS 140), add:

(1−(the confidence value of $C_{LEA}$)) divided by (the number of cells in A−$C_{LEA}$)

(c) Given that the confidence values are within a particular range (e.g., 0 to 1 when the confidence values are probabilities), and that this range has been partitioned into intervals, Int, having lengths of, e.g., 0.05, for each interval, Int, perform a cluster analysis function for clustering cells with confidences that are in Int. Thus, a topographical-type map may be constructed from the resulting cell clusters, wherein higher confidence areas are analogous to representations of areas having higher elevations.

(d) Output a representation of the resulting clusters for each Int to the output gateway 1356 for determining the location granularity and representation desired by each location application 146 requesting the location of the target MS 140.

Of course, variations in the above algorithm are also within the scope of the novel method and/or system disclosed herein. For example, some embodiments of the most likelihood estimator 1344 may:

(e) Perform special processing for areas designated as "poor reception" areas. For example, the most likelihood estimator 1344 may be able to impose a confidence value of zero (i.e., meaning it is unknown as to whether the target MS is in the area) on each such poor reception area regardless of the location estimate confidence values unless there is a location hypothesis from a reliable and unanticipated source. That is, the mesh cells of a poor reception area may have their confidences set to zero unless, e.g., there is a location hypothesis derived from target MS location data provided by a mobile base station 148 that: (a) is near the poor reception area, (b) able to detect that the target MS 140 is in the poor reception area, and (c) can relay target MS location data to the location center 142. In such a case, the confidence of the target MS location estimate from the MBS location hypothesis may take precedence.

Figure 10:
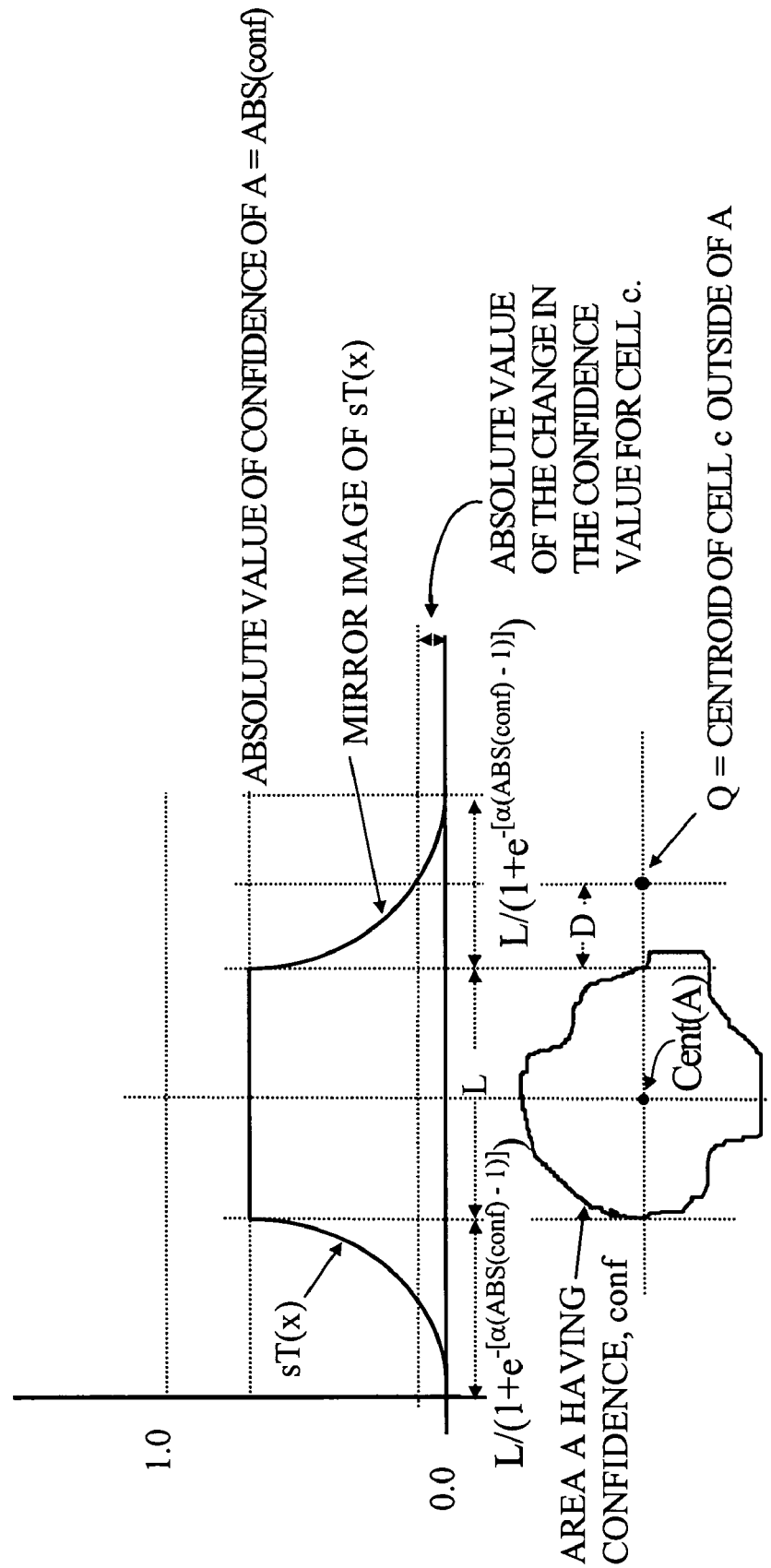
FIG. 10 is a graphical illustration of the computation performed by the most likelihood estimator 1344 of the hypothesis evaluator.

(f) Additionally, in some embodiments of the most likelihood estimator 1344, cells c of M that are "near" or adjacent to a covering $C_{LEA}$ may also have their confidences adjusted according to how near the cells c are to the covering. That is, the assigning of confidences to cell meshes may be "fuzzified" in the terms of fuzzy logic so that the confidence value of each location hypothesis utilized by the most likelihood estimator 1344 is provided with a weighting factor depending on its proximity to the target MS location estimate of the location hypothesis. More precisely, it is believed that "nearness," in the present context, should be monotonic with the "wideness" of the covering; i.e., as the extent of the covering increases (decreases) in a particular direction, the cells c affected beyond the covering also increases (decreases). Furthermore, in some embodiments of the most likelihood estimator 1344, the greater (lesser) the confidence in the LEA, the more (fewer) cells c beyond the covering have their confidences affected. To describe this technique in further detail, reference is made to FIG. 10, wherein an area A is assumed to be a covering $C_{LEA}$ having a confidence denoted "conf". Accordingly, to determine a confidence adjustment to add to a cell c not in A (and additionally, the centroid of A not being substantially identical with the centroid of c which could occur if A were donut shaped), the following steps may be performed:

(i) Determine the centroid of A, denoted Cent(A).

(ii) Determine the centroid of the cell c, denoted Q.

(iii) Determine the extent of A along the line between Cent(A) and Q, denoted L.

(iv) For a given type of probability density function, P(x), such as a Gaussian function, let T be the beginning portion of the function that lives on the x-axis interval [0, t], wherein P(t)=ABS(conf)=the absolute value of the confidence of $C_{LEA}$.

(v) Stretch T along the x-axis so that the stretched function, denoted sT(x), has an x-axis support of [0, $L/(1+e^{-[a(ABS(conf)-1)]})$], where a is in range of 3.0 to 10.0; e.g., 5.0. Note that sT(x) is the function, $P(x*(1+e^{-[a(ABS(conf)-1)]})/L)$, on this stretched extent. Further note that for confidences of +1 and −1, the support of sT(x) is [0, L] and for confidences at (or near) zero this support. Further, the term, $L/(1+e^{-[a(ABS(conf)-1)]})$ is monotonically increasing with L and ABS(conf).

(vi) Determine D=the minimum distance that Q is outside of A along the line between Cent(A) and Q.

(vii) Determine the absolute value of the change in the confidence of c as sT(D).

(viii) Provide the value sT(D) with the same sign as conf, and provide the potentially sign changed value sT(D) as the confidence of the cell c.

Additionally, in some embodiments, the most likelihood estimator 1344, upon receiving one or more location hypotheses from the hypothesis analyzer 1332, also performs some or all of the following tasks:

(37.1) Determines the area of interest over which to perform the integration. In one embodiment, this area is a convex hull including each of the MS area estimates from the received location hypotheses (wherein such location hypotheses have not been removed from consideration by the filtering process of (37.1));

(37.2) Determines, once the integration is performed, one or more collections of contiguous area mesh cells that may be deemed a "most likely" MS location estimate, wherein each such collection includes one or more area mesh cells having a high confidence value.

Hypothesis Generating Module

The hypothesis generating module 1428 (FIG. 7) is used for generating additional location hypotheses according to, for example, MS location information not adequately utilized or modeled. Note, location hypotheses may also be decomposed here if, for example it is determined that a location hypothesis includes an MS area estimate that has subareas with radically different characteristics such as an area that includes an uninhabited area and a densely populated area. Additionally, the hypothesis generating module 1428 may generate "poor reception" location hypotheses that specify MS location areas of known poor reception that are "near" or intersect currently active location hypotheses. Note, that these poor reception location hypotheses may be specially tagged (e.g., with a distinctive FOM_ID value or specific tag field) so that regardless of substantially any other location hypothesis confidence value overlapping such a poor reception area, such an area will maintain a confidence value of "unknown" (i.e., zero). Note that substantially the only exception to this constraint is location hypotheses generated from mobile base stations 148.

Mobile Base Station Location Subsystem Description

Mobile Base Station Subsystem Introduction

Any collection of mobile electronics (denoted mobile location unit) that is able to both estimate a location of a target MS 140 and communicate with the base station network may be utilized by a wireless location system according to the novel method and/or system disclosed herein to more accurately locate the target MS. Such mobile location units may provide greater target MS location accuracy by, for example, homing in on the target MS and by transmitting additional MS location information to the location center 142. There are a number of embodiments for such a mobile location unit that are within the scope of a wireless location system according to the novel method and/or system. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the wireless location system disclosed herein contemplates their use. However, in cases where direct communication with the target MS is desired without constant contact with the base station infrastructure, the wireless location system may include a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, air planes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of LBSs 152) and therefore although these BS's may be more reliable in their in their ability to communicate information related to the location of a target MS with the location center, accuracy can be problematic in poor reception areas. Thus, MBS's may be used in areas (such as wilderness areas) where there may be no other means for reliably and cost effectively locating a target MS 140 (i.e., there may be insufficient fixed location BS's coverage in an area).

Figure 11:
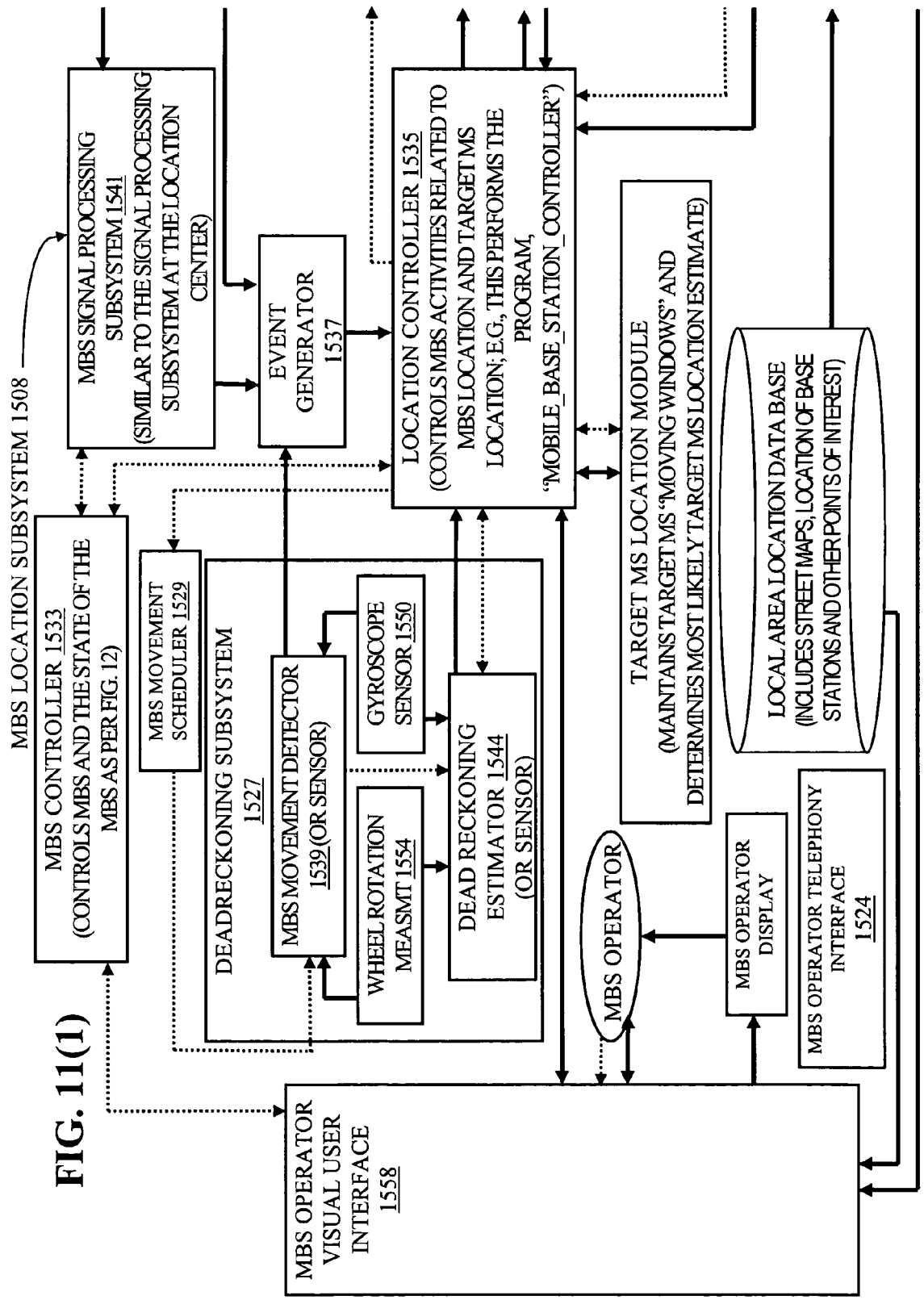
FIG. 11 is a high level block diagram of the mobile base station (MBS).
Figure 11:
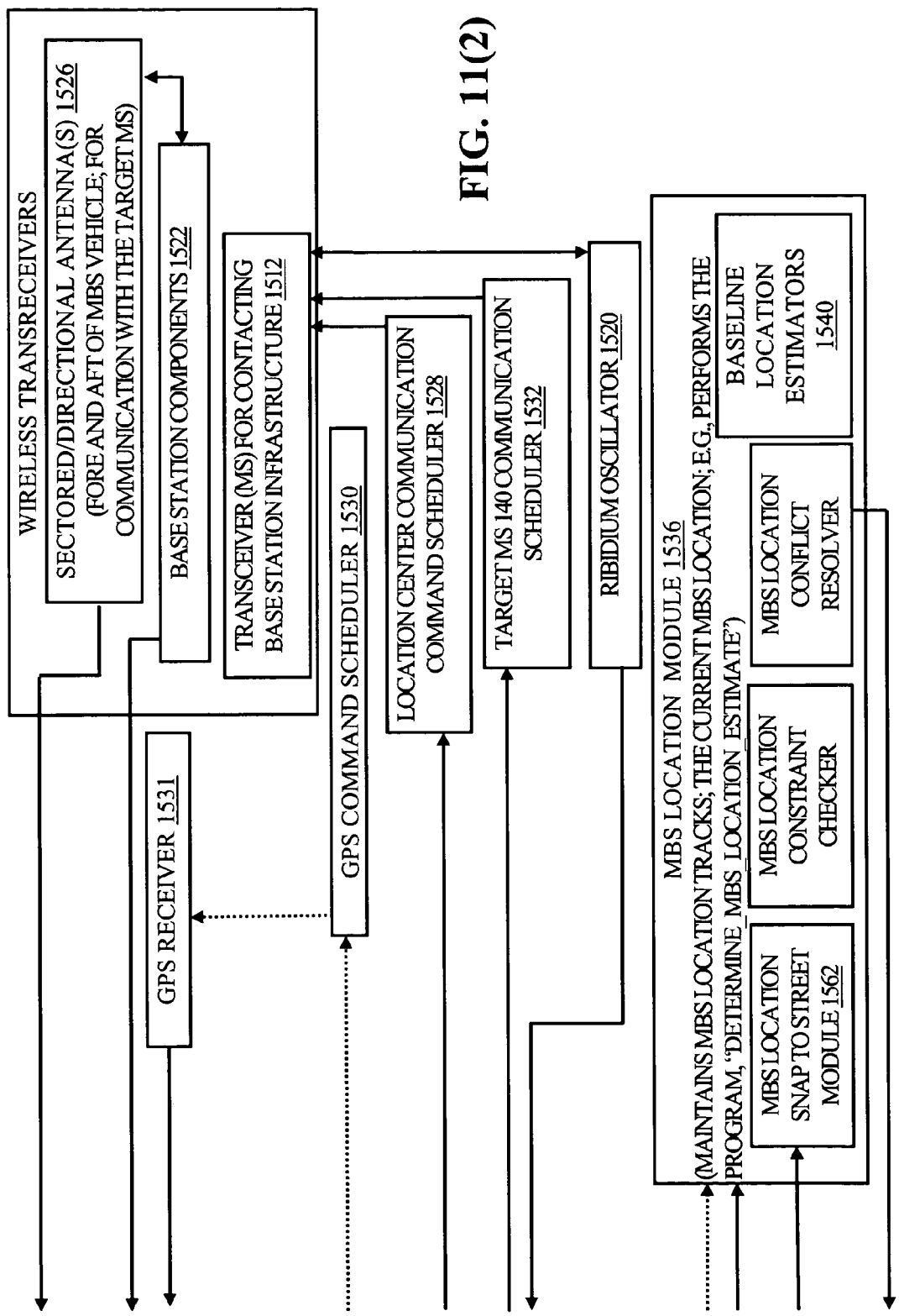

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:
- (a) raise/lower its pilot channel signal strength,
- (b) be in a state of soft hand-off with an MS 140, and/or
- (c) be the primary BS 122 for an MS 140, and consequently be in voice communication with the target MS (via the MBS operator telephony interface 1524) if the MS supports voice communication.

Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one or more directional antennas 1526 on-board the MBS 148.

Figure 12:
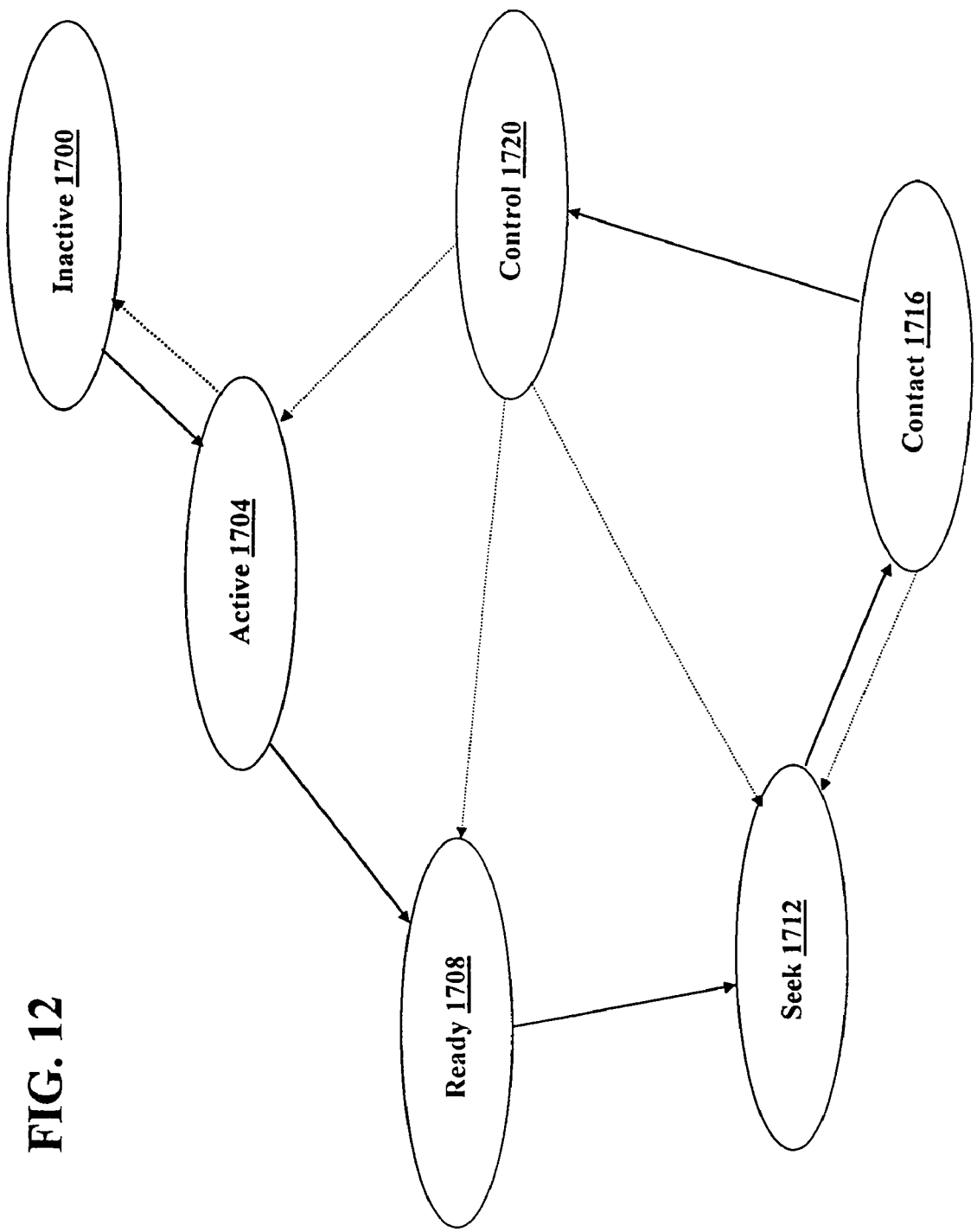
FIG. 12 is a high level state transition diagram describing computational states the Mobile Base station enters during operation.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:

- (1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.
- (1b) Establishing the location of the MBS 148. In one embodiment, this may be accomplished by, for example, an MBS operator identifying the predetermined or well known location at which the MBS 148 is located.
- (1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142 location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the MBS (via the base station infrastructure) from the 911 emergency center or the location center, then the MBS may transition to a seek state 1712 by performing the following steps:

- (2a) Communicating with, for example, the 911 emergency response center via the fixed location base station network to receive the PN code for the target MS to be located (wherein this communication is performed using the MS-like transceiver 1512 and/or the MBS operator telephony interface 1524).
- (2b) Obtaining a most recent target MS location estimate from either the 911 emergency center or the location center 142.
- (2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

- (3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base infrastructure network.

(4c) Since the MBS 148 is at least in soft hand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, APPENDIX A hereinbelow includes a description of this program "mobile_base_station_controller" referenced in FIG. 11(1). Note, that the description of this program describes sone of the functionality of the location controller 1535 for activating, e.g., the baseline location estimators 1540 (described hereinbelow). In particular, the MBS controller 1533 initiates and controls the MBS state changes as described in FIG. 12. Additionally, the MBS controller 1533 also communicates with the location controller 1535, wherein this latter controller controls MBS activities related to MBS location and target MS location. The location controller 1535 receives data input from an event generator 1537 that generates event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. Moreover, also note that there may be multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS deadreckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS. Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540*a* (not individually shown) for computing an MBS location estimate using GPS signals, (b) a location center location estimator 1540b (not individually shown) for buffering and/or translating an MBS estimate received from the location center 142, (c) an MBS operator location estimator 1540c (not individually shown) for buffering and/or translating manual MBS location entries received from an MBS location operator, and (d) in some MBS embodiments, an LBS location estimator 1540d (not individually shown) for the activating and deactivating of LBS's 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of a wireless location system according to the novel method and/or system disclosed herein that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the distance FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center;

(b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of a wireless location system according to the novel method and/or system disclosed herein, it is an aspect that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of a location system according to the novel method and/or system disclosed herein, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estimates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with dead reckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level, the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of a wireless location system according to the novel method and/or system disclosed herein that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks.

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location. Particularly, if an MBS 148 is moving at typical rates of speed and acceleration, and without abrupt changes direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

MBS Data Structure Remarks

Figure 13:
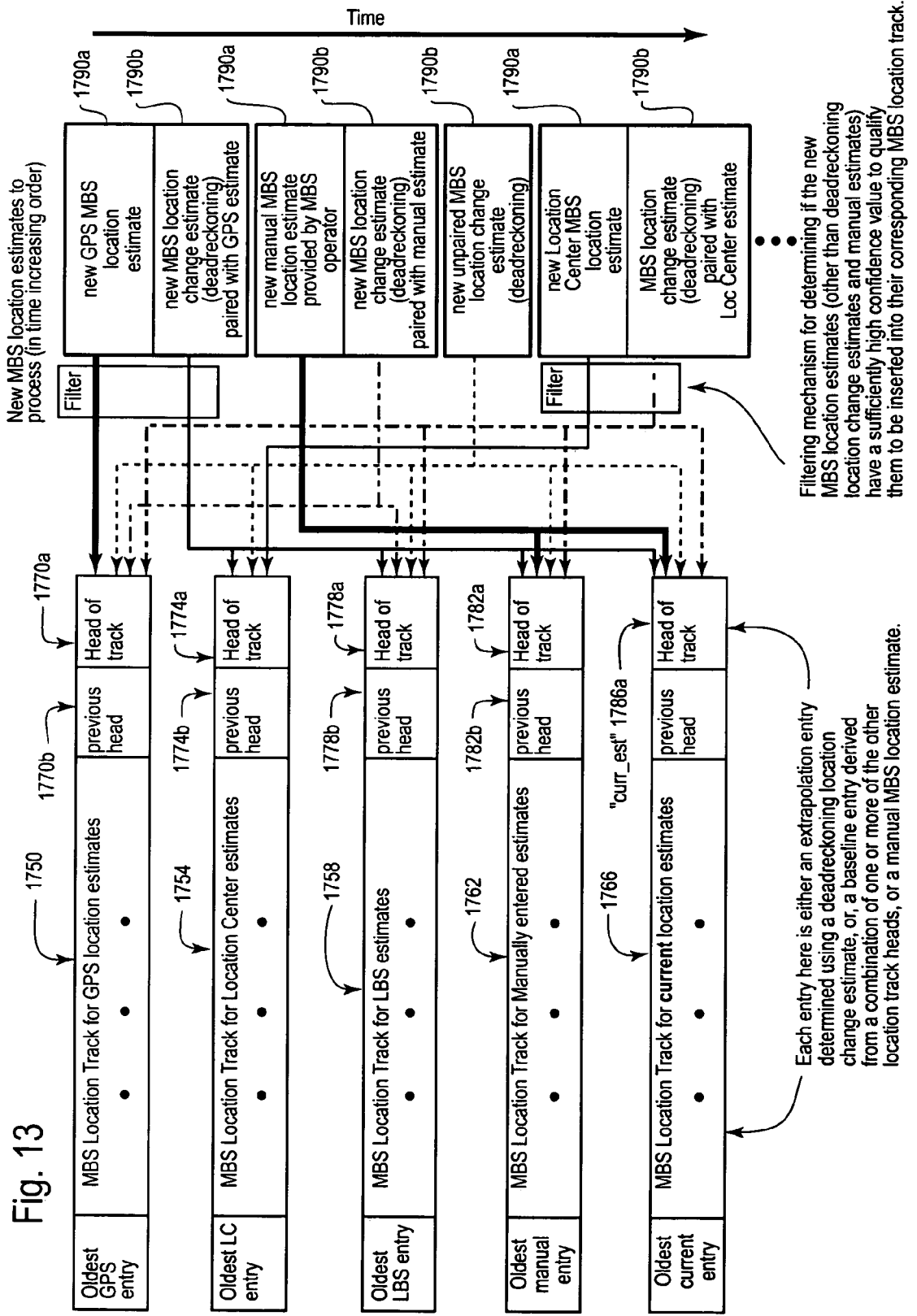
FIG. 13 is a high level diagram illustrating the data structural organization of the Mobile Base station capability for autonomously determining a most likely MBS location from a plurality of potentially conflicting MBS location estimating sources.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein. Additionally, it is assumed that such "most likely areas" are not grossly oblong; i.e., area cross sectioning lines through the centroid of the area do not have large differences in their lengths. For example, for any such "most likely area", A, no two such cross sectioning lines of A may have lengths that vary by more than a factor of two.

Each MBS location estimate also has a confidence associated therewith providing a measurement of the perceived accuracy of the MBS being in the "most likely area" of the location estimate.

A (MBS) "location track" is an data structure (or object) having a queue of a predetermined length for maintaining a temporal (timestamp) ordering of "location track entries" such as the location track entries 1770a, 1770b, 1774a, 1774b, 1778a, 1778b, 1782a, 1782b, and 1786a (FIG. 13), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track. The location track head is the most recent (and presumably the most accurate) MBS location estimate residing in the location track. Thus, for the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:

(i) In certain circumstances (described hereinbelow), the location track entries are removed from the head of the location track queues so that location adjustments may be made. In such a case, it may be advantageous for the length of such queues to be greater than the number of entries that are expected to be removed;

(ii) In determining an MBS location estimate, it may be desirable in some embodiments to provide new location estimates based on paths associated with previous MBS location estimates provided in the corresponding location track queue.

Also note that it is within the scope of a wireless location system according to the novel method and/or system disclosed herein that the location track queue lengths may be a length of one.

Regarding location track entries, each location track entry includes:

(a) a "derived location estimate" for the MBS that is derived using at least one of:

(i) at least a most recent previous output from an MBS baseline location estimator 1540 (i.e., the output being an MBS location estimate);

(ii) deadreckoning output information from the deadreckoning subsystem 1527.

Further note that each output from an MBS location estimator has a "type" field that is used for identifying the MBS location estimator of the output.

(b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.

(c) a "latest timestamp" providing the time/date when the latest MBS location information upon which the derived location estimate for the MBS depends. Note that earliest timestamp=latest timestamp only for so called "baseline entries" as defined hereinbelow. Further note that this attribute is the one used for maintaining the "temporal (timestamp) ordering" of location track entries.

(d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:

(a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);

(b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.

(c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself, then T=B. Accordingly, note that for each extrapolation entry that is the head of a location track, there is a most recent baseline entry associated with the extrapolation entry.

Further, there are two categories of location tracks:

(a) "baseline location tracks," each having baseline entries exclusively from a single predetermined MBS baseline location estimator; and (b) a "current" MBS location track having entries that are computed or determined as "most likely" MBS location estimates from entries in the other MBS location tracks.

MBS Location Estimating Strategy

In order to be able to properly compare the track heads to determine the most likely MBS location estimate it is an aspect of a wireless location system according to the novel method and/or system disclosed herein that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790*b* portion, and in some cases also having a 1790*a* portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, the MBS also substantially simultaneously queries the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same "latest timestamp", E and C will be hereinafter referred as "paired."

The foregoing description of preferred embodiments of the present invention has been provided for the purposes of illustration and description. It is not intended to be exhaustive or to limit the invention to the precise forms disclosed herein. Modifications and variations commensurate with the description herein will be apparent those skilled in the art and are intended to be within the scope of the present invention to the extent permitted by the relevant art. The embodiments provided are for enabling others skilled in the art to understand the invention, its various embodiments and modifications as are suited for uses contemplated. It is intended that the scope of the invention be defined by the following claims and their equivalents.

APPENDIX A: MBS Function Embodiments

*Mobile Base Station Controller Program* mobile_base_station_controller()

{

*wait_for_input_of_first_MBS_location*(event); /* "event" is a record (object) with MBS location data */

WHILE (no MBS operator input to exit) DO

CASE OF (event): /* determine the type of "event" and process it. */

MBS LOCATION DATA RECEIVED FROM GPS:

MBS LOCATION DATA RECEIVED FROM LBS:

MBS LOCATION DATA RECEIVED FROM ANY OTHER HIGHLY RELIABLE MBS LOCATION SOURCES (EXCEPT LOCATION CENTER):

{

MBS_new_est <--- *get_new_MBS_location_using_estimate*(event);

/* Note, whenever a new MBS location estimate is entered as a baseline estimate into one of the location tracks, the other location tracks must be immediately updated with any deadreckoning location change estimates so that all location tracks are substantially updated at the same time. */ deadreck_est <--- *get_deadreckoning_location_change_estimate*(event);

MBS_curr_est <--- DETERMINE_MBS_LOCATION_ESTIMATE(MBS_new_est, deadreck_est);

if (MBS_curr_est.confidence > a predetermined high confidence threshold) then

*reset_deadreckoning_MBS_location_estimator*(event);

/* deadreckoning starts over from here. */

**/* Send MBS location information to the Location Center. */** if ( MBS has not moved since the last MBS location estimate of this type and is not now moving) then

{ configure the MBS on-board transceiver (e.g., MBS-MS) to immediately transmit location signals to the fixed location BS network as if the MBS were an ordinary location device (MS);

communicate with the Location Center via the fixed location BS infrastructure the following:

(a) a "locate me" signal, (b) MBS_curr_est, (c) MBS_new_est and (d) the timestamp for the present event.

Additionally, any location signal information between the MBS and the present target MS may be transmitted to the Location Center so that this information may also be used by the Location Center to provide better estimates of where the MBS is. Further, if the MBS determines that it is immediately adjacent to the target MS and also that its own location estimate is highly reliable (e.g., a GPS estimate), then the MBS may also communicate this information to the Location Center so that the Location Center can: (a) associate any target MS location signature cluster data with the fixed base station infrastructure with the location provided by the MBS, and (b) insert this associated data into the location signature data base of the Location Center as a verified cluster of "random loc sigs";

/* note, this transmission preferably continues (i.e., repeats) for at least a predetermined length of time of sufficient length for the Signal Processing Subsystem to collect a sufficient signal characteristic sample size. */

} else SCHEDULE an event (if none scheduled) to transmit to the Location Center the following: (a) MBS_curr_est, and (b) the GPS location of the MBS and the time of the GPS location estimate;

/* Now update MBS display with new MBS location; note, MBS operator must request MBS locations on the MBS display; if not requested, then the following call does not do an update. */ update_MBS_operator_display_with_MBS_est(MBS_curr_est);

}

SINCE LAST MBS LOCATION UPDATE

MBS HAS MOVED A THRESHOLD DISTANCE: { deadreck_est <--- get_deadreckoning_location_change_estimate(event);

/* Obtain from MBS Dead Reckoning Location Estimator a new dead reckoning MBS location estimate having an estimate as to the MBS location change from the location of the last MBS location provided to the MBS. */

MBS_curr_est <---- DETERMINE_MBS_LOCATION_ESTIMATE(NULL, deadreck_est);

/* this new MBS estimate will be used in new target MS estimates*/ update_MBS_display_with_updated_MBS_location(MBS_curr_est);

SCHEDULE an event (if none scheduled) to request new GPS location data for MBS;

SCHEDULE an event (if none scheduled) to request communication with Location Center
 (LC) related to new MBS location data;

SCHEDULE an event (if none scheduled) to request new LBS location communication
 between the MBS and any LBS's that can detect the MBS;
   /* Note, in some embodiments the processing of MBS location data from LBS's may
      be performed automatically by the Location Center, wherein the Location Center
      uses signal characteristic data from the LBS's in determining an estimated
      location of the MBS. */

SCHEDULE an event (if none scheduled) to obtain new target MS signal characteristics
 from MS;    /* i.e., may get a better target MS location estimate now. */
}

TIMER HAS EXPIRED SINCE LAST RELIABLE TARGET MS LOCATION INFORMATION OBTAINED: {

SCHEDULE an event (if none scheduled) to request location communication with the target MS,
 the event is at a very high priority;

RESET timer for target MS location communication; /* Try to get target MS location
 communication again within a predetermined time. Note, timer may dynamically
 determined according to the perceived velocity of the target MS. */
}

LOCATION COMMUNICATION FROM TARGET MS RECEIVED: {

MS_raw_signal_data <--- *get_MS_signal_characteristic_raw_data*(event);
   /* Note, "MS_raw_signal_data" is an object having substantially the unfiltered
      signal characteristic values for communications between the MBS and the
      target MS as well as timestamp information. */

Construct a message for sending to the Location Center, wherein the message includes at
 least "MS_raw_signal_data" and "MBS_curr_est" so that the Location Center can also
 compute an estimated location for the target MS;

SCHEDULE an event (if none scheduled) to request communication with Location Center
 (LC) for sending the constructed message;
   /* Note, this data does not overwrite any previous data waiting to be sent to the LC.
      */

MS_signal_data <--- *get_MS_signal_characteristic_data*(event);
   /* Note, the MS signal data obtained above is, in one embodiment, "raw" signal
      data. However, in a second embodiment, this data is filtered substantially as in the Location Center by the Signal Processing Subsystem. For simplicity of discussion here, it is assumed that each MBS includes at least a scaled down version of the Signal Processing Subsystem (see FIG. 11). */

MS_new_est <---- *DETERMINE_MS_MOST_RECENT_ESTIMATE*(MBS_curr_est,
    MS_curr_est, MS_signal_data);

/* May use forward and reverse TOA, TDOA, signal power, signal strength, and signal quality indicators. Note, "MS_curr_est" includes a timestamp of when the target MS signals were received. */ if (MS_new_est.confidence > min_MS_confidence ) then
{
    *mark_MS_est_as_temporary*(MS_new_est);

/* Note, it is assumed that this MS location estimate is "temporary" in the sense that it will be replaced by a corresponding MS location estimate received from the Location Center that is based on the same target MS raw signal data. That is, if the Location Center responds with a corresponding target MS location estimate, E, while "MS_new_est" is a value in a "moving window" of target MS location estimates (as described hereinbelow), then E will replace the value of "MS_new_est". Note, the moving window may dynamically vary in size according to, for example, a perceived velocity of the target MS and/or the MBS. */

MS_moving_window <--- *get_MS_moving_window*(event);

/* get moving window of location estimates for this target MS. */

*add_MS_estimate_to_MS_location_window*(MS_new_est, MS_moving_window);

/* Since any given single collection of measurements related to locating the target MS may be potentially misleading, a "moving window" of location estimates are used to form a "composite location estimate" of the target MS. This composite location estimate is based on some number of the most recent location estimates determined. Such a composite location estimate may be, for example, analogous to a moving average or some other weighting of target MS location estimates. Thus, for example, for each location estimate (i.e., at least one MS location area, a most likely single location, and, a confidence estimate) a centroid type calculation may be performed to provide the composite location estimate.*/

MS_curr_est <---- *DETERMINE_MS_LOCATION_ESTIMATE*(MS_moving_window);

/* DETERMINE new target MS location estimate. Note this may an average
location or a weighted average location. */
*remove_scheduled_events*("TARGET_MS_SCHEDULE", event.MS_ID);
/* REMOVE ANY OTHER EVENTS SCHEDULED FOR REQUESTING
LOCATION COMMUNICATION FROM TARGET MS */

} else /* target MS location data received but it is not deemed to be reliable (e.g., too much
multipath and/or inconsistent measurements, so SCHEDULE an event (if none
scheduled) to request new location communication with the target MS, the event is
at a high priority*/

*add_to_scheduled_events*("TARGET_MS_SCHEDULE", event.MS_ID);
*update_MBS_operator_display_with_MS_est*(MS_curr_est);

/* The MBS display may use various colors to represent nested location areas
overlayed on an area map wherein, for example, 3 nested areas may be displayed
on the map overlay: (a) a largest area having a relatively high probability that the
target MS is in the area (e.g., >95%); (b) a smaller nested area having a lower
probability that the target MS is in this area (e.g., >80%); and (c) a smallest area
having the lowest probability that the target MS is in this area (e.g., >70%). Further,
a relatively precise specific location is provided in the smallest area as the most
likely single location of the target MS. Note that in one embodiment, the colors for
each region may dynamically change to provide an indication as to how high their
reliability is; e.g., no colored areas shown for reliabilities below, say, 40%; 40-50% is
purple; 50-60% is blue; 60-70% is green; 70-80% is amber; 80-90% is white; and red
denotes the most likely single location of the target MS. Further note the three
nested areas may collapse into one or two as the MBS gets closer to the target MS.
Moreover, note that the collapsing of these different areas may provide operators in
the MBS with additional visual reassurance that the location of the target MS is
being determined with better accuracy.*/

/* Now RESET timer for target MS location communication to try to get target MS
location communication again within a predetermined time. */
*reset_timer*("TARGET_MS_SCHEDULE", event.MS_ID);

}

COMMUNICATION OF LOCATION DATA TO MBS FROM LOCATION CENTER: {

/* Note, target MS location data may be received from the Location Center in the seek state,
contact state and the control state. Such data may be received in response to the MBS sending target MS location signal data to the Location Center (as may be the case in the contact and control states), or such data may be received from the Location Center regardless of any previously received target MS location sent by the MBS (as may be the case in the seek, contact and control states). */ if ( (the timestamp of the latest MBS location data sent to the Location Center)  <=
    (the timestamp returned by this Location Center communication identifying the MBS
    location data used by the Location Center for generating the MBS location data of the
    present event) )
  then /* use the LC location data since it is more recent than what is currently being used.
  */
{
    MBS_new_est <--- *get_Location_Center_MBS_est*(event);
    deadreck_est <--- *get_deadreckoning_location_change_estimate*(event);
    MBS_curr_est <---DETERMINE_MBS_LOCATION_ESTIMATE(MBS_new_est,
        deadreck_est);
    if (MBS_curr_est.confidence > a predetermined high confidence threshold) then
        *reset_deadreckoning_MBS_location_estimator*(event);
    *update_MBS_operator_display_with_MBS_est*(MBS_curr_est);
} if ( (the timestamp of the latest target MS location data sent to the Location Center)  <=
    (the timestamp returned by this Location Center communication identifying the MS
    location data used by the Location Center for generating the target MS location
    estimate of the present event))
  then /* use the MS location estimate from the LC since it is more recent than what is
  currently being used. */
{
    MS_new_est <--- *get_Location_Center_MS_est*(event);
        /* This information includes error or reliability estimates that may be used in
        subsequent attempts to determine an MS location estimate when there is no
        communication with the LC and no exact (GPS) location can be obtained. That
        is, if the reliability of the target MS's location is deemed highly reliable, then
        subsequent less reliable location estimates should be used only to the degree
        that more highly reliable estimates become less relevant due to the MS moving
        to other locations. */
    MS_moving_window <--- *get_MS_moving_window*(event);
        /* get moving window of location estimates for this target MS. */

```
        if ( ((the Location Center target MS estimate utilized the MS location signature data
            supplied by the MBS) then
                if (a corresponding target MS location estimate marked as "temporary" is still
                    in the moving window)
                    then /* It is assumed that this new target MS location data is still timely
                            (note the target MS may be moving); so replace the temporary
                            estimate with the Location Center estimate. */
                        replace the temporary target MS location estimate in the moving
                            window with "MS_new_est";
                else        /* there is no corresponding "temporary" target MS location in the
                            moving window; so this MS estimate must be too old; so don't
                            use it. */
            else    /* the Location Center did not use the MS location data from the MBS even
                    though the timestamp of the latest MS location data sent to the Location
                    Center is older that the MS location data used by the Location Center to
                    generate the present target MS location estimate. Use the new MS
                    location data anyway. Note there isn't a corresponding "temporary" target
                    MS location in the moving window. */
                add_MS_estimate_to_MS_location_window(MS_new_est);
}
else /* the MS location estimate from the LC is not more recent than the latest MS location
        data sent to the LC from the MBS. */
        if (a corresponding target MS location estimate marked as "temporary" is still in the
            moving window)
            then /* It is assumed that this new target MS location data is still timely (note
                    the target MS may be moving); so replace the temporary estimate with
                    the Location Center estimate. */
                replace the temporary target MS location estimate in the moving window
                    with "MS_new_est";
            else        /* there is no corresponding "temporary" target MS location in the
                        moving window; so this MS estimate must be too old; so don't use it.
                        */
MS_curr_est <--- DETERMINE_MS_LOCATION_ESTIMATE(MS_moving_window);
update_MBS_operator_display_with_MS_est(MS_curr_est);
reset_timer("LC_COMMUNICATION", event.MS_ID);
```

}

NO COMMUNICATION FROM LC: {

/* i.e., too long a time has elapsed since last communication from LC. */

SCHEDULE an event (if none scheduled) to request location data (MBS and/or target MS) from the Location Center, the event is at a high priority;

reset_timer("LC_COMMUNICATION", event.MS_ID);

}

REQUEST TO NO LONGER CONTINUE LOCATING THE PRESENT TARGET MS: { if (event not from operator) then request MBS operator verification;

else {

REMOVE the current target MS from the list of MSs currently being located and/or tracked;

SCHEDULE an event (if none scheduled) to send communication to the Location Center that the current target MS is no longer being tracked;

PURGE MBS of all data related to current target MS except any exact location data for the target MS that has not been sent to the Location Center for archival purposes;

}

}

REQUEST FROM LOCATION CENTER TO ADD ANOTHER TARGET MS TO THE LIST OF MSs BEING TRACKED: {

/* assuming the Location Center sends MBS location data for a new target MS to locate and/or track (e.g., at least a new MS ID and an initial MS location estimate), add this new target MS to the list of MSs to track. Note the MBS will typically be or transitioning to in the seek state.*/ if (event not from operator) then request MBS operator verification;

else {

INITIALIZE MBS with data received from the Location Center related to the estimated location of the new target MS; /* e.g., initialize a new moving window for this new target MS; initialize MBS operator interface by graphically indicating where the new target MS is estimated to be. */

CONFIGURE MBS to respond to any signals received from the new target MS by requesting location data from the new target MS;

INITIALIZE timer for communication from LC; /* A timer may be set per target MS on list.
*/
   }
}

REQUEST TO MANUALLY ENTER A LOCATION ESTIMATE FOR MBS (FROM AN MBS OPERATOR): {

/* Note, MBS could be moving or stationary. If stationary, then the estimate for the location of the MBS is given high reliability and a small range (e.g., 20 feet). If the MBS is moving, then the estimate for the location of the MBS is given high reliability but a wider range that may be dependent on the speed of the MBS. In both cases, if the MBS operator indicates a low confidence in the estimate, then the range is widened, or the operator can manually enter a range.*/

MBS_new_est <— *get_new_MBS_location_est_from_operator*(event); /* The estimate may be obtained, for example, using a light pen on a displayed map */ if (operator supplies a confidence indication for the input MBS location estimate) then
    MBS_new_est.confidence <— *get_MBS_operator_confidence_of_estimate*(event);
else MBS_new_est.confidence <— 1; /* This is the highest value for a confidence. */
deadreck_est <— *get_deadreckoning_location_change_estimate*(event);
MBS_curr_est <— DETERMINE_MBS_LOCATION_ESTIMATE(MBS_new_est, deadreck_est );
if (MBS_curr_est.confidence > a predetermined high confidence threshold) then
   *reset_deadreckoning_MBS_location_estimator*(event);
*update_MBS_operator_display_with_MBS_est*(MBS_curr_est);

/* Note, one reason an MBS operator might provide a manual MBS input is that the MBS might be too inaccurate in its location. Moreover, such inaccuracies in the MBS location estimates can cause the target MS to be estimated inaccurately, since target MS signal characteristic values may be utilized by the MBS to estimate the location of the target MS as an offset from where the MBS is. Thus, if there are target MS estimates in the moving window of target MS location estimates that are relatively close to the location represented by "MBS_curr_est", then these select few MS location estimates may be updated to reflect a more accurate MBS location estimate. */

MS_moving_window <— *get_MS_moving_window*(event);
if (MBS has not moved much since the receipt of some previous target MS location that is still being used to location the target MS)

then
{
UPDATE those target MS location estimates in the moving window according to the new MBS location estimate here;

MS_curr_est <---- DETERMINE_MS_LOCATION_ESTIMATE(MS_moving_window);
update_MBS_operator_display_with_MS_est(MS_curr_est);
}
}
} /* end case statement */

Lower Level MBS Function Descriptions

/* PROCEDURE:

*DETERMINE_MBS_LOCATION_ESTIMATE REMARKS:*

It is assumed that with increasing continuous dead reckoning without additional MBS location verification, the potential error in the MBS location increases.

It is assumed that each MBS location estimate includes: (a) a most likely area estimate surrounding a central location and (b) a confidence value of the MBS being in the location estimate.

The confidence value for each MBS location estimate is a measurement of the likelihood of the MBS location estimate being correct. More precisely, a confidence value for a new MBS location estimate is a measurement that is adjusted according to the following criteria:

(a) the confidence value increases with the perceived accuracy of the new MBS location estimate (independent of any current MBS location estimate used by the MBS), (b) the confidence value decreases as the location discrepancy with the current MBS location increases, (c) the confidence value for the current MBS location increases when the new location estimate is contained in the current location estimate, (d) the confidence value for the current MBS location decreases when the new location estimate is not contained in the current location estimate, and Therefore, the confidence value is an MBS location likelihood measurement which takes into account the history of previous MBS location estimates.

It is assumed that with each MBS location estimate supplied by the Location Center there is a default confidence value supplied which the MBS may change.

*/
DETERMINE_MBS_LOCATION_ESTIMATE(MBS_new_est, deadreck_est)

```
/* Add the pair, "MBS_new_est" and "deadreck_est" to the location tracks and determine a new current
    MBS location estimate.
    Input:  MBS_new_est     A new MBS baseline location estimate to use in determining the location
                            of the MBS, but not a (deadreckoning) location change estimate
            deadreck_est    The deadreckoning location change estimate paired with
                            "MBS_new_est". */
{
    if (MBS_new_est is not NULL) then /* the "deadreck_est" is paired with "MBS_new_est" */
    {
        if (all MBS location tracks are empty) then
        {
            insert "MBS_new_est" as the head of the location track of type, "MBS_new_est.type";
            insert "MBS_new_est" as the head of the current track; /* so now there is a
                "MBS_curr_est" MBS location estimate to use */
            MBS_curr_est <-- get_curr_est(MBS_new_est.MS_ID); /* from current location track */
        }
        else /* there is at least one non-empty location track in addition to the current location track
            being non-empty*/
        {
            if (MBS_new_est is of type MANUAL_ENTRY) then
            {   /* MBS operator entered an MBS location estimate for the MBS; so must use
                    it */
                MBS_curr_est <-- add_location_entry(MBS_new_est, deadreck_est);
            }
            else /* "MBS_new_est" is not of type MANUAL_ENTRY */
                if (the MBS location track of type, "MBS_new_est.type", is empty) then
                {   /* some other location track is non-empty */
                    MBS_curr_est <-- add_location_entry(MBS_new_est, deadreck_est);
                }
                else /* "MBS_new_est.type" location track is non-empty and "MBS_new_est"
                    is not of type MANUAL_ENTRY */
                {   /* In the next statement determine if "MBS_new_est" is of at least
                        minimal useful quality in comparison to any previous estimates of the
                        same type; see program def'n below */
                    continue_to_process_new_est <-- FILTER(MBS_new_est);
```

```
                    if (continue_to_process_new_est) then /* "MBS_new_est" is of sufficient
                                                    quality to continue processing. */
                    {
                            MBS_curr_est <--- add_location_entry(MBS_new_est, deadreck_est);
                    }/* end "MBS_new_est" not filtered out */
                    else /* "MBS_new_est" is filtered out; do nothing */;
                }/* end else */
            }/* end else at least one non-empty location track */
    }
    else /* MBS_new_est is NULL; thus only a deadreckoning output is to be added to location tracks */
    {
            extrapolation_entry <--- create_an_extrapolation_entry_from(deadreck_est);
            insert_into_every_location_track(extrapolation_entry); /* including the "current location track" */
            MBS_curr_est <--- get_curr_est(MBS_new_est.MS_ID); /* from current location track */
    }
    RETURN(MBS_curr_est);
} END /* DETERMINE_MBS_LOCATION_ESTIMATE */
``` add_location_entry(MBS_new_est, deadreck_est);

/* This function adds the baseline entry, "MBS_new_est" and its paired deadreckoning location change estimate, "deadreck_est" to the location tracks, including the "current location track". Note, however, that this function will roll back and rearrange location entries, if necessary, so that the entries are in latest timestamp order.

Returns:   MBS_curr_est */

{
    if (there is a time series of one or more dead reckoning extrapolation entries in the location track of
        type "MBS_new_est.type" wherein the extrapolation entries have a "latest timestamp" more recent
        than the timestamp of "MBS_new_est") then
    {    /* Note, this condition may occur in a number of ways; e.g., (a) an MBS location estimate
        received from the Location Center could be delayed long enough (e.g., 1-4 sec) because of
        transmission and processing time; (b) the estimation records output from the MBS baseline
        location estimators are not guaranteed to be always presented to the location tracks in the
        temporal order they are created. */
        roll back all (any) entries on all location tracks, including the "current" track, in "latest timestamp"
            descending order, until a baseline entry, B, is at the head of a location track wherein B is a
            most recent entry having a "latest timestamp" prior to "MBS_new_est"; let stack be the stack of a location track entries rolled off the location tracks, wherein an entry in the stack is either a baseline location entry and a paired deadreckoning location change estimate, or, an unpaired deadreckoning location change estimate associated with a NULL for the baseline location entry;

insert "MBS_new_est" at the head of the location track of type "MBS_new_est.type" as a new baseline entry;

insert the extrapolation entry derived from "deadreck_est" in each of the other baseline location tracks except the current track;

/* It is important to note that "deadreck_est" includes the values for the change in the MBS location substantially for the time period between the timestamp, T, of "MS_new_est" and the timestamp of the closest deadreckoning output just before T. Further note that if there are any extrapolation entries that were rolled back above, then *there is* an extrapolation entry, E, previously in the location tracks and wherein E has an earliest timestamp equal to the latest timestamp of B above. Thus, all the previous extrapolation entries removed can be put back if E is modified as follows: the MBS location change vector of E (denoted herein as E.delta) becomes E.delta - [location change vector of "deadreck_est"]. */

MBS_curr_est <— UPDATE_CURR_EST(MBS_new_est, deadreck_est);

if (the extrapolation entry E exists) then /* i.e., "stack" is not empty */
{
    modify the extrapolation entry E as per the comment above;

/* now fix things up by putting all the rolled off location entries back, including the "current location track" */ do until "stack" is empty
    {
        stack_top <— *pop_stack*(stack);
        /* "stack_top" is either a baseline location entry and a paired deadreckoning location change estimate, or, an unpaired deadreckoning location change estimate associated with a NULL for the baseline location entry */

MBS_nxt_est <— *get_baseline_entry*(stack_top);

deadreck_est <— *get_deadreckoning_entry*(stack_top);

MBS_curr_est <— DETERMINE_MBS_LOCATION_ESTIMATE(MBS_nxt_est, deadreck_est);
    }
}
} else /* there is no deadreckoning extrapolation entries in the location track of type
    "MBS_new_est.type" wherein the extrapolation entries have a "latest timestamp" more recent
    than the timestamp of "MBS_new_est". So just insert "MBS_new_est" and "deadreck_est".*/
{
    insert "MBS_new_est" at the head of the location track of type "MBS_new_est.type" as a new
        baseline entry;
    insert the extrapolation entry derived from "deadreck_est" in each of the other location tracks
        except the current track;
    MBS_curr_est <--- UPDATE_CURR_EST(MBS_new_est, deadreck_est); /* see prog def'n below
        */
}
RETURN(MBS_curr_est);
} /* end add_location_entry */

*FILTER(MBS_new_est)*

/* This function determines whether "MBS_new_est" is of sufficient quality to insert into it's corresponding
    MBS location track. It is assumed that the location track of "MBS_new_est.type" is non-empty.
    Input:     MBS_new_est     A new MBS location estimate to use in determining the location
                                of the MBS.
    Returns:   FALSE if "MBS_new_est" was processed here (i.e., filtered out),
               TRUE if processing with "MBS_new_est" may be continued . */
{
continue_to_process_new_est <--TRUE; /* assume "MBS_new_est" will be good enough to use as an
                                        MBS location estimate */
/* see if "MBS_new_est" can be filtered out. */
if (the confidence in MBS_new_est < a predetermined function of the confidence(s) of previous MBS
    location estimates of type "MBS_new_est.type")
            /* e.g., the predetermined function here could be any of a number of functions that provide a
                minimum threshold on what constitutes an acceptable confidence value for continued
                processing of "MBS_new_est". The following is an example of one such predetermined
                function: K*(confidence of "MBS_new_est.type" location track head) for some K,
                0<K<= 1.0, wherein K varies with a relative frequency of estimates of type
                "MBS_new_est.type" not filtered; e.g.., for a given window of previous MBS location
                estimates of this type, K= (number of MBS location estimates of "MBS_new_est.type"
                not filtered)/(the total number of estimates of this type in the window). Note, such filtering
                here may be important for known areas where, for example, GPS signals may be potentially reflected from an object (i.e., multipath), or, the Location Center provides an MBS location estimate of very low confidence. For simplicity, the embodiment here discards any filtered location estimates. However, in an alternative embodiment, any such discarded location estimates may be stored separately so that, for example, if no additional better MBS location estimates are received, then the filtered or discarded location estimates may be reexamined for possible use in providing a better subsequent MBS location estimate.*/ then continue_to_process_new_est <-- FALSE;
else if (an area for "MBS_new_est" > a predetermined function of the corresponding area(s) of entries in
the location track of type "MBS_new_est.type")

/* e.g., the predetermined function here could be any of a number of functions that provide a maximum threshold on what constitutes an acceptable area size for continued processing of "MBS_new_est". The following are examples of such predetermined functions: (a) the identity function on the area of the head of the location track of type "MBS_new_est.type"; or, (b) K*(the area of the head of the location track of type "MBS_new_est.type"), for some K, K>=1.0, wherein for a given window of previous MBS location estimates of this type, K= (the total number of estimates in the window)/ (number of these location estimates not filtered); note, each extrapolation entry increases the area of the head; so areas of entries at the head of each location track type grow in area as extrapolation entries are applied. */ then continue_to_process_new_est <-- FALSE;
RETURN(continue_to_process_new_est)
}

*UPDATE_CURR_EST(MBS_new_est, deadreck_est)*

/* This function updates the head of the "current" MBS location track whenever "MBS_new_est" is
perceived as being a more accurate estimate of the location of the MBS.
Input:    MBS_new_est    A new MBS location estimate to use in determining the location of the
MBS
deadreck_est    The deadreckoning MBS location change estimate paired with
"MBS_new_est".
Returns a potentially updated "MBS_curr_est" */
{
if (MBS_new_est is of type MANUAL_ENTRY) then
{    /* MBS operator entered an MBS location estimate for the MBS; so must use it */ insert "MBS_new_est" as the head of the "current MBS location track" which is the location track indicating the best current approximation of the location of the MBS;

} else /* "MBS_new_est" is not a manual entry */

{

MBS_curr_est <--- *get_curr_est*(MBS_new_est.MS_ID); /* get the head of the "current location track" */ adjusted_curr_est <--- *apply_deadreckoning_to*(MBS_curr_est, deadreck_est);

./* The above function returns an object of the same type as "MBS_curr_est", but with the most likely MBS point and area locations adjusted by "deadreck_est".

Accordingly, this function performs the following computations:

(a) selects, $A_{MBS}$, the MBS location area estimate of "MBS_curr_est" (e.g., one of the "most likely" nested area(s) provided by "MBS_curr_est" in one embodiment of the present invention);

(b) applies the deadreckoning translation corresponding to "deadreck_est" to $A_{MBS}$ to thereby translate it (and expand it to at least account for deadreckoning inaccuracies). */ if (*reasonably_close*(MBS_new_est, adjusted_curr_est, MBS_curr_est))

/* In one embodiment, the function "reasonably_close" here determines whether a most likely MBS point location (i.e., centroid) of "MBS_new_est" is contained in the MBS estimated area of "adjusted_curr_est"

Note that the reasoning for this constraint is that if "MBS_curr_est" *was* accurate, then any "most likely MBS point location" of a new MBS baseline estimate that is also accurate ought to be in the MBS estimated area of "adjusted_curr_est".

In a second embodiment, the function "reasonably_close" determines whether the centroid (or most likely MBS point location) of "MBS_new_est" is close enough to "MBS_curr_est" so that no MBS movement constraints are (grossly) violated between the most likely point locations of "MBS_new_est" and "MBS_curr_est"; i.e., constraints on (de)acceleration, abruptness of direction change, velocity change, max velocity for the terrain. Note, such constraints are discussed in more detail in the section herein describing the "Analytical Reasoner". Accordingly, it is an aspect of the present invention to provide similar capabilities to that of the Analytical Reasoner as part of the MBS, and in particular, as the functionality of the "MBS LOCATION CONSTRAINT CHECKER" illustrated in Fig. 11. It is assumed hereinafter that the embodiment of the function, "reasonably_close", performed here is a combination of both the first and second embodiments, wherein the constraints of both the first and
second embodiments must be satisfied for the function to return TRUE. */
then
    if (the confidence in MBS_new_est >= the confidence in MBS_curr_est) then
{
    if (the most likely MBS area of MBS_new_est contains the most likely MBS area of
        "adjusted_curr_est" as computed above) then
           shrink MBS_new_est uniformly about its centroid (i.e., "most likely MBS point
                location") until it is as small as possible and still contain the MBS
                estimated area of "adjusted_curr_est".
    *insert_into_location_track*("current", MBS_new_est);
    /* The program invoked here inserts a location track entry corresponding to the second
        parameter into the location track identified by the first parameter (e.g., "current"). It
        is important to note that the second parameter for this program may be *either* of the
        following data structures: a "location track entry", or an "MBS location estimate" and
        the appropriate location track entry or entries will be put on the location track
        corresponding to the first parameter. The insertion is performed so that a "latest
        timestamp" order is maintained; i.e.,
            (a) any extrapolation entries in the location track, wherein these entries
                have a more recent "latest timestamp" than the ("earliest" or only)
                timestamp (depending on the data structure) of the second parameter
                are removed, and
            (b) conceptually at least, the location change estimates output from the
                deadreckoning MBS location estimator that correspond with the
                removed extrapolation entries are then reapplied in timestamp order
                to the head of the target location track. */
}
else /* the centroid of "MBS_new_est", is contained in an area of "MBS_curr_est", but the
    confidence in "MBS_new_est" < confidence in "MBS_curr_est" */
{
    most_likely_est <-- determine a "most likely MBS location estimate" using the set S
            = {the MBS location estimate centroid(s) of any MBS location
            track heads contained in the MBS estimated area of
            "adjusted_curr_est", plus, the centroid of "MBS_new_est"};
    /* Note, in the above statement, the "most likely MBS location estimate"
        may be determined using a number of different techniques depending on what function(s) is used to embody the meaning of "most likely". In one embodiment, such a "most likely" function is a function of the confidence values of a predetermined population of measurements (e.g., the selected location track heads in this case) from which a "most likely" measurement is determined (e.g., computed or selected). For example, in one embodiment, a "most likely" function may include selecting a measurement having the maximum confidence value from among the population of measurements. In a second embodiment, a "most likely" function may include a weighting of measurements (e.g., location track heads) according to corresponding confidence values of the measurements. For example, in the present context (of MBS location track heads) the following steps provide an embodiment of a "most likely" function:

(a) determine a centroid of area for each of the selected track heads (i.e., the location track heads having a point location estimate contained in the MBS estimated area of "adjusted_curr_est");

(b) determine the "most likely location MBS *position*" P as a weighted centroid of the centroids from step (a), wherein the weighting of each of the centroids from (a) is provided by their corresponding confidence values;

(c) output an area, $A_1$, as the "most likely MBS location *area*", wherein the centroid of $A_1$ is P and $A_1$ is the largest area within the MBS estimated area of "adjusted_curr_est" satisfying this condition; and (d) set a confidence value for $A_1$ as the average confidence value of "MBS_new_est", "MBS_curr_est" and the selected location track head used. */ insert_into_location_track("current", most_likely_est);

}
else /* "MBS_new_est" is not reasonably close to "adjusted_curr_est" (i.e., "MBS_curr_est" with "deadreck_est" applied to it), so a conflict exists here; e.g., (i) "MBS_new_est" is not a manual entry, and (ii) "MBS_new_est" does not have its centroid contained in the MBS estimated area of "adjusted_curr_est", or, there has been a movement constraint violation. Note that it is not advisable to just replace "MBS_curr_est" with "new_est_head" because:

(a) "MBS_new_est" may be the MBS location estimate that is least accurate, while the previous entries of the current location track have been accurate;

(b) the "MBS_curr_est" may be based on a recent MBS operator manual entry which should not be overridden. */

```
    {
        MBS_curr_est <--- resolve_conflicts(MBS_new_est, adjusted_curr_est, MBS_curr_est);
    }
} /* end else "MBS_new_est" not a manual entry */
if (MBS is a vehicle) and (not off road) then
        /* it is assumed that a vehicular MBS is on-road unless explicitly indicated otherwise by
            MBS operator. */
        MBS_curr_est <--- snap_to_best_fit_street(MBS_curr_est); /* snap to best street location
            according to location estimate, velocity, and/or direction of travel. Note, this is a translation
            of "MBS_curr_est". */
    RETURN(MBS_curr_est)
} /* END UPDATE(MBS_CURR_EST) */
``` resolve_conflicts(MBS_new_est, adjusted_curr_est, MBS_curr_est)

/* There is a basic conflict here,
  (i) "MBS_new_est" is not a manual entry, and
  (ii) one of the following is true: "MBS_new_est" does not have its centroid contained in the area "adjusted_curr_est", or, using "MBS_new_est" implies an MBS movement constraint violation.

| | | |
|---|---|---|
| Input: | MBS_new_est | The newest MBS location estimate record. |
| | adjusted_curr_est | The version of "MBS_curr_est" adjusted by the deadreckoning location change estimate paired with "MBS_new_est". |
| | MBS_curr_est | The location track entry that is the head of the "current" location track. Note that "MBS_new_est.confidence" > "MBS_curr_est.confidence". |
| Output: | An updated "MBS_curr_est". */ | |

```
{
    mark that a conflict has arisen between "MBS_curr_est" and "MBS_new_est";
    if (the MBS operator desires notification of MBS location estimate conflicts) then
        notify the MBS operator of an MBS location estimate conflict;
    if (the MBS operator has configured the MBS location system to ignore new estimates that are not
        "reasonably close" to adjusted_curr_est) or
```

(MBS_curr_est is based on a manual MBS operator location estimate, and the MBS has moved
    less than a predetermined distance (wheel turns) from where the manual estimate was provided)
    then
    RETURN(adjusted_curr_est);
else /* not required to ignore "MBS_new_est", and there has been no recent manual estimate input*/
{ /* try to use "MBS_new_est" */
    if ((MBS_new_est.confidence - adjusted_curr_est.confidence) > a large predetermined threshold)
        then
            /* Note, the confidence discrepancy is great enough so that "MBS_new_est" should be
                the most recent baseline estimate on current MBS location track. Note that the
                threshold here may be approximately 0.3, wherein confidences are in the range [0,
                1].*/
            insert_into_location_track("current", MBS_new_est);
                /* insert "MBS_new_est" into "current" location track (as a baseline entry) in "latest
                    timestamp" order; i.e., remove any extrapolation entries with a more recent
                    "latest timestamp" in this track, and reapply, in timestamp order, the location
                    change estimates output from the deadreckoning MBS location estimator that
                    correspond with the removed extrapolation entries removed; */
    else /* "MBS_new_est.confidence" is not substantially bigger than
        "adjusted_curr_est.confidence"; so check to see if there are potentially MBS location
        system instabilities */
    { /* check for instabilities */
        if [ (there has been more than a determined fraction of conflicts between the "MBS_curr_est"
            and "MBS_new_est" within a predetermined number of most recent "MBS_new_est"
            instantiations) or
            (the path corresponding to the entries of the "current location track" of the MBS has
                recently violated MBS movement constraints more than a predetermined fraction of
                the number of times there has been new instantiation of "MBS_curr_est", wherein
                such movement constraints may be (de)acceleration constraints, abrupt change in
                direction constraints, constraints relating to too high a velocity for a terrain) or
            (there has been an MBS operator indication of lack of confidence in the recently
                displayed MBS location estimates)]
            then /* the MBS location system is likely unstable and/or inaccurate; check to see if this
                condition has been addressed in the recent past. */
            { /* fix instability */ if (fix_instability_counter equal to 0) then /* no instabilities have been addressed here
   within the recent past; i.e., "fix_instability_counter" has the following semantics:
   if it is 0, then no instabilities have been addressed here within the recent past;
   else if not 0, then a recent instability has been attempted to be fixed here.
   Note, "fix_instability_counter" is decremented, if not zero, each time a new
   baseline location entry is inserted into its corresponding baseline location
   track. Thus, this counter provides a "wait and see" strategy to determine if a
   previous performance of the statements below mitigated the (any) MBS
   location system instability. */
{
   most_likely_est <-- determine a new "most likely MBS location estimate"; [30.1]
      /* Note, a number of MBS location estimates may be generated and
         compared here for determining the "most_likely_est". For example,
         various weighted centroid MBS location estimates may be determined by
         a clustering of location track head entries in various ways.

In a first embodiment for determining a value (object) for
         "most_likely_est", a "most likely" function may be performed, wherein a
         weighting of location track heads according to their corresponding
         confidence values is performed. For example, the following steps provide
         an embodiment of a "most likely" function:
            (a) obtain a set S having: (i) a centroid of area for each of the
               track heads having a corresponding area contained in a
               determined area surrounding the point location of
               "adjusted_curr_est" (e.g., the MBS estimated area of
               "adjusted_curr_est"), plus (ii) the centroid of "MBS_new_est";
            (b) determine the "most likely location MBS *position*" P as a
               weighted centroid of the centroids of the set S from step (a),
               wherein the weighting of each of the centroids from (a) is
               provided by their corresponding confidence values;
            (c) output an area, A, as the "most likely MBS location *area*"
               wherein A has P as a centroid and A is a "small" area (e.g., a
               convex hull) containing the corresponding the centroids of the
               set S; and
            (d) set a confidence value for A as the average confidence value
               of the centroids of the set S.

In a second embodiment, "most_likely_est" may be determined by
expanding (e.g., substantially uniformly in all directions) the MBS location
estimate area of "MBS_new_est" until the resulting expanded area
contains at least the most likely point location of "adjusted_curr_est" as its
most likely MBS location area. */ insert_into_location_track("current", most_likely_est);

fix_instability_counter <-- a predetermined number, C, corresponding to a
number of baseline entries to be put on the baseline location tracks until
MBS location system instabilities are to be addressed again here; /* when
this counter goes to zero and the MBS location system is unstable, then the
above statements above will be performed again. Note, this counter must
be reset to C (or higher) if a manual MBS estimate is entered. */

}
} /* fix instability */
else /* The MBS location system has been reasonably stable, and
"MBS_curr_est.confidence" is not substantially bigger than
"adjusted_new_est.confidence" . */

{ most_likely_est <-- determine a most likely MBS location estimate;

/* The determination in the statement above may be similar or substantially the same as
the computation discussed in relation to statement [30.1] above. However, since
there is both more stability in this case than in [30.1] and less confidence in
"MBS_new_est", certain MBS movement constraints may be more applicable here
than in [30.1].

Accordingly, note that in any embodiment for determining "most_likely_est"
here, reasonable movement constraints may also be used such as: (a) unless
indicated otherwise, an MBS vehicle will be assumed to be on a road, (b) a new
MBS location estimate should not imply that the MBS had to travel faster than, for
example, 120 mph or change direction too abruptly or change velocity too abruptly
or traverse a roadless region (e.g., corn field or river) at an inappropriate rate of
speed.

Thus, once a tentative MBS location estimate (e.g., such as in the steps of the
first embodiment of [30.1]) for "most_likely_est" has been determined, such
constraints may be applied to the tentative estimate for determining whether it
should be pulled back toward the centroid of the "MBS_curr_est" in order to satisfy
the movement constraints*/

```
                insert_into_location_track("current", most_likely_est); /* note, the second parameter for
                    this function may be either of the following data structures: a "location track entry", or
                    a "MBS location estimate" and the appropriate location track entry or entries will be
                    put on the location track corresponding to the first parameter. */
            }
        } /* check for instabilities */
        MBS_curr_est <--- get_curr_est(MBS_new_est.MS_ID); /* from current location track */
    } /* try to use "MBS_new_est" */
    RETURN(MBS_curr_est)
} /* END resolve_conflicts */
```

What is claimed is:

1. A method for locating a particular mobile station, wherein said particular mobile station is one of a plurality of mobile stations, and wireless signal measurements are capable of being obtained using wireless transmissions between each of the plurality mobile stations and a network of communication stations, each said communication station being for at least one of transmitting and receiving the wireless transmissions, comprising:

first providing access to at least some of a plurality of estimators for estimating locations of said mobile stations, wherein each of said at least some estimators provide a corresponding location estimate when supplied with a corresponding portion of said wireless signal measurements obtained from wireless transmissions between said mobile stations and said network of communication stations;

second providing access to a plurality of data item collections, wherein for each of a plurality of geographical locations, there is a corresponding one of said data item collections having parts (a1) and (a2) following:
   (a1) a representation of the geographical location, and
   (a2) data indicative of said wireless signal measurements between one of the mobile stations and the communication stations when said one mobile station is approximately at the geographical location of (a1);

for each of said at least some estimators and said data item collections, perform (b1) and (b2) following:
   (b1) inputting to the estimator said corresponding portion of said wireless signal measurements obtained from each of said data of (a2) for some of said data item collections for generating corresponding location estimates;
   (b2) comparing, for each data item collection (D) of at least some of said data item collections providing input in (b1) above, (b2-1) and (b2-2) following:
      (b2-1) said representation (a1) of D, with
      (b2-2) said corresponding location estimate resulting from the inputting of D in (b1),
   for determining one or more corresponding performance measurements of the estimator;

activating one or more of said estimators with their said corresponding portions of wireless signal measurements obtained using wireless transmissions between the particular mobile station and said network of communication stations for providing an estimate of one or more locations of said particular mobile station;

obtaining a resulting location estimate for the particular mobile station using the estimates of said one or more locations;

wherein one of said steps of activating and obtaining is dependent upon one or more of said performance measurements.

2. The method as claimed in claim 1, wherein said plurality of estimators includes an estimator that outputs a location for at least one of the mobile stations that is dependent upon one of: (a) satellite signals received by said at least one mobile station, (b) a time of arrival measurement of a signal between said at least one mobile station and the network of communication stations, (c) a time difference of arrival measurement of a signal between said at least one mobile station and the network of communication stations, (d) a recognition of a pattern in signals communicated between said at least one mobile station and the network of communication stations, (e) a statistical prediction technique whose output location is dependent upon said plurality of data item collections, (f) an angle of arrival of signals communicated between said at least one mobile station and the network of communication stations.

3. The method as claimed in claim 1, wherein said step of activating includes determining said one or more of said estimators using at least one of said corresponding performance measurements for said one or more estimators.

4. The method as claimed in claim 1, wherein said step of obtaining includes deriving said resulting location estimate from a first location obtained from a first of said one or more estimators, and a second estimate obtained from a second of said one or more estimators.

5. The method as claimed in claim 4, wherein said step of deriving includes determining a most likely location for the particular mobile station using said first and second locations and at least one value obtained from said corresponding performance measurements of said first and second estimators.

6. The method as claimed in claim 1, further including a step of responding to Internet requests with at least said resulting location estimate.

7. The method as claimed in claim 6, wherein said resulting location estimate locates a vehicle.

8. The method as claimed in claim 1, wherein for one of said at least some estimators, there is a further step of deriving one of said corresponding performance measurements as a value indicative of a likelihood that a location estimate by said one estimator for said particular mobile station identifies one of the locations.

9. The method as claimed in claim 1, further including a step of partitioning said plurality of (a2) parts of said data item collections into a plurality of partition areas, wherein substantially every one of said (a2) parts of said data item collections in a first of said partition areas satisfy an associated constraint for said first partition area; and for a first of said at least some estimators, the steps (c1) and (c2) following are performed:
   (c1) determining a first of said one or more corresponding performance measurements for said first estimator by using said corresponding location estimates from (b1) wherein said some of said data item collections include those of said first partition area; and
   (c2) associating said first performance measurement with said associated constraint, so that if said wireless signal measurements between said particular mobile station and the communication stations satisfy said associated constraint, then said first performance measurement is indicative of a likelihood that a first location obtained from said first estimator in said step of activating identifies a location of the particular mobile station.

10. The method of claim 9, wherein said wireless signal measurements between the particular mobile station and the communication stations satisfy said associated constraint when one or more of (a) and (b) following occur:
   (a) said wireless signal measurements between the particular mobile station and the communication stations substantially identify a predetermined set of one or more communication stations that detect the particular mobile station, and
   (b) said wireless signal measurements between the particular mobile station and the communication stations substantially identify a predetermined set of one or more communication stations that are detected by the particular mobile station.

11. A method for evaluating a particular condition of a plurality of conditions, wherein for substantially every one of said conditions there is a corresponding set of data for evaluating the condition, comprising:

accessing a classifier for classifying the particular condition into one or more classes of a plurality of classes for said plurality of conditions, wherein said classifier uses said corresponding set of data for the conditions for classifying the conditions;

selecting between two or more evaluators for evaluating the particular condition, wherein communication with at least one of said two or more evaluators includes a transmission using the Internet;

wherein said step of selecting includes a substep of determining, for each of said evaluators, an indication as to whether information is available in said corresponding set of data for the particular condition for evaluating the particular condition by said evaluator;

activating one or more of said evaluators, selected in said selecting step, for obtaining one or more evaluations of the particular condition, wherein a first of said one or more evaluators receives a portion of said corresponding set of data for the particular condition via the Internet;

first obtaining one or more evaluator related preference data items for identifying a preference among said evaluations, wherein said preference data items are for said one or more classes in which the particular condition is classified;

second obtaining resulting evaluation information for the particular condition using at least one of said evaluations of the particular condition and at least one of said preference data items; and transmitting said resulting evaluation information on the Internet to a predetermined destination.

12. The method as claimed in claim 11, wherein said step of accessing includes:

transmitting, on the Internet, a request to said first evaluator for obtaining one of the evaluations of the particular condition;

transmitting, on the Internet, a request to a second of the evaluators for obtaining one of the evaluations of particular condition; and wherein the resulting evaluation information is obtained using the evaluations from each of the first and second evaluators.

13. A method for determining, from a plurality of conditions, first and second conditions, comprising:

providing access to a plurality of evaluators for identifying said conditions, wherein each of said evaluators determine condition identifications when supplied with an available corresponding set of data for one or more of said conditions to be identified, and wherein for at least a first of said evaluators access is provided via the Internet;

evaluating a performance of first and second of the evaluators so that a first indication of a likely effectiveness is associated with condition identifications from the first evaluator, and a second indication of a likely effectiveness is associated with condition identifications from the second evaluator;

first selecting between the first and second evaluators for identifying the first condition, and contacting the first evaluator, via the Internet, for identifying the first condition;

first obtaining from the first evaluator, a first condition identification via the Internet;

first determining, using the first condition identification, first resulting information for identifying the first condition;

wherein the step of first determining includes accessing the first indication of a likely effectiveness when generating the first resulting information;

second selecting between the first and second evaluators for identifying the second condition, and contacting the second evaluator for identifying the second condition, the second evaluator contacted at a site different from a site contacted in said step of contacting the first evaluator;

second obtaining, from the second evaluator, a second condition identification;

second determining, using the second condition identification, second resulting information for identifying the second condition;

wherein the step of second determining includes accessing the second indication of a likely effectiveness when generating the second resulting information.

14. A method as claimed in claim 13, wherein (a) each said first condition includes a geographical location of a mobile station; and (b) said corresponding set of data for identifying the first condition includes wireless signal measurements between the mobile station and a network of communication stations.

15. The method of claim 11, wherein for each of at least some of said classes, assignment of one or more said conditions to said class is dependent upon a predetermined method of determining a similarity in said corresponding set of data for said conditions assigned to the class; and wherein said step of second obtaining said resulting evaluation information includes determining a most likely evaluation using a plurality of said evaluations of the particular condition and a corresponding performance measurement for each of said plurality of evaluations.

16. The method of claim 11, wherein said step of first obtaining said one or more evaluator related preference data items includes:

obtaining, for at least one of said one or more evaluators, a corresponding one of said related preference data items by comparing: (1) evaluations obtained from said one evaluator for other of the conditions in at least one of the classes having the particular condition with (2) known correct identifications of the other conditions;

wherein said corresponding one related preference data item includes a value indicative of a likelihood that one of said evaluations, by the one evaluator, of the particular condition is a correct evaluation.

17. The method as claimed in claim 11, wherein said plurality of conditions is one of:

(a) economic market related conditions, wherein said evaluators provide forecasts of future economic conditions;

(b) malfunctions in electronic systems, wherein said evaluators provide diagnoses of the malfunctions;

(c) text in documents for scanning, wherein said evaluators provide evaluations for identifying the scanned text;

(d) vehicle malfunctions, wherein said evaluators provide diagnoses of the vehicle malfunctions;

(e) computer malfunctions, wherein said evaluators provide diagnoses of the computer malfunctions;

(f) communication network malfunctions, wherein said evaluators provide diagnosis of the network malfunctions;

(g) medical conditions, wherein said evaluators provide diagnoses of the medical conditions; and (h) weather data, wherein said evaluators provide predictions of future weather conditions.

18. The method as claimed in claim 11, wherein said classes are hierarchically ordered.

19. The method as claimed in claim 11, wherein said resulting evaluation information includes a diagnosis of said particular condition.

20. The method as claimed in claim 11, wherein said resulting evaluation information and at least one of said evaluations includes an estimate for said particular condition.

21. A method for determining, from a plurality of conditions, a condition (CNDN) desired to be identified, wherein for substantially every one of said conditions there is a corresponding set of data for each of one or more of a plurality of estimators for identifying the condition, comprising:

obtaining a plurality of classes for said plurality of conditions, wherein for each said class (C), at least most of said conditions therein are each identified by predetermined criteria, said predetermined criteria for identifying said corresponding set of data for the conditions in the class C;

providing access to the plurality of estimators for determining said conditions when said estimators are supplied with said corresponding sets of data for said conditions;

obtaining a plurality of data item collections, wherein for each of said estimators and each of more than one of said conditions, there is one of said data item collections having:

(a1) a representation of the condition, and (a2) a representation of a data set for identifying said condition of (a1);

(a3) an estimate of said condition generated by said estimator when said representation of (a2) is input to said estimator;

activating a first of said estimators with said corresponding set of data for said condition CNDN for determining a first estimate for identifying said condition CNDN;

selecting one or more of said data item collections, wherein for each of said selected data item collections, said estimate of (a3): (i) was generated by said first estimator, and (ii) has a determined relationship to said first estimate that is determined to be satisfied for selecting said one or more data item collections;

determining a second estimate of said condition CNDN using said representations of (a1) from said selected data item collections.

22. The method as claimed in claim 21, wherein (a) each said condition includes a geographical location of a wireless mobile station; and (b) each said data set includes wireless signal measurements between the mobile station and a network of communication stations.

23. An apparatus for locating mobile units, wherein wireless signal measurements are capable of being obtained using wireless transmissions between: (i) the mobile units and (ii) a plurality of terrestrial communication stations, each said communication station being for at least one of transmitting and receiving the wireless transmissions with the mobile units, comprising:

a predetermined interface for accessing a plurality of estimators, each of the estimators for estimating locations of a plurality of said mobile units, wherein for at least a first and a second of said estimators, (a) the first estimator uses a corresponding input that includes data obtained from signals S received by one of the mobile units being located by the first estimator, wherein the signals S are received from a transmitting station that is not supported on the earth's surface and (b) the second estimator uses a second corresponding input for one of the mobile units being located by the second estimator, the second corresponding input includes data obtained from one of (b-1) and (b-2) following for determining a location estimate: (b-1) a time difference of arrival measurement of a signal between one of the mobile units and the communication stations, and (b-2) a recognition of a pattern in signals communicated between one of the mobile units and the communication stations;

wherein a controller the predetermined interface outputs to the first estimator, at a first destination, first information for locating at least some of the mobile units, and outputs to the second estimator, at a second destination, second information for locating at least some of the mobile units:

wherein at least one of: (c1) the first information is transmitted to the first destination via a transmission on a telecommunications network such that the first and second destinations are distributed thereon, and (c2) the second information is transmitted to the second destination via a transmission on a telecommunications network such that the first and second destinations are distributed thereon:

one or more components for receiving location requests for the plurality of mobile units, and initiating contacts via the predetermined interface with one or more of the plurality of estimators for estimating mobile unit locations to satisfy the requests, 24. The apparatus of claim 23, further including an archive having a plurality of data item collections, wherein for each of a plurality of geographical locations, there is a corresponding one of said data item collections having (a1) and (a2) following:

(a1) a representation of the geographical location, and (a2) data indicative of said wireless signal measurements between one of the mobile units and the communication stations when said one mobile unit is approximately at the geographical location of (a1); and further including a comparator for comparing for each estimator, E, of at least some of said estimators, (b1) and (b2) following:

(b1) location estimates, each obtained from inputting to the estimator E a corresponding input from an instance of said data of (a2); and (b2) the corresponding geographical location representations of (a1) for those of the data item collections also having instances of said data of (a2 from which one of the corresponding inputs is used for obtaining the corresponding location estimates in (b1);

wherein a result from said comparator is used for determining at least one corresponding performance measurement for each of the estimators E.

25. The apparatus of claim 23, further including an output interface for outputting mobile unit location information obtained using one or more location estimates obtained form said estimators receiving activation requests from the predetermined interface, wherein said output interface includes an access to the Internet for transmitting said location information, via the Internet, to an Internet accessible destination for which a previous request for said location information was received by said apparatus.

26. A method for locating a mobile unit (MU), wherein said mobile unit MU is one of a plurality of mobile units, and wherein corresponding wireless signal measurements are capable of being obtained using wireless transmissions between each of the plurality of mobile units and a plurality of terrestrial communication stations, each said communication station being for at least one of transmitting and receiving the wireless transmissions with the mobile units, comprising:

first transmitting, via a network, a first activation request for receipt by a first predetermined destination of the network for activating a first location estimating method for estimating a location of the mobile unit $MU_1$;

second transmitting, via a network, a second activation request for receipt by a second predetermined destination, wherein the second activation request is for activating a second location estimating method, for estimating a same or different location of the mobile unit MU;

wherein the first and second predetermined destinations are different from the mobile unit MU;

wherein, for determining a location estimate, each of said first and second location estimating methods uses data obtained from a different one of (a) and (b) following:

(a) signals S received by the mobile unit MU, the signals S received from a transmitting station that is not supported on the earth's surface, and (b) at least one of (i) and (ii) following:

(i) a time difference of arrival measurement of signals between the mobile unit MU and at least two of the communication stations, wherein at least one of the two communication stations receives a wireless signal from the mobile unit MU, or (ii) wireless signals (WS') communicated between the communication stations and one or more of the mobile units different from MU;

wherein when an instance of the data is obtained, at least in part, from the time difference of arrival measurement for determining a location of the mobile unit MU, there is a two-way communication between the mobile unit MU and at least one of the communication stations in order to provide the instance of the data to a corresponding one of first and second location estimating methods;

wherein when an instance of the data is obtained, at least in part, from an instance of the wireless signals WS, a corresponding one of first and second location estimating methods uses location dependent characteristics of the wireless signals WS to determine a correspondence between: (1) characteristics of the wireless signals transmitted between the mobile unit MU, and one or more of the communication stations, and (2) a geographical location of the mobile unit MU;

wherein when activated for locating $MU_1$, each of the first and second location estimating methods performs at least one corresponding geographical location determining computation for locating MU, wherein the corresponding computations are performed at network sites distributed from one another.

27. A method for locating a mobile unit MU, wherein said mobile unit MU is one of a plurality of mobile units, and corresponding wireless signal measurements are capable of being obtained using wireless transmissions between each of the plurality mobile units and a plurality of communication stations residing on a surface of the earth, each said communication station being for at least one of transmitting and receiving the wireless transmissions with the mobile units, comprising:

selecting between at least two or more location estimating methods for estimating a location of the mobile unit MU, wherein each of first and second of the location estimating methods is dependent upon corresponding data provided by at least one of (a) through (d) following:

(a) signals received by the mobile unit MU from a transmitting station not supported on the earth's surface, (b) a time difference of arrival measurement of a wireless signals between the mobile unit MU and the communication stations, (c) an angle of arrival measurement of a signal between the mobile unit MU and at least one of the communication stations, and (d) wireless signals (WS) transmitted between the communication stations and one or more of the mobile units different from MU;

wherein said step of selecting includes a substep of determining, for at least one of said location estimating methods, an indication as to whether information is available for estimating a location of the mobile unit MU;

requesting activation of one or more of said first and second location estimating methods, selected in said selecting step, for estimating one or more locations of said mobile unit MU;

wherein a preference is given to locating the mobile unit MU by one of the location estimating methods: (i) that uses data obtained from available wireless signals received by the mobile unit MU from a transmitting station not supported on the earth's surface, over (ii) locating the mobile unit MU by one of the location estimating methods that is more dependent upon the corresponding data available for locating the mobile unit MU from (b) through (d) hereinabove;

wherein when the corresponding data for a selected location estimating method (LEM) of the first and second location estimating methods is provided, at least in part, by an instance of (c) hereinabove, there is a two-way communication between the mobile unit MU and at least one of the communication stations in order to provide the corresponding data to the location estimating method LEM:

wherein when the corresponding data for a selected location estimating method ($LSM_{ws}$) of the first and second location estimating methods includes an instance of the wireless signals WS, the selected location estimating method $LSM_{ws}$ uses location dependent characteristics of the wireless signals WS to determine a correspondence between: (1) characteristics of the wireless signals transmitted between the mobile unit MU, and one or more of the communication stations, and (2) a geographical location of the mobile unit MU.

28. A method for locating mobile units $MU_1$ and $MU_2$, wherein said mobile units $MU_1$ and $MU_2$ are each from a plurality of mobile units, and wireless signal measurements are capable of being obtained using wireless transmissions between each of the plurality of mobile units, and a plurality of communication stations supported on the surface of the earth, each said communication station being for at least transmitting some of the wireless transmissions to the mobile units for determining geographic locations of the mobile units, comprising:

transmitting, to a first destination, a first request for activating a first location estimator for determining a first location estimate of the mobile unit $MU_1$;

wherein for determining the first location estimate, the first location estimator uses first data obtained from signals received by the mobile unit $MU_1$ from a transmitting station not supported on the earth's surface; providing, to a second destination, a second request for activating of a second location estimator for determining a second location estimate of the mobile unit $MU_2$ using second data obtained from location indicative data from one or more signals communicated between the mobile unit $MU_2$ and one of the communication stations, wherein there is a two-way communication between the mobile unit $MU_2$ and at least one of the communication stations in order to provide the second data to the second location estimator, the second data providing information indicative of a position of $MU_2$ relative to at least one of the communication stations;

wherein the first and second destinations are distributed from one another on a telecommunications network, wherein at least one of the first and second location estimates is transmitted on the telecommunications network to a predetermined site on the telecommunications network as a response to a corresponding one of the first and second requests; and wherein for locating at least one mobile unit ($MU_n$) of the plurality of mobile units, a preference is given for: (i) determining a location of the mobile unit $MU_n$ using data (D) obtained from wireless signals received by the mobile unit $MU_n$ from a transmitting station not supported on the earth's surface, over (ii) determining a location of the mobile unit $MU_n$ using, instead of the data D, alternative available location indicative data obtained from one or more signals communicated between the mobile unit $MU_n$ and one of the communication stations, wherein there is a two-way communication between the mobile unit $MU_n$ and at least one of the communication stations in order to obtain the alternative location data, wherein the alternative location data provides information indicative of a position of $MU_n$ relative to at least one of the communication stations.

29. A method for locating mobile units, wherein wireless signal measurements are capable of being obtained using wireless transmissions between each of the plurality mobile units and a plurality of communication stations supported on the surface of the earth, each said communication station being for at least one of transmitting and receiving the wireless transmissions with the mobile units for determining geographic locations of the mobile units, comprising:

selecting between first and second location estimating methods, or location estimates therefrom, for estimating a location of one of the mobile units ($MU_1$), wherein for obtaining a location estimate of the mobile unit $MU_1$, said first location estimating method is dependent upon corresponding data obtained using signals received by the mobile unit $MU_1$ from a transmitting station not supported on the earth's surface, and said second location estimating method is dependent upon corresponding data obtained using wireless signals (WS) communicated between the communication stations and one or more of the mobile units different from $MU_1$;

wherein said step of selecting includes a substep of determining, for at least one of said first and second location estimating methods, an indication as to an availability of an acceptable resulting location estimate for the mobile unit $MU_1$.

30. The method of claim 28, further including (a) a step of activating one or more location estimators for obtaining one or more additional location estimates of a location of one of said mobile units $MU_1$ and $MU_2$, and (b) a step of outputting location information based, at least in part, on at least one of the additional location estimates;

wherein said step of activating is for obtaining a more accurate location estimate of the one mobile unit.

31. The method of claim 30, further including a step of using a frequency of performing said step of outputting for providing one or more instances of said location information to a location information receiving application.

32. The method of claim 31, wherein said location information receiving application uses the location information for a predetermined service.

33. The method of claim 31, wherein said location information receiving application is for determining whether there is a predetermined distance between the one mobile unit and another one of the mobile units.

34. The method of claim 11, wherein the activating step includes activating the first evaluator, and a second of said evaluators for determining, respectively, a first and a second evaluation of said particular condition; and farther including the steps of:

determining, for said first evaluation, a first of preference measurement from the preference data items, wherein the first preference measurement is indicative of a performance of the first evaluator in at least one of the classes which the particular condition is classified;

determining, for said second evaluation, a second of preference measurement from the preference data items, wherein the second preference measurement is indicative of a performance of the second evaluator in at least one of the classes which the particular condition is classified;

wherein the preference is determined using the first and second preference measurements; and wherein the step of second obtaining includes obtaining the resulting evaluation for the particular condition using the preference to give a preference to one of said first and second evaluations.

35. The method of claim 34, wherein the particular condition relates to a geographic location of a user station that is interactive on a network.

36. The method of claim 11, wherein the selecting step includes selecting the at least one evaluator wherein communication with the at least one evaluator includes the transmission via the Internet.

37. The apparatus of claim 23, wherein said predetermined interface for accessing includes a routing component for providing information that is used in routing at least one instance of each of the first and second requests via a transmission on the Internet.

38. The apparatus of claim 23, wherein the transmitting station not supported on the earth's surface includes a satellite.

39. The apparatus of claim 23, wherein for at least one mobile unit ($U_1$) of the mobile units, the corresponding input for the first estimator includes data obtained from signals received by $U_1$ from a transmitting station (TS) not supported on the earth's surface, wherein the first estimator determines a location of $U_1$ that is dependent upon a signal time delay of the signals from TS to $U_1$, and
wherein for at least one mobile unit ($U_2$) of the mobile units, the corresponding input for the second estimator includes a time difference of arrival measurement of signals between $U_2$, and at least two terrestrial communication stations of the communication stations.

40. The apparatus of claim 39, wherein at least one of the two terrestrial communication stations receives a wireless signal from $U_2$ substantially at a time that $U_2$ is being located.

41. The apparatus of claim 23, wherein for at least one mobile unit ($U_1$) of the mobile units, the corresponding input for the first estimator includes data obtained from signals received by $U_1$ from a transmitting station (TS) not supported on the earth's surface, wherein the first estimator determines a location of $U_1$ that is dependent upon a signal time delay of the signals from TS to $U_1$, and
wherein for at least one mobile unit ($U_2$) of the mobile units, the corresponding input for the second estimator includes data obtained from signals communicated between the mobile unit $U_2$ and the communication stations, wherein the second estimator has been trained or calibrated using values obtained from transmissions of wireless signals from a plurality of locations of one or more of the mobile units to associate: (1) wireless signal characteristics obtained from the signals communicated between the mobile unit $U_2$ and the communication stations with (2) a geographical location used for locating the mobile unit $U_2$.

42. The apparatus of claim 23, wherein for at least one mobile unit ($U_1$) of the mobile units, the corresponding input for the first estimator includes data obtained from the time difference of arrival measurement of signals between $U_1$, and at least two terrestrial communication stations of the communication stations, and
wherein for at least one mobile unit ($U_2$) of the mobile units, the corresponding input for the second estimator includes data obtained from signals communicated between the mobile unit $U_2$ and the communication stations, wherein the second estimator has been trained or calibrated using values obtained from transmissions of wireless signals from a plurality of locations of one or more of the mobile units to associate: (1) wireless signal characteristics obtained from the signals communicated between the mobile unit $U_2$ and the communication stations with (2) a geographical location used for locating the mobile unit $U_2$.

43. The apparatus of claim 23, wherein, the initiated contacts with the first estimator depends on whether said corresponding input is available for said first estimator.

44. The apparatus of claim 43, wherein the initiated contacts with the second estimator depends on whether said corresponding input is available for said second estimator.

45. The apparatus of claim 23, wherein for at least one of the mobile units ($U_1$), the one or more components directs the predetermined interface to provide a first activation request to the first estimator, wherein the first estimator locates $U_1$ using data obtained from an instance of the signals S transmitted from an instance of the transmitting station to $U_1$, wherein the first estimator determines a location of $U_1$ using a signal time delay of the instance of the signals S;
wherein for at least one location of one of the mobile units ($U_2$), the one or more components directs the predetermined interface to provide a second activation request to the second estimator, wherein the second estimator locates $U_2$ using data obtained from an instance of the time difference of arrival measurement of signals between $U_2$ and at least two terrestrial communication station of the communication stations; and
wherein for at least one location of one of the mobile units ($U_3$), the one or more components directs the predetermined interface to provide a third activation request to a third of the estimators, wherein the third estimator locates $U_3$ using data obtained from an instance of wireless signals communicated between $U_3$ and the communication stations, wherein for estimating the location of $U_3$, the third estimator has been trained or calibrated, using values obtained from wireless transmissions of wireless signals from a plurality of locations of the mobile units, to associate: (1) wireless signal characteristics obtained from the instance of the wireless signals communicated between $U_3$ and the communication stations with (2) a geographical location for the mobile unit $U_3$.

46. The apparatus of claim 45, wherein each of the mobile units $U_1$, $U_2$ and $U_3$ is different from the other two of the mobile units $U_1$, $U_2$, and $U_3$.

47. The apparatus of claim 45, wherein each of the mobile units $U_1$, $U_2$, and $U_3$ is at substantially different location when locked.

48. The apparatus of claim 45, wherein at least two of the mobile units $U_1$, $U_2$, and $U_3$ are the same mobile unit.

49. The apparatus of claim 29, wherein for estimating a location of at least one mobile unit ($U_1$) of the mobile units, one of the first and second estimators has been trained or calibrated using values obtained from wireless signals for prior locations of one or more different ones of the mobile units to associate or correlate: (1) wireless signal characteristics obtained from wireless signals transmitted between the mobile unit $U_1$ and at least one of the communication stations, with (2) a geographical location for the mobile unit $U_1$.

50. The method of claim 23, wherein in order to locate one of the mobile units, an instance of the second corresponding input includes data obtained from a time difference of arrival measurement of signals between the one mobile unit being located, and at least two terrestrial communication stations of the communication stations;
S wherein there is a two-way communication between the one mobile unit and at least one of the communication stations for obtaining the instance of the second corresponding input.

51. The method of claim 50, wherein each of the first and second destinations corresponds to a server site of a same telecommunications network.

52. The method of claim 26, wherein the network by which said first estimating method is activated is the Internet, and the network by which said second estimating method is activated is the Internet.

53. The method of claim 26, wherein at least one of the first and second location estimating methods provide a location estimate of the mobile unit MU according to (b)(ii).

54. The method of claim 26, wherein a location estimate for the mobile unit MU from the first location estimating method is independent of a location estimate for the mobile unit MU from the second location estimating method, and a location estimate for the mobile unit MU from the second location estimating method is independent of a location estimate for the mobile unit MU from the first location estimating method.

55. The method of claim 26, wherein one or more of: the first transmitting step, and the second transmitting step includes transmitting on the Internet.

56. The method of claim 26, wherein at least one of the first and second location estimating methods provides a location estimate of the mobile unit MU according to (a), and the transmitting station is a satellite.

57. The method of claim 26, further including a step of outputting location information for the mobile unit MU, wherein the location information includes a representation of a first location of the mobile unit MU, at a first time, obtained using a location estimate from the first location estimating method, and the location information includes a representation of a second location of the mobile unit MU, at a second time, obtained using a location estimate from the second location estimating method, wherein the first and second locations are different.

58. The method of claim 26, further including receiving a location estimate from the first location estimating method when information is available from corresponding wireless signal measurements for estimating a location of the mobile unit MU by the first location estimating method; and
receiving a location estimate from the second location estimating method when information is available from corresponding wireless signal measurements for estimating a location of the mobile unit MU by the second location estimating method.

59. The method of claim 26, further including, for a mobile unit ($U_1$) of the mobile units, a step of receiving a location estimate substantially dependent upon signals $S_1$ received by the mobile unit $U_1$ the signals $S_1$ received from a transmitting station that is not supported on the earth's surface; and
for a mobile unit ($U_2$) of the mobile units, a step of receiving a second location estimate substantially dependent upon a time difference of arrival measurement of signals between the mobile unit $U_2$ and the communication stations, wherein at least one of the communication stations receives a wireless signal $S_2$ from the mobile unit $U_2$, and $S_2$ is used to provide input to a corresponding one of first and second location estimating methods for determining the second location estimate; and
wherein $U_1$ and $U_2$ are different.

60. The method of claim 59, further including, for a mobile unit ($U_3$) of the mobile units, a step of receiving a location estimate (LE), wherein the location estimate LE is determined using values of a wireless transmissions, T, from a plurality of locations of the plurality of mobile units different from the mobile unit $U_3$;
wherein LE is determined as a result of one of adaptively associating or statistically correlating the values of the wireless transmissions T with data from wireless signals communicated between the mobile unit $U_3$ and the communication stations.

61. The method of claim 26, wherein for determining the location of the mobile unit MU, and for each of the first and second location estimating methods, at least one geographical location determining computation using data from wireless signals communicated between the mobile unit MU and the communication stations is performed at a location remote from the location of the mobile unit MU.

62. The method of claim 26, wherein each of the first and second predetermined destinations are server sites on a same telecommunications network.

63. The method of claim 26, wherein for each mobile unit ($U_k$) of a plurality mobile units different from the mobile unit MU, at least one value obtained from a wireless transmission between the different mobile unit $U_k$ to the communication stations is used for associating, or statistically correlating: (1) data from wireless signals communicated between the mobile unit MU and the communication stations, and (2) a geographical location of MU.

64. The method of claim 26, further including a step of receiving one or more location estimates for locating the mobile unit MU, the location estimates obtained from one or more of the first and second location estimating methods; and
transmitting location information determined from the one or more location estimates to a predetermined destination as a response to a location request for locating the mobile unit MU.

65. The method of claim 27, wherein for one of the first and second location estimating methods, the corresponding data includes data provided by (a), and
wherein for the other of the first and second location estimating methods, the corresponding data therefore includes a collection of the wireless signals WS, wherein this other location estimating method has been trained or calibrated using location dependent characteristics of the collection of wireless signals WS to associate: (1) characteristics of the wireless signals transmitted from the mobile unit MU to at least one of the communication stations, with (2) a geographical location for locating the mobile unit MU.

66. The method of claim 27, wherein for one of the first and second location estimating methods, the corresponding data includes data provided by (b); and
wherein for the other of the first and second location estimating methods, the corresponding data therefore includes a collection of the wireless signals WS, wherein this other location estimating method has been trained or calibrated using location dependent characteristics of the collection of wireless signals WS to associate: (1) characteristics of the wireless signals transmitted from the mobile unit MU to at least one of the communication stations, with (2) a geographical location for locating the mobile unit MU.

67. The method of claim 27, wherein requests for activating the first location estimating method for locating at least some of the mobile units includes contacting a predetermined first destination, and requests for activating the second location estimating method for locating at least some of the mobile units includes contacting a predetermined second destination, and the predetermined first and second destinations are different from the mobile unit MU.

68. The method of claim 67, wherein the predetermined first and second destinations are different from one another.

69. The method of claim 27, wherein for at least one mobile unit ($U_1$) of the mobile units, a location estimating method (E) of the two or more location estimating methods is used to locate $U_1$, wherein the estimator E uses satellite signals received by the mobile unit $U_1$.

70. The method of claim 27, wherein for at least one mobile unit ($U_1$) of the mobile units, a location estimating method (E) of the two or more location estimating methods is used to locate $U_1$, wherein the location estimating method E uses a time difference of arrival measurement of a signal between the mobile unit $U_1$ and the communication stations, wherein there is a two-way communication between the mobile unit $U_1$ and at least one of the communication stations in order to provide input to the location estimating method E.

71. The method of claim 27, wherein for at least one mobile unit ($U_1$) of the mobile units, a location estimating method (E) of the two or more location estimating methods is used to locate $U_1$, wherein the location estimating method E uses an angle of arrival measurement of a signal between the mobile unit $U_1$ and at least one of the communication stations.

72. The method of claim 27, wherein for at least one mobile unit ($U_1$) of the mobile units, a location estimating method (E) of the two or more location estimating methods is used to locate $U_1$, wherein the location estimating method E is dependent upon information obtained from a collection of the wireless signals received at the communication stations from one or more of the mobile units different from $U_1$, wherein the information from the collection is input to the location estimating method E for training or calibrating E to identify a corresponding geographical location for $U_1$ from characteristics of wireless signals communicated between $U_1$ and one or more of the communication stations.

73. The method of claim 27, wherein at least one of the first and second location estimating methods is substantially dependent upon an instance of the corresponding data provided by a particular one of (a) through (d), and the other of the first and second location estimating methods is not substantially dependent on the particular one;
  wherein the requesting activation step includes a step of providing to a first destination a first request for activating the first estimator, and for providing to a second destination a second request for activating the second estimator, wherein at least the first request is provided to the first destination via a transmission on a communications network such that the first and second destinations correspond to distinct server sites on the communications network.

74. The method of claim 27, wherein the transmitting station is a satellite.

75. The method of claim 27, further including outputting, to a destination, location information that provides at least one location of the mobile unit MU, the location information obtained using one or more location estimates provided by said one or more of the first and second of said location estimating methods;
  wherein the destination uses the location information, and the step of outputting includes a transmission on a communications network.

76. The method of claim 28, wherein at least one of first and second requests is received by an Internet server site corresponding to one of the first and second destinations.

77. The method of claim 28, wherein the telecommunications network includes server sites for the first and second destinations.

78. The method of claim 28, wherein the location indicative data from the one or more signals communicated between the mobile unit $MU_2$ and one of the communication stations includes at least one of:
  (a) a time of arrival measurement of a signal communicated between the mobile unit $MU_2$ and one of the communication stations, wherein there is a two-way communication between the mobile unit $MU_2$ and at least one of the communication stations in order to provide the second data to the second location estimator;
  (b) a time difference of arrival measurement of a signal between the mobile unit $MU_2$ and the communication stations, wherein there is a two-way communication between the mobile unit $MU_2$ and at least one of the communication stations in order to provide the second data to the second location estimator;
  (c) data for identifying a direction of arrival measurement of a signal between the mobile unit $MU_2$ and one of the communication stations; and
  (d) wireless signals ($WS_2$) communicated between the communication stations and one or more of the mobile units different from $MU_2$, wherein the second location estimator uses location dependent characteristics of the wireless signals $WS_2$ to determine a correspondence between: (1) characteristics of the wireless signals transmitted between the mobile unit $MU_2$, and one or more of the communication stations, and (2) a geographical location of the mobile unit $MU_2$.

79. The method of claim 78, wherein the second location estimator requires data obtained from the wireless signals $WS_2$.

80. The method of claim 79, wherein to obtain a geographical location for $MU_2$ from the second location estimator, values obtained from the wireless signals $WS_2$ are associated with, or statistically correlated with, data from wireless signals communicated between the mobile unit $MU_2$ and the communication stations.

81. The method of claim 78, wherein the second location estimator requires data obtained from the data for identifying a direction of arrival measurement.

82. The method of claim 28, further including, for at least one of the mobile units $MU_1$ and $MU_2$, a step of selecting the corresponding first or second location estimator, wherein the step of selecting is dependent upon an availability of the corresponding first and second data.

83. The method of claim 28, further including obtaining a location estimate of the mobile unit $MU_1$ from the first location estimator via the telecommunications network; and
  transmitting to a network address, location information that provides a location of the mobile unit $MU_1$, the location information obtained using the first location estimate, and the network address used for providing the location information to a predetermined application that uses the location information for performing a predetermined service.

84. The method of claim 29, wherein when the corresponding data for a selected one of the first and second location estimating methods, or location estimate therefrom, is obtained using an instance of the wireless signals WS.

85. The method of claim 84, wherein the selected location estimating method, or location estimate therefrom, is dependent upon characteristics of the wireless signals WS to determine a correspondence between: (1) characteristics of the wireless signals transmitted between the mobile unit $MU_1$, and one or more of the communication stations, and (2) a geographical location of the mobile unit $MU_1$.

86. The method of claim 29, further including a step of requesting activation of at least said first location estimating method for estimating one or more locations of said mobile unit $MU_1$, wherein the corresponding data for said first location estimating method is obtained from the signals received by the mobile unit $MU_1$ from a satellite.

87. The method of claim 29, further including first requesting activation of at least one of the first and second location estimating methods for obtaining a first location estimate of $MU_1$, wherein the activation request is transmitted to a first destination, via a transmission on a communications network.

88. The method of claim 87, further including a step of providing to a second destination, a request for activation of the other of the first and second location estimating methods different from the at least one location estimating method, the request for activation of the other location estimating method for obtaining a second location estimate of a second of the mobile units $MU_2$.

89. The method of claim 88, wherein the other location estimating method is activated for estimating the second location estimate of the second mobile unit $MU_2$, wherein the activation of the other location estimating method is dependent upon wireless signals ($WS_2$) communicated between the communication stations and one or more of the mobile units different from $MU_2$.

90. The method of claim 29, wherein the first and second location estimating methods are, respectively, accessed via first and second destinations that are distributed from one another on a communications network;
  wherein for at least one of a first request for activating the first location estimating method, and a second request for activating the second location method, at least one resulting location estimate therefrom is transmitted on the communications network to a predetermined site on the communications network as a response to a corresponding one of the first and second requests.

91. The method of claim 29, wherein for locating the mobile unit $MU_1$, there are one or more mobile units ($MU_k$) of the mobile units different from $MU_1$, wherein at each of one or more locations of each of the mobile units $MU_k$, one or more values of one or more wireless transmissions between the mobile unit $MU_k$ and the communication stations are used in training, or stochastically correlating, the second location estimating method to associate: (i) each of a plurality of geographic locations, and (ii) for each of the geographic locations, GL, corresponding values of wireless communications between the communication stations and the geographic location GL.

92. The method as claimed in claim 13, wherein said plurality of conditions is one of:
  (a) economic market related conditions, wherein said evaluators provide forecasts of future economic conditions;
  (b) malfunctions in electronic systems, wherein said evaluators provide diagnoses of the malfunctions;
  (c) text in documents for scanning, wherein said evaluators provide evaluations for identifying the scanned text;
  (d) vehicle malfunctions, wherein said evaluators provide diagnoses of the vehicle malfunctions;
  (e) computer malfunctions, wherein said evaluators provide diagnoses of the computer malfunctions;
  (f) communication network malfunctions, wherein said evaluators provide diagnosis of the network malfunctions;
  (g) medical conditions, wherein said evaluators provide diagnoses of the medical conditions; and
  (h) weather data, wherein said evaluators provide predictions of future weather conditions.

93. The apparatus of claim 23, wherein for one of the mobile units ($M_1$) wherein a location estimate ($LE_1$) is obtained from the first estimator, there is no corresponding location estimate for the mobile unit $M_1$ from the second estimator for substantially a same time and location of $M_1$ that $LE_1$ is obtained.

94. The apparatus of claim 23, wherein for one of the mobile units ($M_1$) wherein a location estimate ($LE_1$) is obtained from the first estimator, there is a location estimate ($LE_2$) for $M_1$ from the second estimator for substantially a same time and location of $M_1$ that $LE_1$ is obtained, and each of $LE_1$ and $LE_2$ is determined substantially independently of the other of $LE_1$ and $LE_2$.

95. The apparatus of claim 24, wherein for determining a location estimate (LE) of a particular one of the mobile units, at least one of the corresponding performance measurements is used for determining a probability of the location estimate LE correctly identifying an actual location of the particular mobile unit.

* * * * *